United States Patent
Ranasinghe et al.

(10) Patent No.: US 8,180,770 B2
(45) Date of Patent: May 15, 2012

(54) SYSTEM AND METHOD FOR CREATING A PLAYLIST

(75) Inventors: Shamal Ranasinghe, Venice, CA (US); Bradley De Kindig, San Diego, CA (US); Christopher Staszak, San Diego, CA (US); Gary Frattarola, Sunnyvale, CA (US)

(73) Assignee: Yahoo! Inc., Sunnyvale, CA (US)

(*) Notice: Subject to any disclaimer, the term of this patent is extended or adjusted under 35 U.S.C. 154(b) by 410 days.

(21) Appl. No.: 11/255,524

(22) Filed: Oct. 20, 2005

(65) Prior Publication Data
US 2006/0265421 A1    Nov. 23, 2006

Related U.S. Application Data

(60) Provisional application No. 60/657,222, filed on Feb. 28, 2005, provisional application No. 60/678,718, filed on May 5, 2005.

(51) Int. Cl.
G06F 7/00 (2006.01)
G06F 17/30 (2006.01)

(52) U.S. Cl. ......... 707/732; 707/737; 707/749; 707/916
(58) Field of Classification Search ............ 707/732, 707/737, 749, 916
See application file for complete search history.

(56) References Cited

U.S. PATENT DOCUMENTS

| | | | |
|---|---|---|---|
| 5,616,876 A | 4/1997 | Cluts | |
| 6,446,080 B1* | 9/2002 | Van Ryzin et al. | 707/104.1 |
| 6,545,209 B1 | 4/2003 | Flannery et al. | |
| 6,748,395 B1* | 6/2004 | Picker et al. | 707/102 |
| 7,043,477 B2* | 5/2006 | Mercer et al. | 1/1 |
| 7,227,073 B2* | 6/2007 | Kim | 84/609 |
| 2002/0078029 A1* | 6/2002 | Pachet | 707/1 |
| 2003/0135513 A1* | 7/2003 | Quinn et al. | 707/102 |
| 2003/0221541 A1* | 12/2003 | Platt | 84/609 |
| 2003/0229537 A1* | 12/2003 | Dunning et al. | 705/10 |
| 2004/0230672 A1 | 11/2004 | Zuckerberg et al. | |
| 2005/0240661 A1* | 10/2005 | Heller et al. | 709/219 |
| 2007/0016599 A1* | 1/2007 | Plastina et al. | 707/101 |
| 2008/0033979 A1* | 2/2008 | Vignoli et al. | 707/102 |

FOREIGN PATENT DOCUMENTS

| | | |
|---|---|---|
| EP | 1 548 740 A | 6/2005 |
| WO | WO 2005/071569 A | 8/2005 |

OTHER PUBLICATIONS

Supplementary Search Report (EP 06 82 5840) dated Sep. 2, 2009; 2 pages.

* cited by examiner

Primary Examiner — John R. Cottingham
Assistant Examiner — Mariela Reyes
(74) Attorney, Agent, or Firm — James J. DeCarlo; Greenberg Traurig, LLP

(57) ABSTRACT

A method, system, and user interface for creating a personalized and customizable playlist. In one embodiment, the method and system for generating a playlist includes the user selecting and/or entering media file identifiers associated with media files and then initiating automatic playlist generation.

107 Claims, 47 Drawing Sheets

SYSTEM AND METHOD FOR CREATING A PLAYLIST

CROSS-REFERENCE TO RELATED APPLICATION

This application claims the benefit of U.S. Provisional Application Ser. No. 60/657,222, filed Feb. 28, 2005, entitled A SYSTEM AND METHOD FOR DELIVERING MEDIA OVER A NETWORK, and U.S. Provisional Application Ser. No. 60/1678,718, filed May 5, 2005, entitled A SYSTEM AND METHOD FOR DELIVERING MEDIA OVER A NETWORK, both of which are hereby incorporated herein by reference.

FIELD OF INVENTION

The present disclosure relates generally to a system, method, and user interface for creating a playlist based on user interaction with a media program.

BACKGROUND OF INVENTION

Media management programs, systems, methods, and user interfaces for creating a playlist are known but not necessarily robust. Further, with the advent of multiple media sources and large user media libraries, improved playlist generation is desired among users. Current playlist generation techniques lack an easy to use method of creating a playlist in automatic fashion or from various media sources.

SUMMARY OF THE INVENTION

The present disclosure seeks to address these failings by providing a method, system, and user interface for easily creating a playlist based on at least one selected media file. Further, the present disclosure allows a user to create a personalized playlist based on and having media files from various sources.

The present disclosure relates to the ability to experience media content using automated devices that store and or access representations of experienceable media, such as music, audio, videos, movies, spoken words, photos, artworks, and the like. As used herein the terms content or media are used broadly to encompass any type or category of experienceable, retrievable, filed and/or stored media, either singly or collectively, and individual items of media or content are generally referred to as entries, songs, tracks, items or files, however, the use of any one term is not to be considered limiting as the concepts features and functions described herein are generally intended to apply to any storable and/or retrievable item that may be experienced by a user, whether aurally, visually or otherwise, in any manner now known or to become known.

An embodiment of the present disclosure includes a method, system, and user interface for creating a personalized and customizable playlist. In one embodiment, the method and system for generating a playlist includes the user selecting and/or entering media file identifiers associated with media files and then clicking a button to initiate automatic playlist generation.

In a further embodiment, after the user selects the media file identifiers, the user has the option to select parameters and/or filters before clicking the button to initiate the automatic playlist generation.

In one embodiment, a playlist is created completely locally. Meaning, that the user can generate a playlist using the user's local processor (personal computer or portable device, etc) without being connected to or relying on a server or the internet. Further, the user can create the playlist completely locally and transfer the playlist to a portable device or media.

In another embodiment, the playlist is created using a server and/or the internet to generate the playlist. Thus, in one aspect, the server creates the playlist and then sends it to the user.

Furthermore, the method and system includes an intuitive user interface for creating a personalized and customizable playlist. The user interface allows the user to create a playlist based on various levels of user involvement ranging from minimal user input to multiple explicit user inputs.

In further embodiments, the user interface, in conjunction with a media management program, assists the user in managing their playlists once created. In one embodiment, the user can manage the playlist by loading and playing the playlist in a media player. In another embodiment, the user can manage the playlist by saving the criteria to generate the playlist. Thus, the user can create updated playlists as the user's media file identifiers from which the playlist is created changes, while the user's desired criteria remains the same. Furthermore, depending on the criteria and available media, the playlist will be different each time it is generated.

In another embodiment, the user can manage the playlist by sending the playlist to another person. In another embodiment, the user can manage the playlist by burning the playlist to a CD. In another embodiment, the user can manage the playlist by transferring the playlist to a portable device. In another embodiment, the user can manage the playlist by rearranging and/or deleting the tracks within the playlist.

In a further embodiment, the user can perform any of the above managing functions in any combination as the user desires. For example, once the playlist is generated, the user can delete tracks from the playlist, play the playlist, and then send the playlist to another user.

In one embodiment a method of creating a playlist comprises receiving a first data set associated with a first media file, the first data set comprising an attribute associated with the first media file; creating a list of candidate media file identifiers based on the first data set and relationship data wherein each of the candidate media file identifiers is associated with a candidate media file; selecting some or all of the candidate media file identifiers to be included in the playlist based at least in part on whether an attribute associated with the candidate media files is similar to the attribute associated with the first media file; and creating the playlist based upon the selected candidate media file identifiers.

In one embodiment, the relationship data is stored on a server. In one embodiment, the first media file comprises an audio or video file.

In one embodiment, the attribute of either one or both of the candidate media file and the first media file may comprises an artist name, an album name, a media file name, an id associated with the first media file, or any other useful media file information.

In one embodiment, the relationship data is stored as a graph with a media file of the playlist associated to vertexes of the graph and edges of the graph represent relationships between the media file. In a further embodiment, the edges contain weights corresponding to the strength of the relationships. In another embodiment, the relationship data may be based on explicit user behavior. In another embodiment, the relationship data may be based on implicit user behavior.

In one embodiment, the playlist comprises at least one media file identifier associated with a media file. In one embodiment, the media file identifier comprises a pointer or a uniform resource locator. In another embodiment, the media file identifier is associated with a media file that can be acquired by streaming the media file. In another embodiment, the media file identifier is associated with a media file that can be downloaded. In another embodiment, the media file identifier is associated with a media file that can located on a user's computing device.

In one embodiment, the method comprises further selecting the candidate media files based on a playlist parameter. In one embodiment, the playlist playlist parameter comprises a size parameter for influencing a total size of the playlist. In one embodiment, the total size may be is based on a number of media files, a temporal length, or on a file size.

In another embodiment, the playlist parameter comprises a source parameter for influencing a media file source of media files of the playlist. In one embodiment, the media file source is an on demand streaming media service. In another embodiment, the media file source is a local media library. In a further embodiment, the media file source comprises an on demand streaming media service and a local media library.

In another embodiment, the playlist parameter comprises a popularity parameter for influencing a degree of popularity associated with media files of the playlist. In one embodiment, the playlist parameter comprises a date released parameter for restricting media files of the playlist to a time period or an era defined by two years.

In one embodiment, the playlist parameter comprises a diversity parameter for influencing a degree of occurrence of similar media files within the playlist as compared to the identified media file.

In one embodiment, a method of creating a playlist comprises receiving a first user input representing selecting a media file identifier associated with a media file; receiving a second user input representing a desire to create the playlist; sending, upon the second user input, a data set associated with the media file to a remote location for creating the playlist based in part on the data set and relationship data; receiving the created playlist from the remote location; and facilitating the display of the playlist.

In another embodiment, a method of creating a playlist comprises receiving a first user input representing selecting a media file identifier associated with a media file; receiving a second user input representing a desire to create the playlist; creating, upon the second user input, the playlist based upon relationship data previously accessed from a remote location and a data set associated with the media file; and facilitating the display of the playlist.

In one embodiment, the media file identifier is selected by receiving a search input criteria. In one emobdiment, the input criteria may be an artist name, a media file name, a playlist parameter.

In one embodiment, the method comprises further selecting the candidate media files based on a playlist parameter. In one embodiment, the playlist playlist parameter comprises a size parameter for influencing a total size of the playlist. In one embodiment, the total size may be is based on a number of media files, a temporal length, or on a file size.

In another embodiment, the playlist parameter comprises a source parameter for influencing a media file source of media files of the playlist. In one embodiment, the media file source is an on demand streaming media service. In another embodiment, the media file source is a local media library. In a further embodiment, the media file source comprises an on demand streaming media service and a local media library.

In another embodiment, the playlist parameter comprises a popularity parameter for influencing a degree of popularity associated with media files of the playlist. In one embodiment, the playlist parameter comprises a date released parameter for restricting media files of the playlist to a time period or an era defined by two years.

In one embodiment, the playlist parameter comprises a diversity parameter for influencing a degree of occurrence of similar media files within the playlist as compared to the identified media file.

In one embodiment, the data set comprises an attribute associated with the first media file. In one embodiment, the attribute is derived from metadata associated with the first media file. In one embodiment, the attribute may comprises an artist name, an album name, a media file name, or an id associated with the first media file.

In one embodiment, the first media file comprises an audio file or a video file.

In one embodiment, the relationship data is stored as a graph with a media file of the playlist associated to vertexes of the graph and edges of the graph represent relationships between the media file. In a further embodiment, the edges contain weights corresponding to the strength of the relationships. In one embodiment, the relationship data may be based on explicit user behavior or based on implicit user behavior. In one embodiment, the playlist comprises at least one media file identifier associated with a media file. In a further embodiment, the media file identifier may comprise a pointer or uniform recourse locator. In one embodiment, the media file identifier is associated with a media file that can be acquired by streaming the media file, associated with a media file that can be downloaded, or is associated with a media file that can be located on a user's computing device. In one embodiment, the remote location may comprise a server, a database located on a server, a database located on the internet, or a remote computing device.

In one embodiment, a user interface for creating a playlist comprises a first area for identifying a media file identifier associated with a media file from a media file source; a first user interactable indicia representing a variable playlist parameter selection action, the selection being related to the indicia such that interaction with the indicia signals a program that causes the playlist parameter to influence a playlist creation; a second user interactable indicia representing a playlist creation action, the creation being related to the indicia such that interaction with the indicia signals a program that causes a creation of the playlist, the playlist based on a data set associated with the media file, the playlist parameter, and relationship data; and a second area for displaying the playlist.

In one embodiment, user interface further comprises a third area for displaying the media file identifier upon the identification.

In one embodiment, user interface further comprises a third user interactable indicia for playing the playlist.

In one embodiment, user interface further comprises a third user interactable indicia representing a random media file identifier selection action, the random selection being related to the indicia such that interaction with the indicia signals a program that causes a random selection of the media file identifier from a media file source.

In one embodiment, the media file source may be an on demand streaming media service, a local media library, a mixture of a on demand streaming media service and a local media library.

In one embodiment, the playlist parameter comprises a size parameter for influencing a total size of the playlist. In one embodiment, the total size may be based on a number of media files, based on a temporal length, or is based on a file size.

In one embodiment, the playlist parameter comprises a source parameter for influencing a media file source of a media file to be included in the playlist. In one embodiment, the media file source may be an on demand streaming media service, a local media library., and a mixture of a on demand streaming media service and a local media library.

In one embodiment, the playlist parameter comprises a popularity parameter for influencing a degree of popularity associated with media files of the playlist.

In one embodiment, the playlist parameter comprises a date released parameter for restricting media files of the playlist to a time period. In one embodiment, the time period comprises an era defined by two years.

In one embodiment, the playlist parameter comprises a diversity parameter for influencing a degree of occurrence of similar media files within the playlist as compared to the identified media file.

In one embodiment, the first user interactable indicia comprises a user interface element that may be varied from a first selection position to a second selection position, and where the first position represents a low level of diversity between the selected media file and candidate media files from the media file source and the second position represents a high level of diversity.

In one embodiment, the first user interactable indicia comprises a user interface element that may be varied from a first selection position to a second selection position, and where the first position represents a low level of popularity of candidate media files from the media file source and the second position represents a high level of popularity.

In one embodiment, wherein the first user interactable indicia comprises a user interface element that may be varied from a first selection position to a second selection position, and where the first position represents a local media file source of candidate media files and the second position represents a remote media file source of candidate media files. In one embodiment, wherein the local media file source may be a local media library or an on demand streaming media service.

In one embodiment, the first user interactable indicia comprises a user interface element comprising a drop down menu for selecting a size criteria and a text field box for receiving text representing a numerical value corresponding to the size criteria.

In one embodiment, the first user interactable indicia comprises a user interface element comprising a menu for selecting a time period so that media files may be selected that are recordings having dates of authorship or publication that fall within the selected time period.

BRIEF DESCRIPTION OF THE DRAWINGS

The following drawing figures, which form a part of this application, are illustrative of embodiments of the present invention and are not meant to limit the scope of the invention in any manner, which scope shall be based on the claims appended hereto.

DETAILED DESCRIPTION OF PREFERRED EMBODIMENTS

Figure 1:
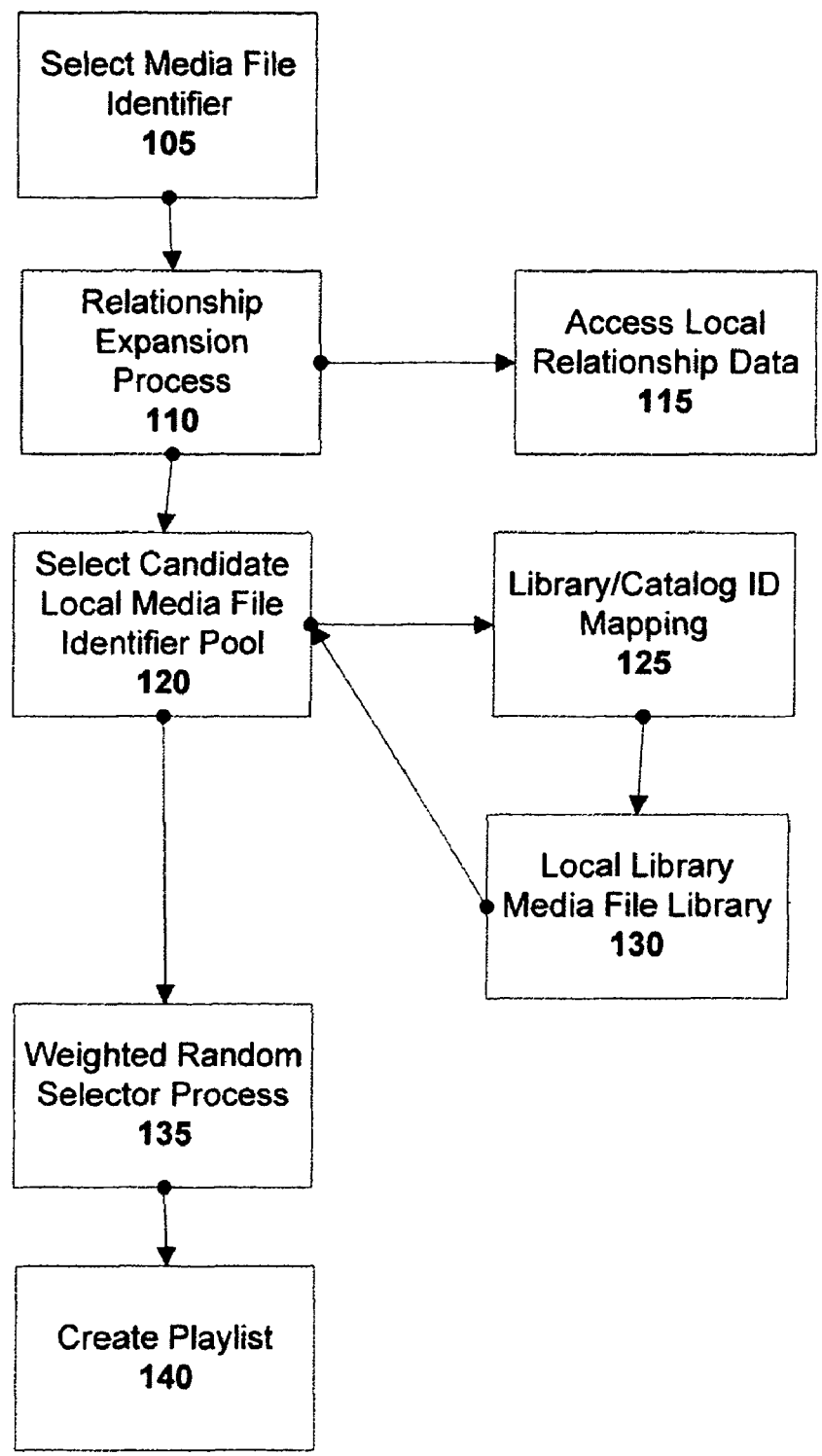
FIG. 1 is a flowchart depicting a process of generating a playlist according to one embodiment of the present disclosure.

In general, the present disclosure includes a method, system, and user interface for creating a personalized and customizable playlist.

Certain embodiments of the present disclosure will now be discussed with reference to the aforementioned figures, wherein like reference numerals refer to like components.

One embodiment of the present disclosure includes a method and system for creating a personalized and customizable playlist through an intuitive user interface. Moreover, if desired, the playlist can be generated within minimal explicit user input.

In one embodiment, whenever the playlist creation application is first launched or when the application is launched and has access to a server, an initialization sequence occurs. In one embodiment, the initialization sequence correlates some or all of a user's local media files with an associated ID and appropriate relationship data.

The playlist creation application may be represented as a jukebox application. In one embodiment, the playlist creation application may be incorporated into a media management program. Further, the playlist creation application may be client-based, server-based, network-based, or any type of jukebox application that a user can access. Similarly, the server can be a centralized music information server which connects to the user's local processor via the internet.

Figure 45:
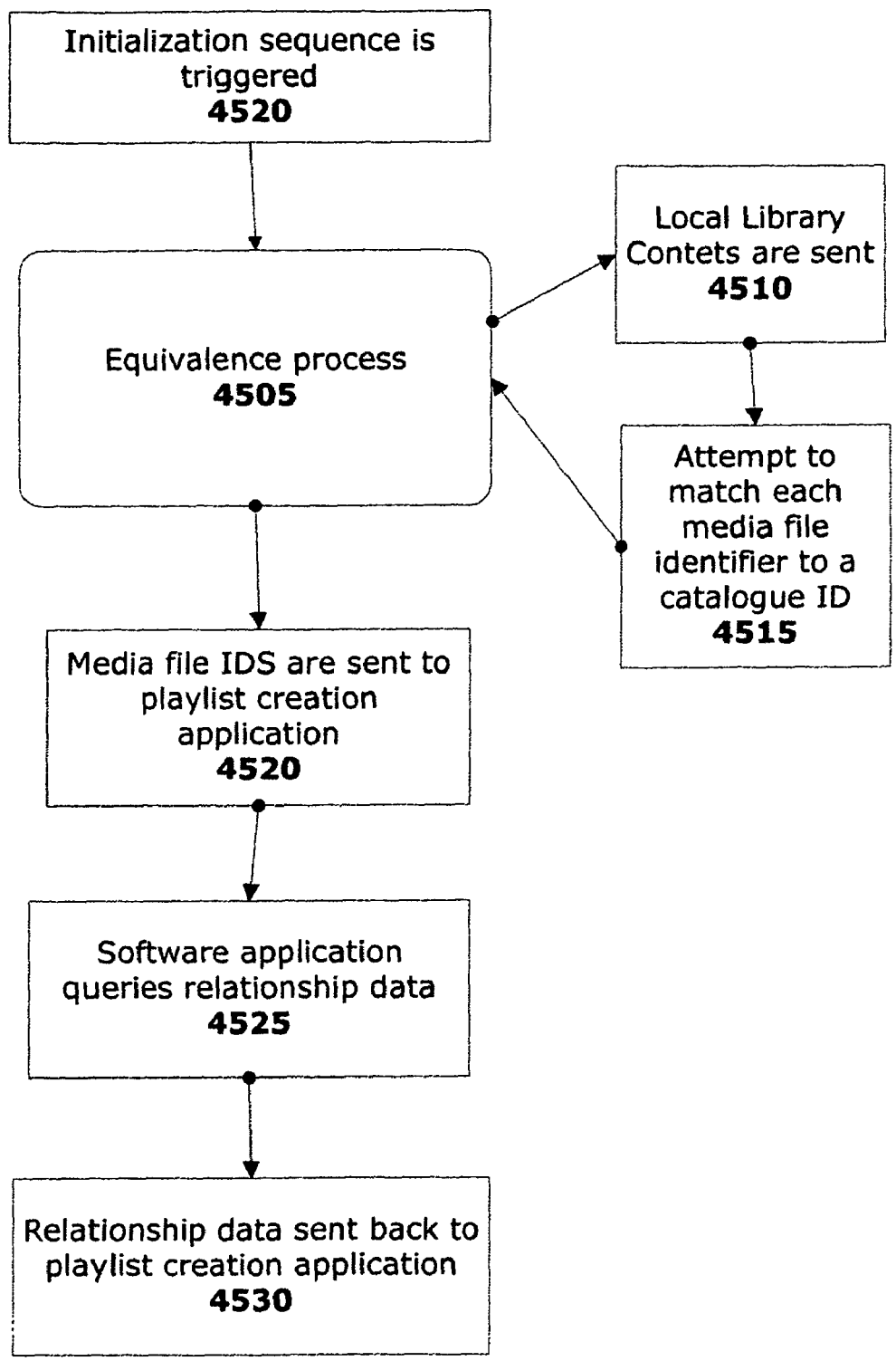
FIG. 45 is a flowchart depicting a process of an initialization sequencing process according to an embodiment of the present disclosure.

An exemplary embodiment of an initialization sequence between the system's software application is depicted in FIG. 45. As depicted in FIG. 45, when the initialization sequence is triggered 4500, a user's local library contents go through a text matching process or an "equivalence" process 4505-4515. The initialization sequence may be triggered 4500 by any number of events. For example, when the playlist creation application first launches or when the playlist application comes back into communication with a server, another computing device, the internet, or any other remote location.

Referring to FIG. 45, the playlist creation application sends 4510 a list of the local media file identifiers to a server. Then, the server attempts to match 4515 each media file with a catalogue ID In one embodiment, the catalogue ID may be defined by an entity or person such as an online community or an on demand streaming media service. It is contemplated that not all media file identifiers associated my media files will have a corresponding catalog ID or will not be capable of being matched. Typically, this can occur where a media file has been ripped or contains unfamiliar metadata. In one embodiment, these unrecognized media file identifiers (media file identifiers with no corresponding catalogue ID) are not excluded from the playlist. In one embodiment, the equivalence process is facilitated by an equivalence engine located on a server. Further, in another embodiment, a media file identifier is equivalenced (text matched and identified) and the relationship data associated with a media file are time-stamped. Thus, each time the user launches the application and/or connects to the server, the system can determine whether more recent data is available by looking at this time-stamp. If more recent data is available, then the data is updated. Therefore, the playlist is considered dynamic as its foundational data can be continuously updated.

Once the media files have been equivalenced 4515, the server sends 4520 the media file IDs back to the playlist creation application. Next, the playlist creation application queries 4525 the server for a set of relationships or affinities (artist or genre based). Then, the server sends 4530 the relationship data back to the playlist creation application. The relationship data is discussed in greater detail herein. In one embodiment, the playlist creation application communicates with a database which stores these relationships. For example, in an embodiment where the playlist creation application resides on the user's local processor, the processor will house this relationship database.

Therefore, after the initialization sequence has finished, the playlist creation application, wherever located, has access to a set of media file identifiers, IDs, and relationship data. Accordingly, this information can be used to create a customized playlist either completely locally or in conjunction with a server.

The present disclosure contemplates several ways and methods for creating a customized playlist. In one exemplary embodiment, a playlist may be created completely locally. For example, a user may wish to create a playlist using solely local media files on his/her computing device without being online or having to access a centralized music server. In one embodiment, a computing device may comprise a personal computer, a personal digital assistant or cellular telephone. In another embodiment, a playlist may be created using solely server-based media files and resources. In a further embodiment, a playlist may be created using a combination of both local media files and server-based media files.

A playlist may be created locally when a user desires to create a playlist containing any amount of local media files whether or not in conjunction with media files located on a server or when a user desires to creation a playlist on the user's computing device without being online or having to access a centralized music server or to a remote media file and/or relationship data source. Thus, the relationship data used to create the playlist is loaded to a local media device so that the device can create a playlist completely locally, without communicating with a server. Meaning that, the computing device has the ability to have received and store relationship data so that is may generate the interactive playlist without being online or in communication with a server or any other external component. In a further embodiment, each time the relationship data is downloaded to an offline computing device, this event is time stamped. Thus, when the offline device is able to re-connect or is online again, the system can read the time-stamp and evaluate whether more recent relationship data is available to download to the device. Thus, a user can receive the most recent relationship data on the computing device.

Figure 2:
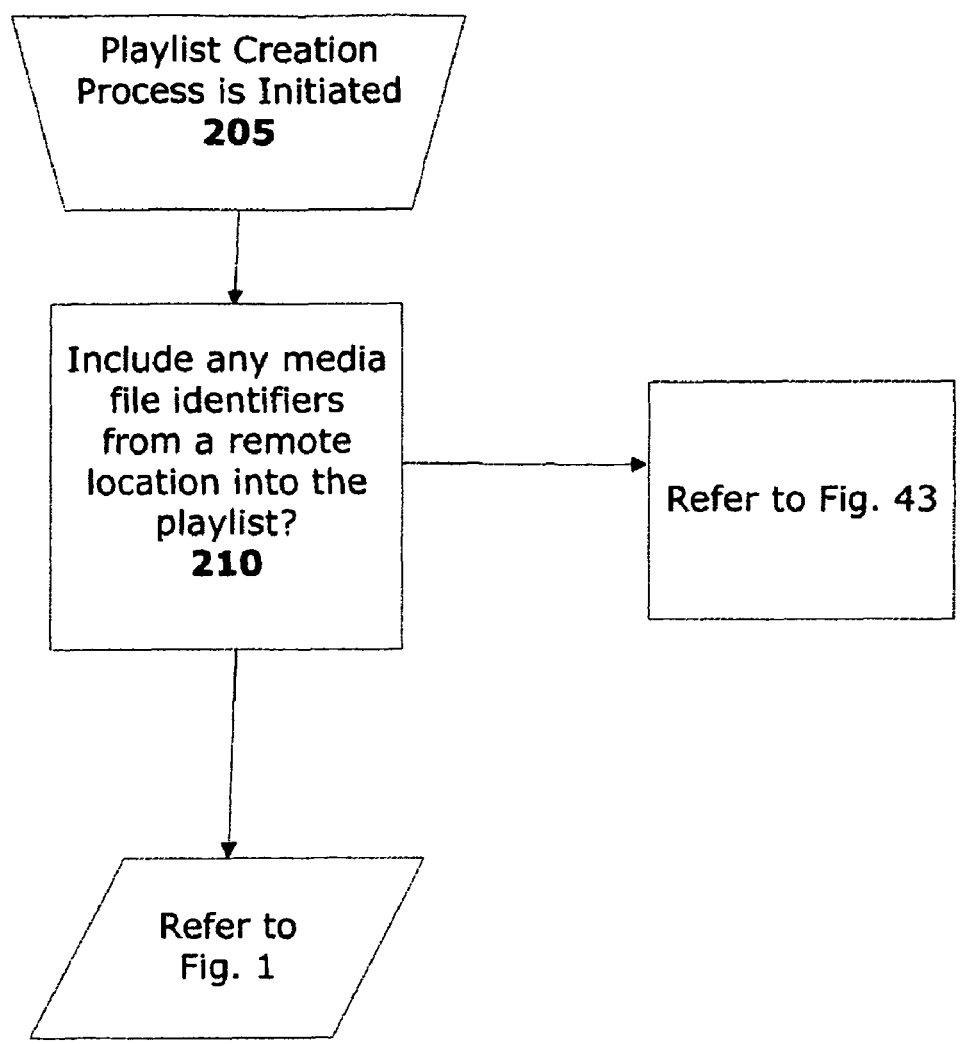
FIG. 2 is a flowchart depicting a process of generating a playlist according to one embodiment of the present disclosure.

FIG. 2 depicts an overview flowchart of creating a playlist in an embodiment. As depicted in FIG. 2, the playlist creation process is initiated 205. The playlist creation process may be initiated by any number of events such as a use selecting at least one media file identifier and then selecting a user interface indicia representing a desire to create a playlist. Then, it is determined 210 whether any media files from a remote location (any location remote from the local media library) should be included in the playlist. In one embodiment, this is determined by a source parameter setting. As discussed herein, a source parameter allows the user (or the playlist creation application by a default setting) to specify the source of media files to be included in the playlist. In one embodiment, the source parameter has settings ranging from media files exclusively from the user's local media library to files exclusively from a server, to a mixture of both sources.

Figure 43:
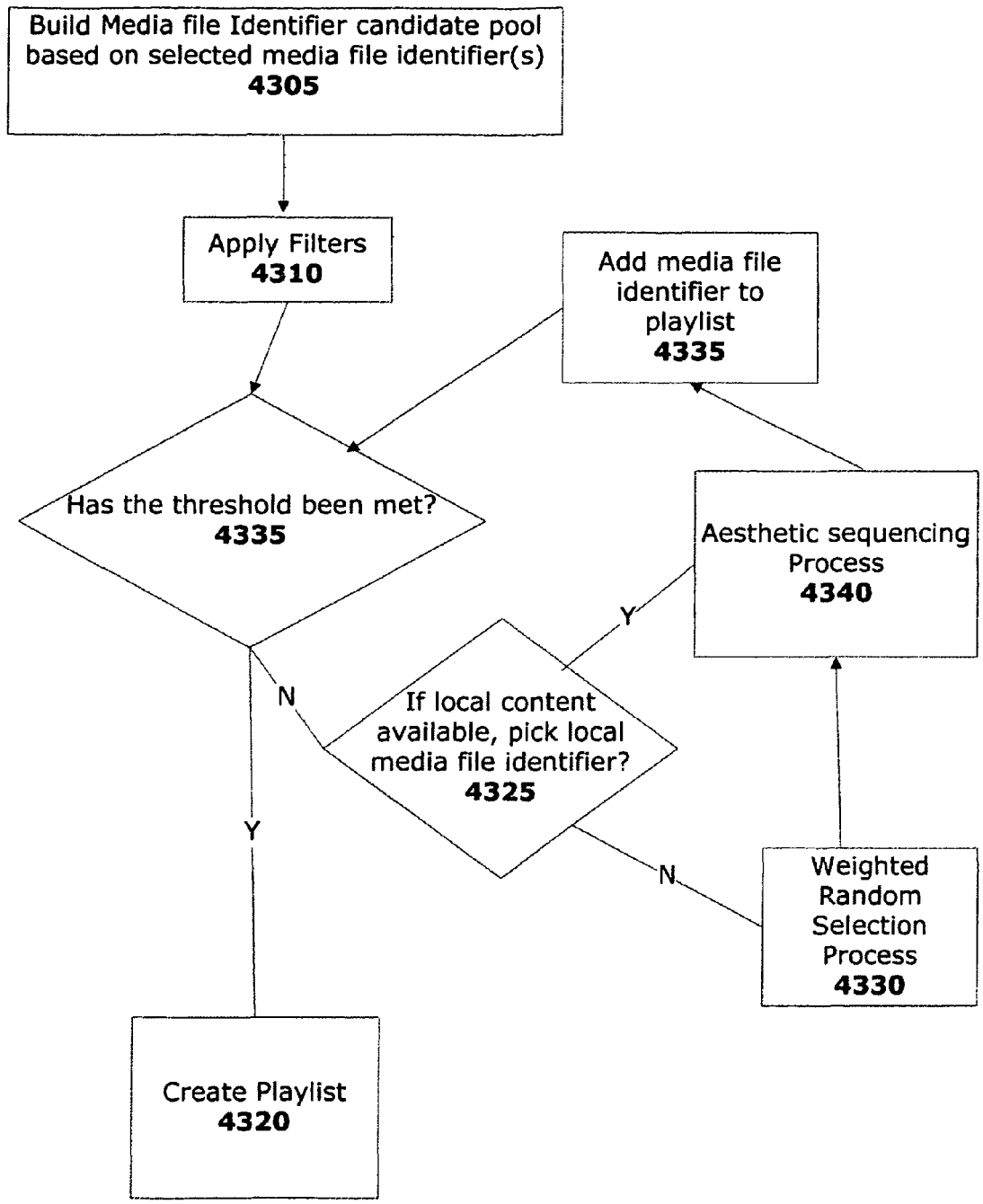
FIG. 43 is a flowchart depicting a process of generating a playlist according to one embodiment of the present disclosure.

In one exemplary embodiment, if the source parameter indicates that any level of local media files are to be used in the playlist, then a process as depicted in FIG. 1 may be followed. Further, if the source parameter indicates that any level of media files should be from a server (including any level of local media files), the playlist may be built using a process as depicted in FIG. 43. Of course, many combinations of processes described herein are contemplated.

One exemplary embodiment of creating a play list locally is depicted in FIG. 1. As depicted in FIG. 1, at least one media file identifier associated with a media file is selected 105. In one embodiment, a media file identifier is associated with a media file and may comprise a text string representing a name, a pointer, a uniform, resource locator, or any other type of information associated with the media file. In another embodiment, the media file identifier may be user-defined or server-defined. The various methods for selecting media file identifiers is described in further detail herein. These media file identifiers associated with media files provide the basis for which media file identifiers are included in the generated playlist.

Figure 28:
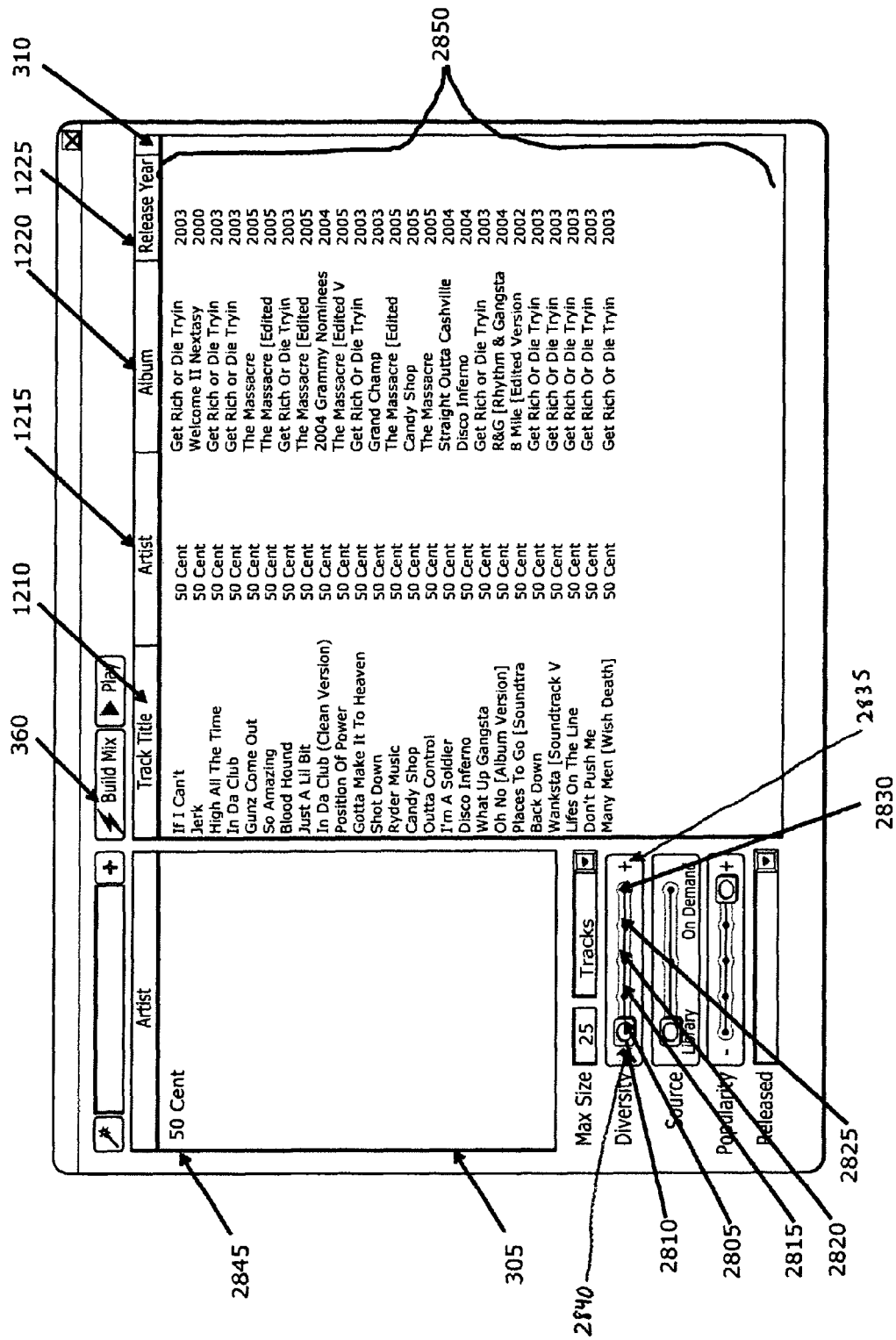
FIG. 28 is an exemplary user interface according to an embodiment of the present disclosure.
Figure 29:
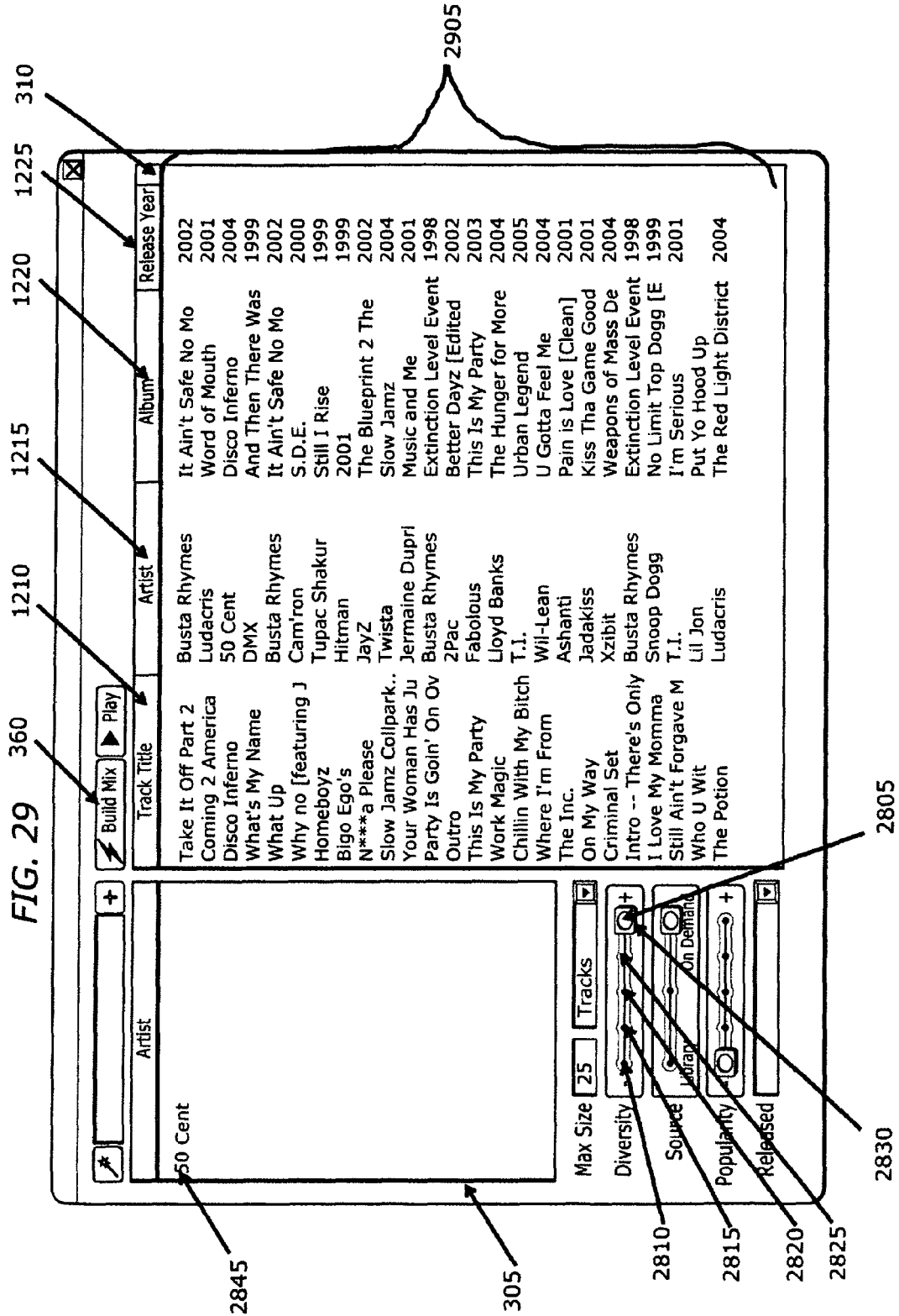
FIG. 29 is an exemplary user interface according to an embodiment of the present disclosure.

Referring back to FIG. 1, once the selected media file identifier(s) are selected 105, a relationship expansion process 110 begins. In general, the relationship expansion process 110 considers the list of selected media file identifier(s) and creates a new list by including all the potential related media file identifiers with respect to the selected media file identifier(s). In one embodiment, this list comprises one or more media file identifiers each associated with a media files. In one embodiment, the new list is based on relationship data. In one embodiment, relationship data can be based on relationships related to artist, genre, era, album, media file, or any other meaningful or identifiable of relationship between items of media. In one embodiment, the relationship expansion process is based on a diversity parameter setting. In one embodiment, the diversity parameter is based on the degree of variety or sameness between the media file identifiers of the play list and the selected media file identifiers(s). In other words, the degree of diversity of the media files similar to the selected media file identifiers appearing on the playlist. Thus, the user can select media file identifiers associated with media files using the diversity parameter to specify whether the generated playlist contains media files having a low level of variety or diversity to a high level of variety or diversity with respect to the selected media file identifier(s). In one embodiment, the relationship expansion process will occur when the diversity setting is at any position greater than the lowest value. In one embodiment, the diversity parameter setting is user selectable. In another embodiment, the diversity parameter setting is set to an automatic default position or level. For example, referring to FIGS. 28 and 29, they depict an exemplary user interface which comprises a slider representing the diversity parameter and its settings. As depicted in FIGS. 28 and 29, in one embodiment, the relationship expansion process will occur when the diversity slider is at position 2815-2830, but not 2810 which corresponds the lowest level of diversity. In other words, when the slider is set to 2810, the playlist will only contain media files identifiers with the same artist as the select media file identifier(s).

Accordingly, in one embodiment, when the diversity setting is at any position other than the lowest level of diversity, the system will expand the list of media file identifiers depending on the particular level of diversity selected. Typically, the higher level of diversity chose the longer list expansion.

Turning back to FIG. 1, the relationship data 115 stored locally is used to calculate the new relationship list. In one embodiment, the relationship data is stored locally by first downloading the relationship data from a server to the computing device. In a further embodiment, the device can receive updated relationship data when the device is able to communicate with a server. For example, a computing device will receive updated relationship data anytime it has online access or by receiving a wireless or satellite update.

In one embodiment, the selected media file identifiers are related to the media file identifiers of the generated playlist through artist relationships, meaning, that the media file identifiers which are ultimately selected for the playlist are selected partially based how the artists associated with those media files relate to the artists associated with the selected media file identifier. In other words, a degree of relatedness between the artist associated with the media file associated with the selected media file identifier can partially determine which media files (dependent on their associated artists) are selected to be included. Therefore, selection of media files for the generated playlist can be based on artist relationships, particularly on a degree of relatedness or similarity between artists.

In another embodiment, the selected media file identifiers are related to the media files identifier's playlist through genre-based relationships. Meaning, that the media files associated with the media file identifiers which ultimately included in the playlist are selected partially based how the genres of those media files relate to the genres associated with the selected media file associated with the media file identifiers. In other words, a degree of relatedness between the selected media file identifiers particular genre can partially determine which media files (dependent on associated genre artists) are selected to be included playlist. Therefore, selection of media files for the playlist can be based on genre relationships, particularly on a degree of relatedness or similarity between genres and sub-genres.

In another embodiment, the selected media file identifiers are related to the media file identifiers in the playlist through track relationships. Meaning, that the media files associated with the media file identifies are included in the playlist are selected partially based how the media files or the attributes of the media files themselves relate to the media files associated with the selected media file identifiers, e.g. volume, tempo, rhythm, key etc. In other words, a degree of relatedness between the particular selected media file identifiers can partially determine which media files associated with the media file identifiers (dependent on the attributes of the media file) are included in the playlist.

Thus, the relationship expansion and inclusion process can be applied to any meaningful set of relationships, by way of non-limiting example artist-to-artist relationships, album-to-album relationships or media file-to-media file relationships.

Turning back to FIG. 1, once the new relationship list is determined 110, a pool of candidate media files is created 120. In one embodiment, this pool of candidate media files is a list of media files associated with the relationship list (based upon any meaningful category such as artist, album, media file, and/or genre) determined at step 110. In one embodiment, as depicted in FIG. 1, each media file's identifier is mapped to an artist ID 125, then, the local media library is scanned 130 to determine which media file identifiers related to each ID should be selected for the pool of media file identifiers. Thus, a pool of candidate media file identifiers, each associated with a media file is created 120.

Once the pool of candidate media file identifiers is created 120, each media file identifier is processed 135 by a weighted random selector. In one embodiment, the weighted random selector considers a score associated with each media file. In one embodiment, each score may be based on a normalized popularity value and a popularity parameter setting. In an alternate embodiment, the score computation can be based on any number of available metadata. In one embodiment, the weighted random selector process works to select the media file identifier from the pool of candidate tracks to be included in the playlist. Thus, the weighted random selector will choose the media files for the playlist and thus the playlist is created 140.

FIG. 43 depicts an exemplary embodiment of creating a playlist using media files from a remote location (or in other embodiments some local media files as well). As depicted in FIG. 43, first, a candidate pool based on the selected media file identifiers is determined 4305. In one embodiment, the candidate pool of media file identifiers is based on the artists associated with the selected media file identifiers and a diversity parameter setting. Meaning, the size and variety of the candidate pool will depend on the artists associated with the selected media file identifier(s) and the level of diversity selected. In further embodiments, any metadata or, information associated with the media file, or combinations thereof could be used as criteria for this initial set of candidate media file identifiers. In another embodiment, any relationship data may be used as these criteria. For example, an initial pool could be created from media popular during a certain time period. In another example, the candidate pool may be created based on the album or genre associated with the selected media file identifiers.

After a pool of candidate media files is created 4305, filters may be applied to the candidate pool 4310. In one embodiment, a filter can include a time parameter. For example, a release date or era as described above.

Next, the system determines 4315 whether the pool of candidate media files has reached the maximum size as set by the size parameter. For example, the maximum size can be in terms of time or file size. In another embodiment, this threshold can be reached 4335 when the pool of local resources has been exhausted. If the candidate pool has reached this maximum size, the playlist is generated from this pool and returned to the user 4320. If the candidate pool is below this maximum size, it is determined whether to add a media file from the user's local media library 4325. In one embodiment, the media file from the local library is chosen via a process as depicted in FIG. 1. In another embodiment, it is determined whether to pull media files from a user's local media library via a random selection algorithm. The random selection algorithm randomly selects between local media files and server-based media files. If the system determines that a media file should be selected from the user's local library, the system selects a file from the user's local media library. If the system determines that a media file should be selected from the server, the system queries a weighted random selector to select a media file or track from a server-based candidate pool 4330. In one embodiment, the weighted random selector is based on the popularity parameter setting.

Regardless of whether the system selects a media file from the user's local media library or a server, the media file is processed through an aesthetic sequencing process 4330.

In one aspect, the aesthetic sequencing process 4330 ensures that the generated playlist is visually or auditorially and functionally pleasing to the user. In one embodiment, the aesthetic sequencing process including anti-clumping feature.

In one embodiment of the anti-clumping will now be described in greater detailed. The anti-clumping feature prevents, at times, the same types of media files from being included consecutively in the interactive playlist. In one embodiment, this may be based on the associated artists, albums, genre, era or any other meaningful category associated with the media files. In one embodiment, the anti-clumping feature queries a queue containing a list of existing media files already included in the playlist. In further embodiments, a media file will be considered repetitive only if the associated artist (or album, genre, meaningful category) has appeared a certain number of times. This prevents the system from excluding a media file simply because its associated artist or other type of associated category has only appeared once in the interactive playlist. If the media's files artist or other associated category has already appeared in the playlist more than the pre-determined amount of times, to avoid consecutive repetition, a media file associated with that same artist or other category will not be selected. Then, the system will go through the media file selection process until it finds a non-repetitive media file and the system will update the queue.

Figure 47:
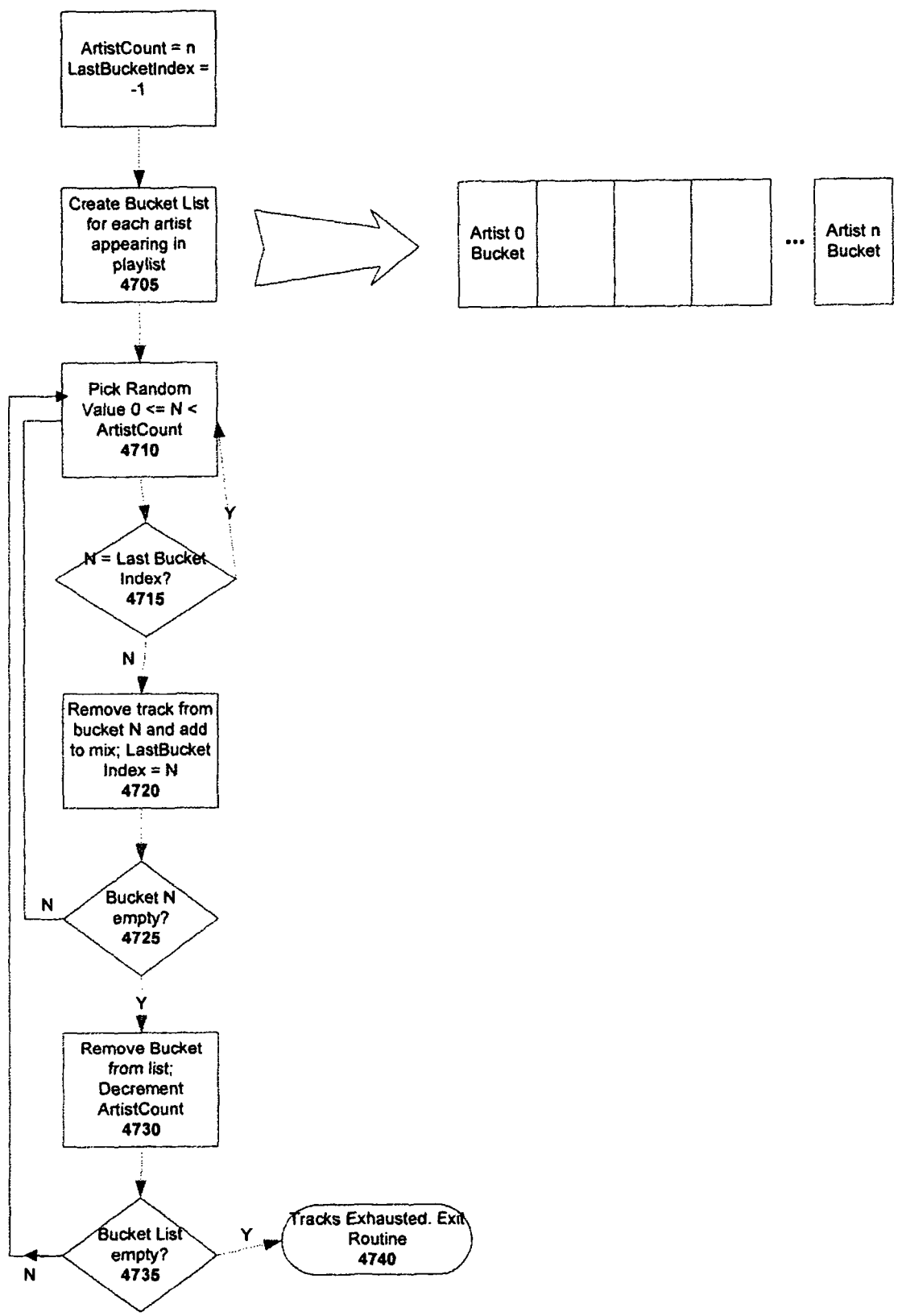
FIG. 47 is a flowchart depicting a process anti-clumping logic according to an embodiment of the present disclosure.

In one embodiment, the type of anti-clumping logic to be applied is determined by diversity parameter setting. One exemplary embodiment of anti-clumping logic is depicted in FIG. 47. Specifically, the anti-clumping logic in FIG. 47 applies when the diversity parameter is at the lowest level and when there is at least more than selected media file identifier. As depicted in FIG. 47, a set of "buckets" is created 4705 which contain candidate media items for each selected media file indicator. In another embodiment, each "bucket" comprises of an individual random weighted selectors limited to the context of individual artists. The final mix is created by randomly selecting a bucket 4710 and removing one of its candidate media items, iteratively 4720. This process continues until either the playlist size limit has been met 4715 or the buckets are exhausted 4725. When the media contents of a bucket are exhausted 4725, the bucket is removed from further consideration 4730. Anti-clumping is achieved by maintaining the index of the last bucket used and the random bucket selection process continues until the last bucket used is not selected.

Figure 46:
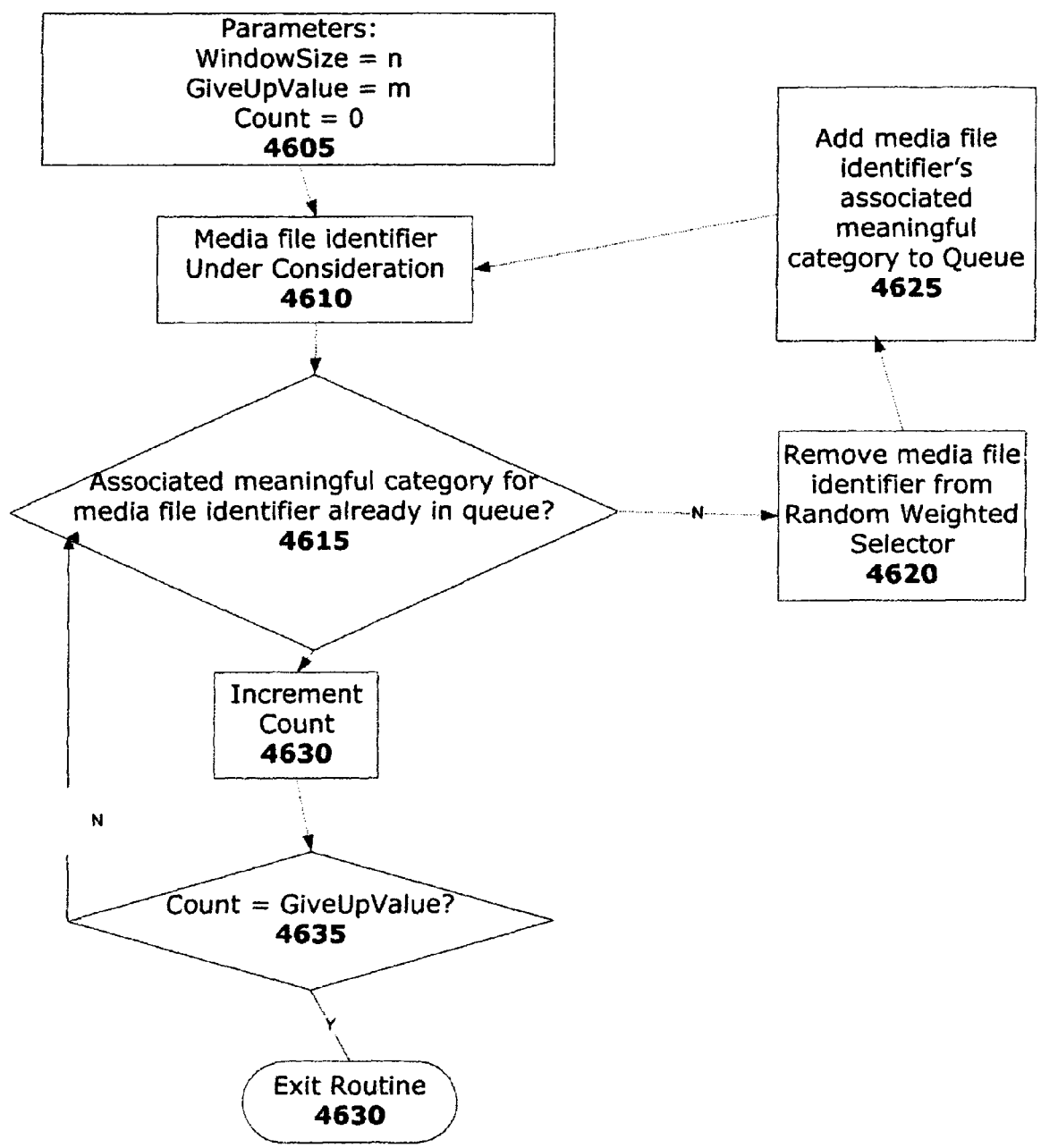
FIG. 46 is a flowchart depicting a process anti-clumping logic according to an embodiment of the present disclosure.

Another exemplary embodiment of anti-clumping logic is depicted in FIG. 46. Specifically, the anti-clumping logic in FIG. 46 applies when the diversity parameter is any level greater than the lowest level. As depicted in FIG. 46, the anti-clumping logic has several parameters 4605. In one embodiment, these parameters include a window size, a "give up" value, and a count. The window size correlates to the desired number of tracks or media files in which a particular artist (album or genre or other meaningful category) should not be repeated. For example, a window size could be set to the number three, meaning that for every three tracks; a particular artist cannot appear more than once within that window of three tracks. The "give up" value could correspond to the point at which an artist' diversity has been exhausted and repetition may be necessary. Accordingly, the count parameter refers to the current number of media files in the queue. In one embodiment, the media files located in this queue are those media files that will become a part of the generated playlist.

Next, for each track the system asks whether the associated artist is already in the queue 4615. In one embodiment, the queue length is equal to the window size parameter. If the artist is not in the queue, then the track is removed from the weighted random selector 4620 and the track is added to the artist queue 4625. Then, the system goes to the next track in consideration in the weighted random selector 4610. If the artist is already in the window size, the count is increased by one 4630.

After the count is increased by one 4360, the system determines whether the current count has reached the "give up" value 4635. If the current count equals the "give up" value, then the routine is ended 4640. In one embodiment, when the routine is exited or ended, the remaining tracks from the weighted random selector are added directly into the playlist.

If the count value has not reached the "give up" value, then the next media file from the weighted random selector is considered 4610 and the aesthetic sequence process begins again.

As depicted in FIG. 43, once each media file or track has gone through an aesthetic process 4340 as described above, the media files or tracks are added to the generated playlist 4335. This process continues until the playlist's maximum size is reached 4335 or the pool of local resources has been exhausted. Then, the interactive playlist is now created and sent to the user 4320.

Figure 42:
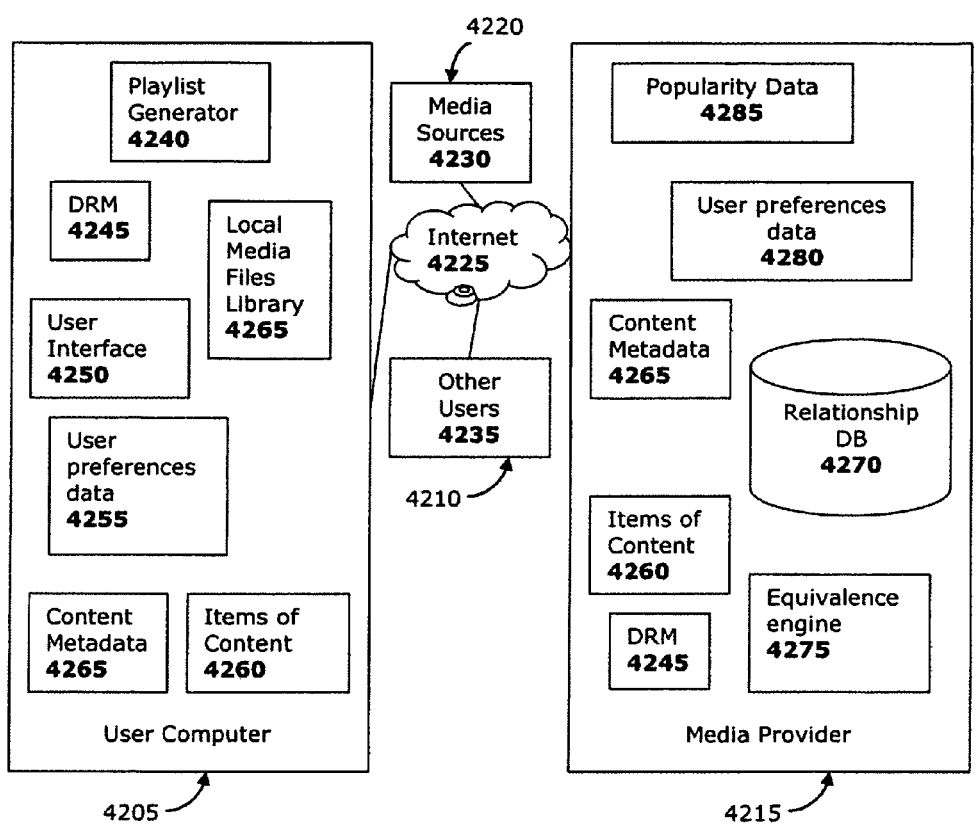
FIG. 42 is a system configuration or architecture according to an embodiment of the present disclosure.

In one embodiment, the system, method, and user interface of the present disclosure functions as a part of an overall system architecture. One exemplary embodiment of a system configuration or architecture is depicted in FIG. 42. As can be seen in FIG. 42, the system architecture comprises a user's personal computer 4205, at least one media source 4230, a media provider 4215, and connection to the internet 4225. Further embodiments may also include at least one other user 4235. In this embodiment, the user's personal computer 4205 further comprises media file metadata 4265, Items of content 4260, user preferences data 4255, User Interface 4250, DRM 4245, a playlist generator 4240, and local media library files 4265. The media provider 4215 further includes media file metadata 4265, items of content 4260, DRM 4245, an equivalence engine 4275, relationship database 4270, user preferences data 4280, and popularity data 4285. It should be noted that these system configurations are exemplary only and it is contemplated that some of the above components may or may not be present in other system configurations depending on the user's needs.

Figure 41:
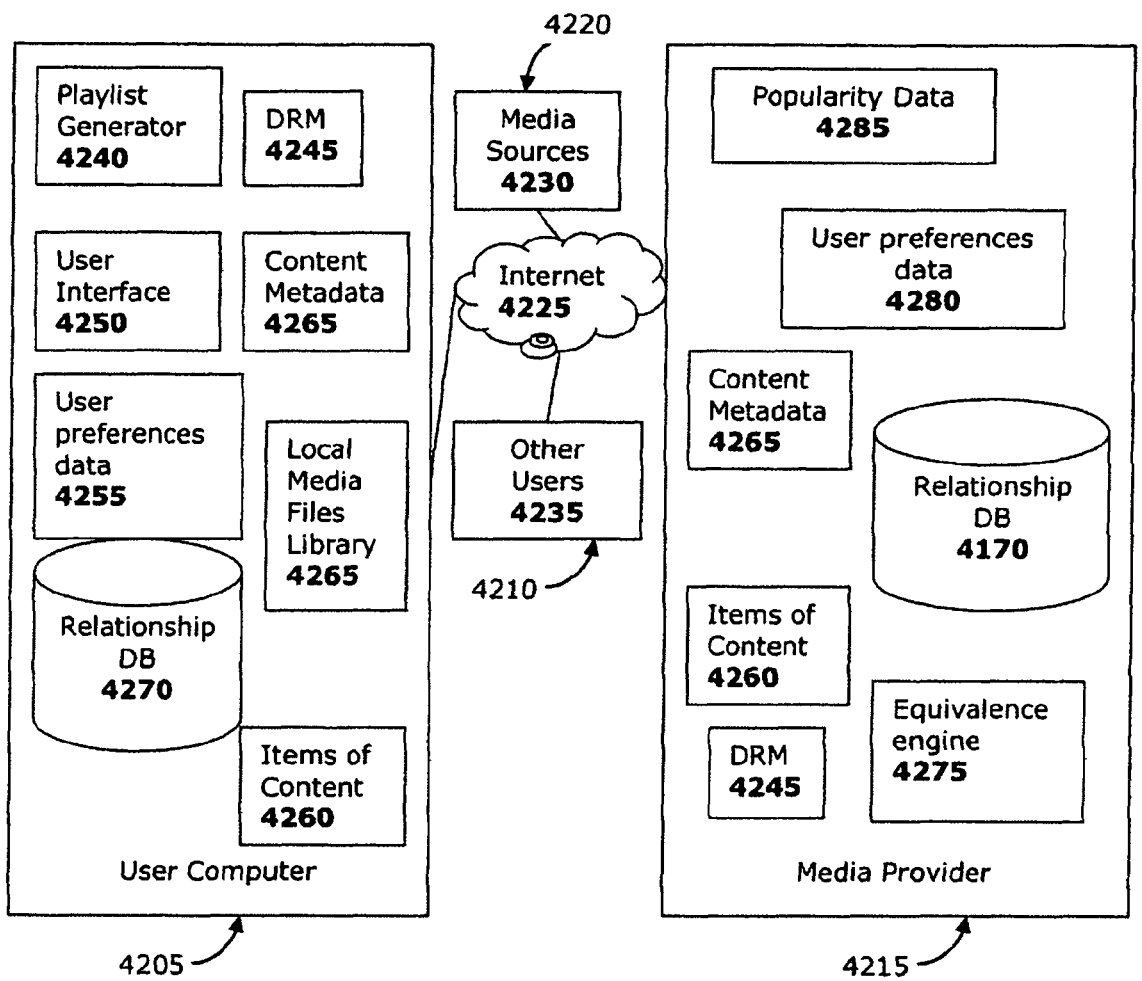
FIG. 41 is a an exemplary system architecture according to an embodiment of the present disclosure.

Another exemplary embodiment of a system configuration or architecture is depicted in FIG. 41. As can be seen, FIG. 41 is very similar to FIG. 42 except that FIG. 41 further comprises relationship database 4170 on the user's local processor or computer device. In one aspect, this allows the user to generate a playlist without having to accessing the relationship database from a remote location such as a server. Furthermore, this allows a user to create a playlist without being online since the relationship data is stored locally.

As stated above, in one embodiment, the method, system, and user interface for generating a playlist comprises a user selecting media file identifier(s). In a further embodiment, the user may select a user input indicia to initiate a playlist generation. In one embodiment, upon selecting media file identifier(s) the selected media file identifier(s) are displayed in a pane dedicated to collecting selected media file identifier(s). In one other embodiment, the user may have to manually import the selected media identifier(s) into the pane dedicated to collecting the selected media file identifier(s). In one embodiment, the playlist is generated from all of the selected media file identifier(s) collected within this dedicated pane. In further embodiments, discussed in greater detail herein, the playlist is generated from all the selected media identifier(s) collected within this dedicated pane and from any parameter(s) and/or filters the user selects. Thus, in one embodiment, the user must first select media file identifier in order to generate the playlist.

The present disclosure provides the user a variety of ways to select media file identifier(s) associated with a media file including, but not limited to, dragging and dropping the media file identifier, entering text representing the media file into a text field box, and/or clicking a tool dedicated to randomly select media file identifier(s) from a local media library. The user is not limited to a single way of selecting media file identifier(s). Accordingly, the user can combine any of the disclosed ways of selecting a media file identifier depending on the user's desires. Furthermore, the user can select as many media file identifiers as the user desires.

In one embodiment, through a user interface of the playlist creation application, the user may select the media file identifiers by dragging and dropping the media file identifier from a window pane into a specific pane of the user interface dedicated to collect the media file identifier(s).

Figure 4:
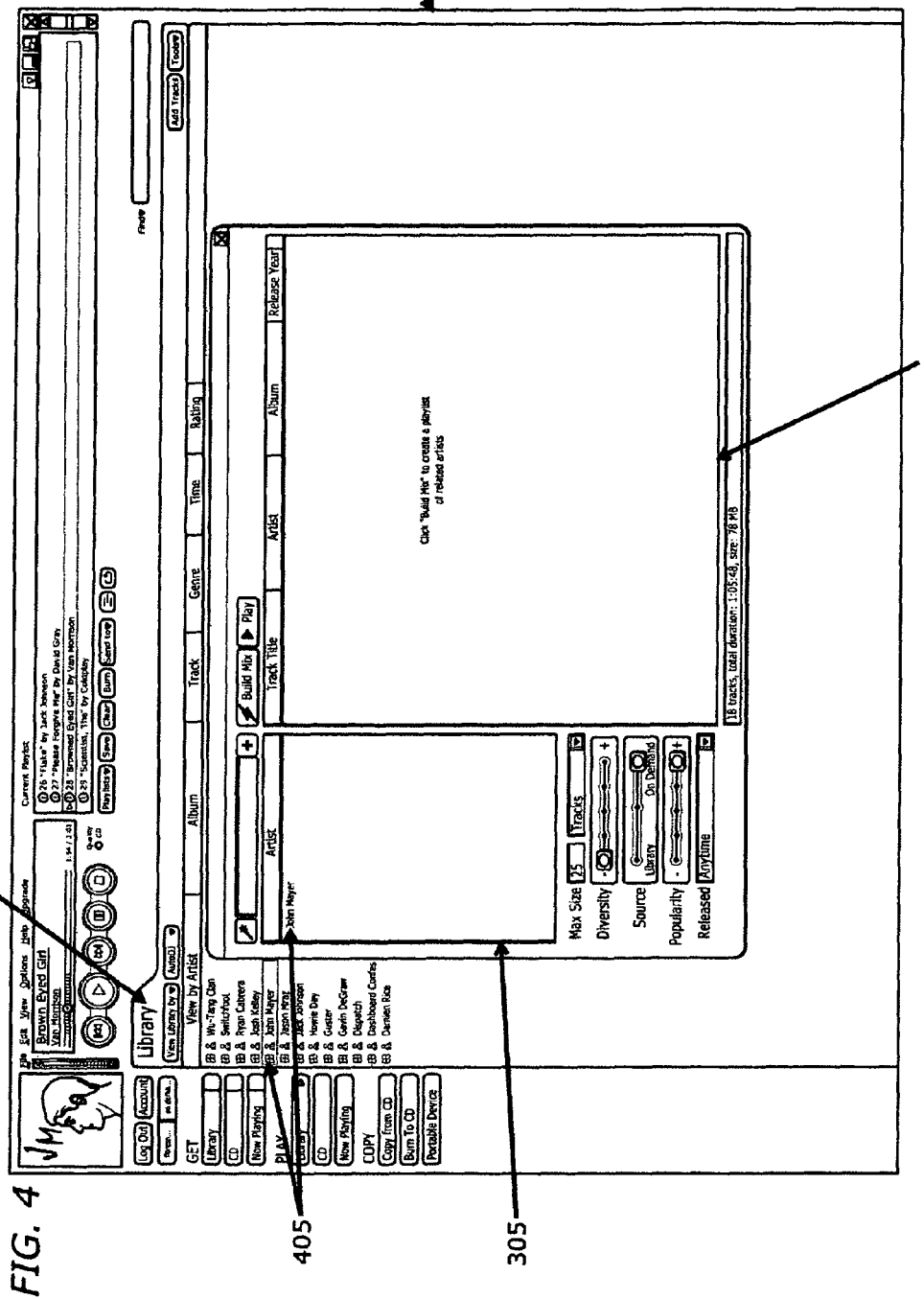
FIG. 4 is an exemplary user interface according to an embodiment of the present disclosure.

As depicted in FIG. 4, the user can select a media file identifier 405 by dragging and dropping the media file identifier 405 from another window pane 400 displaying the user's media library files, into a pane 305 dedicated to collecting all the media file identifier entries. Of course, the user can repeat this process as many times as the user desires.

In other embodiments, the user can drag and drop a media file identifier from various other window panes that contain media files. For example, a user may select media file identifier(s) from a window pane displaying media file identifier(s) available on an on-demand streaming media service. Thus, the embodiments described herein are not limited to any one specific source of media file identifiers, however the features and functions described herein can be applied to any one source or any combination of one or more sources of media or media file identifiers that a user has access to at any point in time, both to identify sources from which to create a playlist and from which to draw items to include in the created playlist.

Figure 5:
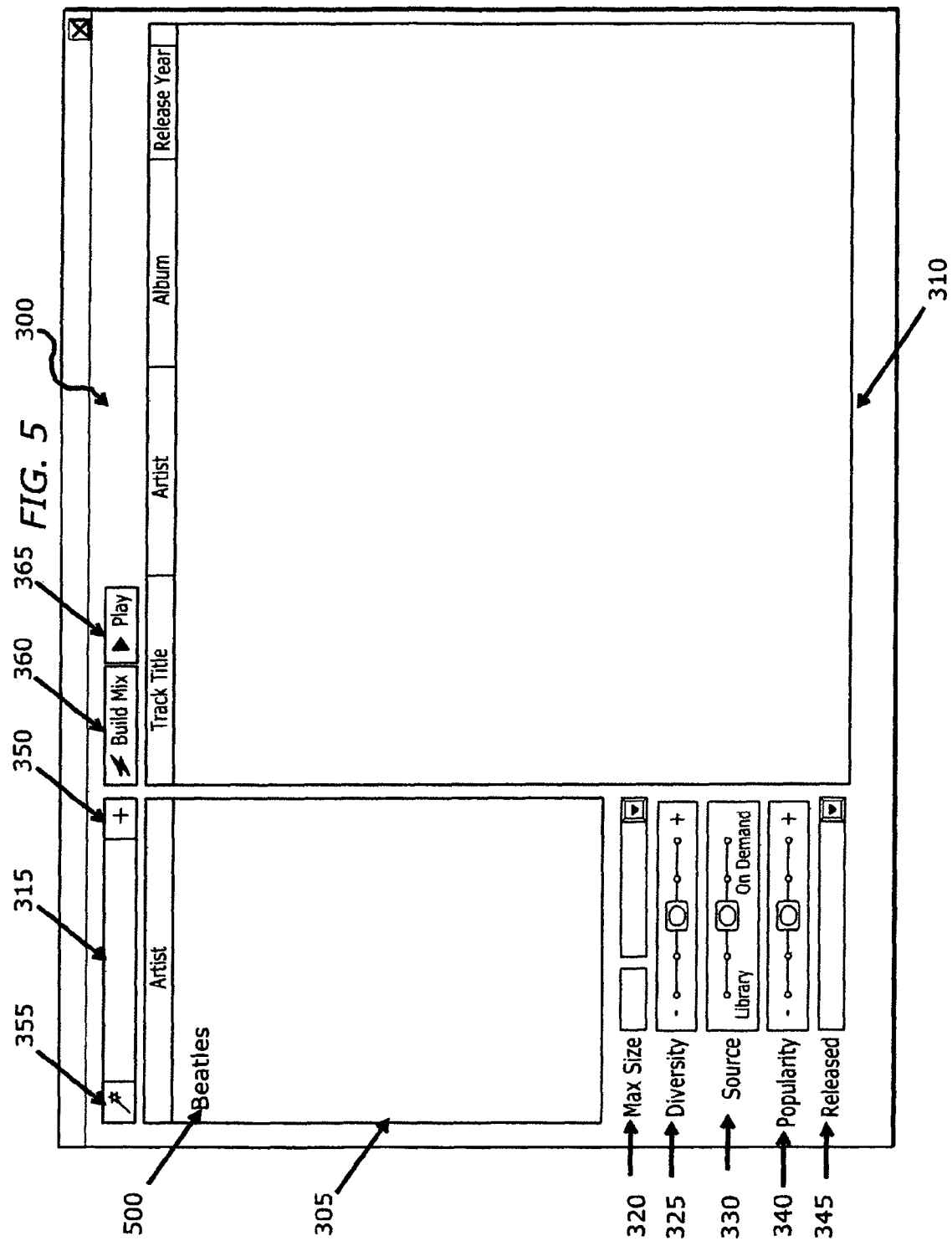
FIG. 5 is an exemplary user interface according to an embodiment of the present disclosure.

In another embodiment, through a user interface of the playlist creation application, the user selects the media file identifier(s) by entering text representing media file identifier associated with a media file into a text field box. After entering the text into the text field box, the user may select a button to import the media file identifier into a pane dedicated to collecting the selected media file identifier(s). This exemplary embodiment is depicted in FIG. 5. As can be seen in FIG. 5, the user enters an artist name 500 associated with a media file into the text field box 315. Then, the user clicks a button 350 to import the media file identifier 500 into a pane 305. Alternatively, the user can import the media file identifier into the pane 305 by pressing a predetermined keyboard key such as the "enter" key. In another alternate embodiment, the user can drag and drop the selected media file identifier in pane 305. As stated above, in the present embodiment, this pane 305 is dedicated to collecting the user's selected media file identifier(s). Of course, the user can repeat this process as many times necessary to populate the pane 305 with as many media file identifier(s) the user desires. It should also be noted that the user can identify and/or select media files by an artist name, media file name, at least one album, a particular genre, a particular era, release year, or any other similar media file attribute.

In another embodiment, instead of entering attributes associated with a media file into the text field box, the user can select media file identifier(s) by clicking a user input indicia representing a tool which will select and populate the text field box with a media file identifier for the user. In one embodiment, the tool is dedicated to randomly select media file identifier(s) from a user's local media library. In one embodiment, the random selection can be done through a random number generator that will randomly select a media file identifier(s) from a user's local media library. In another embodiment, the tool selects media file identifier(s) from a user's local media library based upon the popularity of the media files associated with the media file identifiers. The popularity may be based on the media files' ranking, based upon the degree of frequency the media files are played, or any other basis for selecting media files from a local user library. Thus, this tool assists the user in choosing media files and can further streamline the playlist generation process. For example, if the user cannot remember the media files in their local media file library or simply does not have the time, the user can select the tool which will quickly provide the user with media file identifier(s). The user can use this tool as many times as necessary to retrieve the desired media file identifier(s). Accordingly, each time the user selects the tool, different media file identifiers will be displayed for the user in the text field box.

Figure 6:
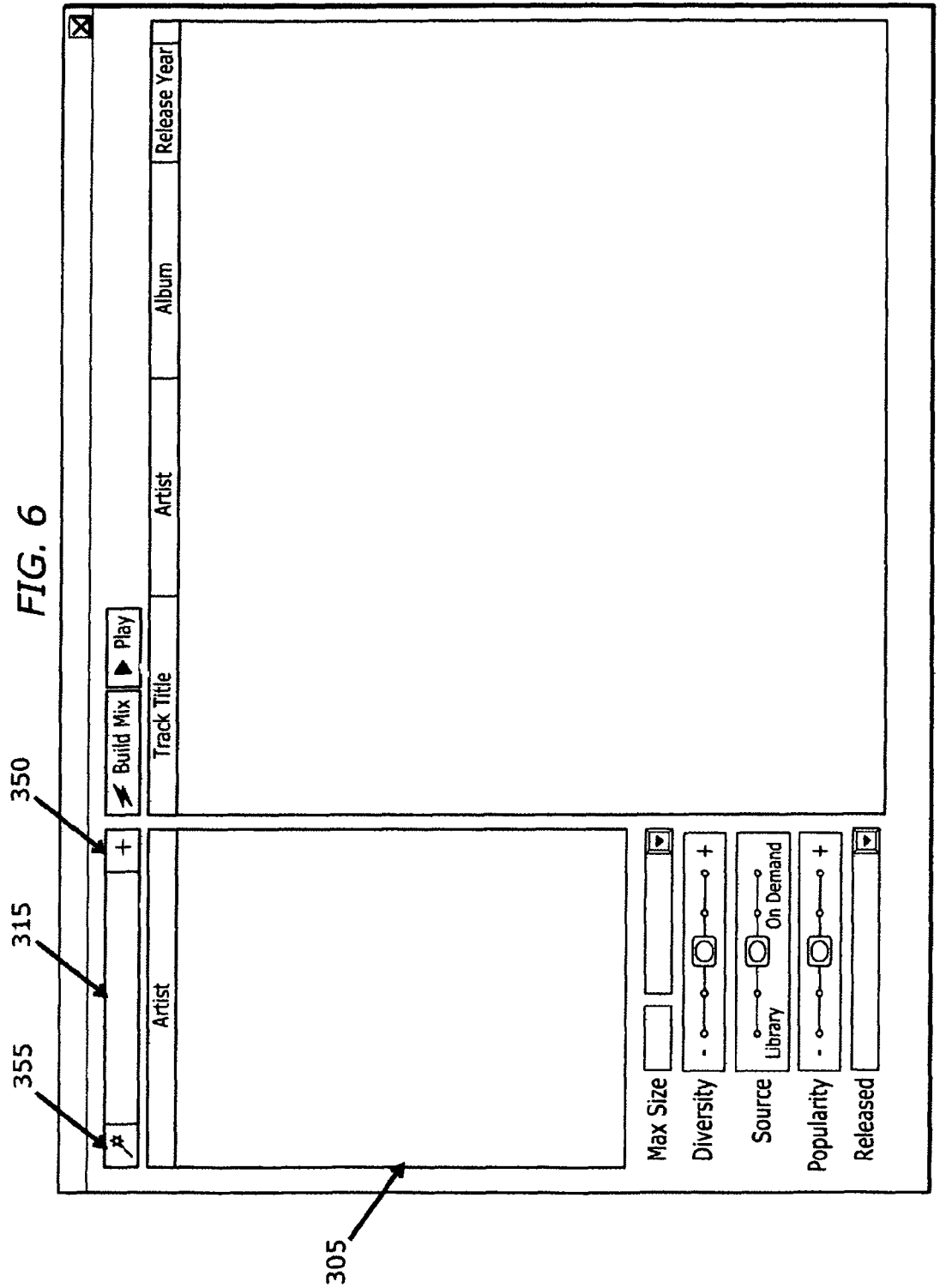
FIG. 6 is an exemplary user interface according to an embodiment of the present disclosure.
Figure 7:
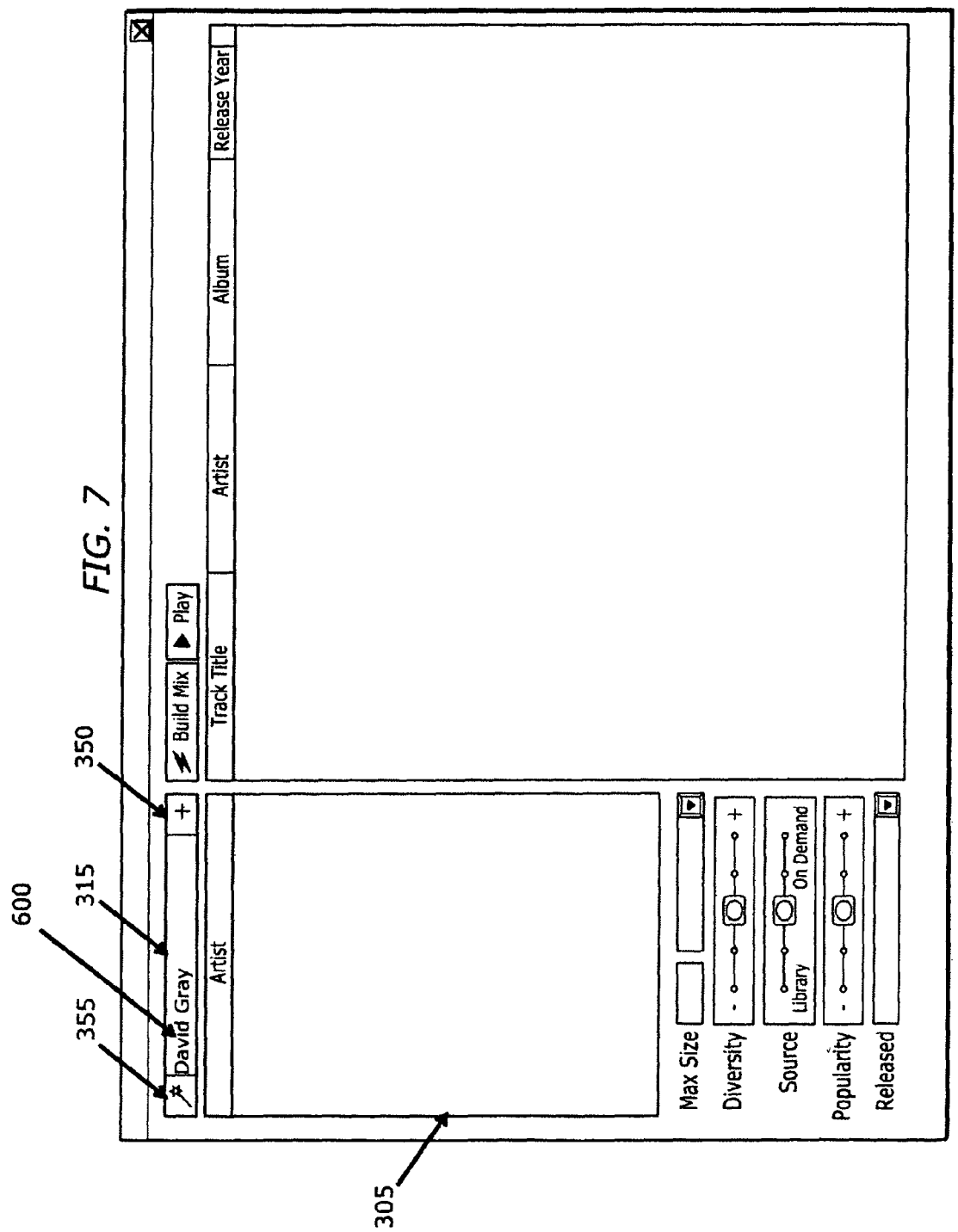
FIG. 7 is an exemplary user interface according to an embodiment of the present disclosure.
Figure 8:
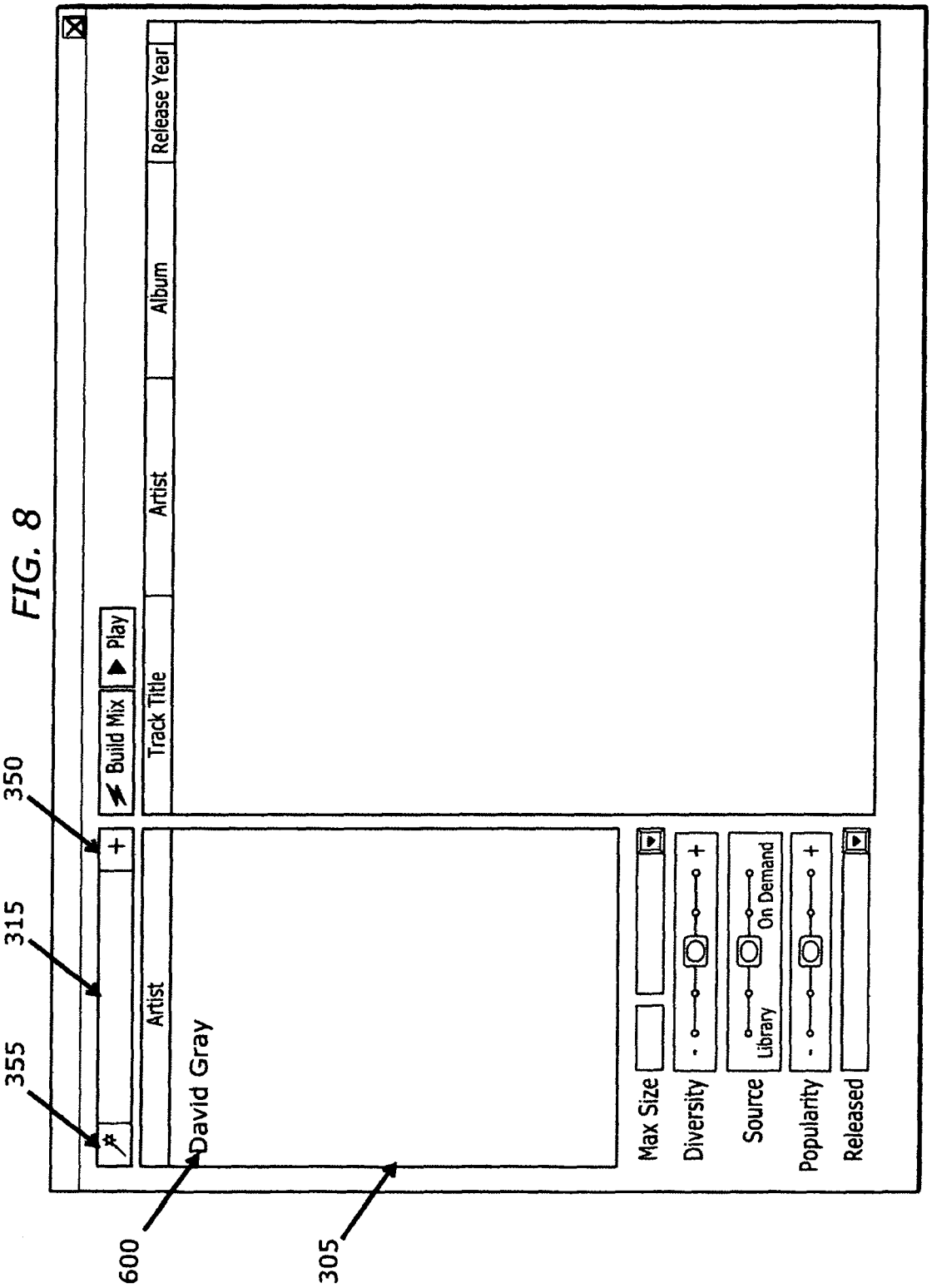
FIG. 8 is an exemplary user interface according to an embodiment of the present disclosure.
Figure 9:
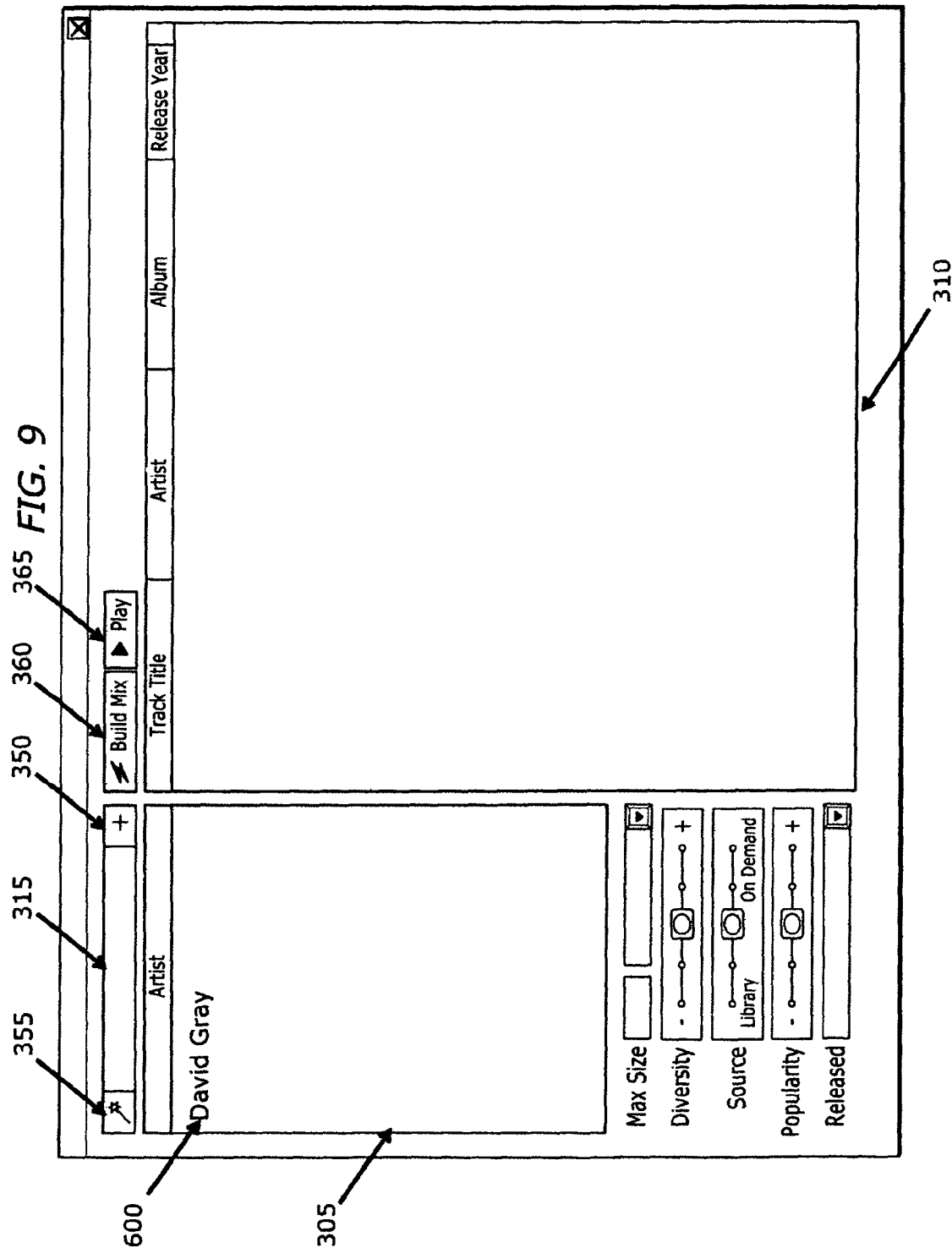
FIG. 9 is an exemplary user interface according to an embodiment of the present disclosure.
Figure 10:
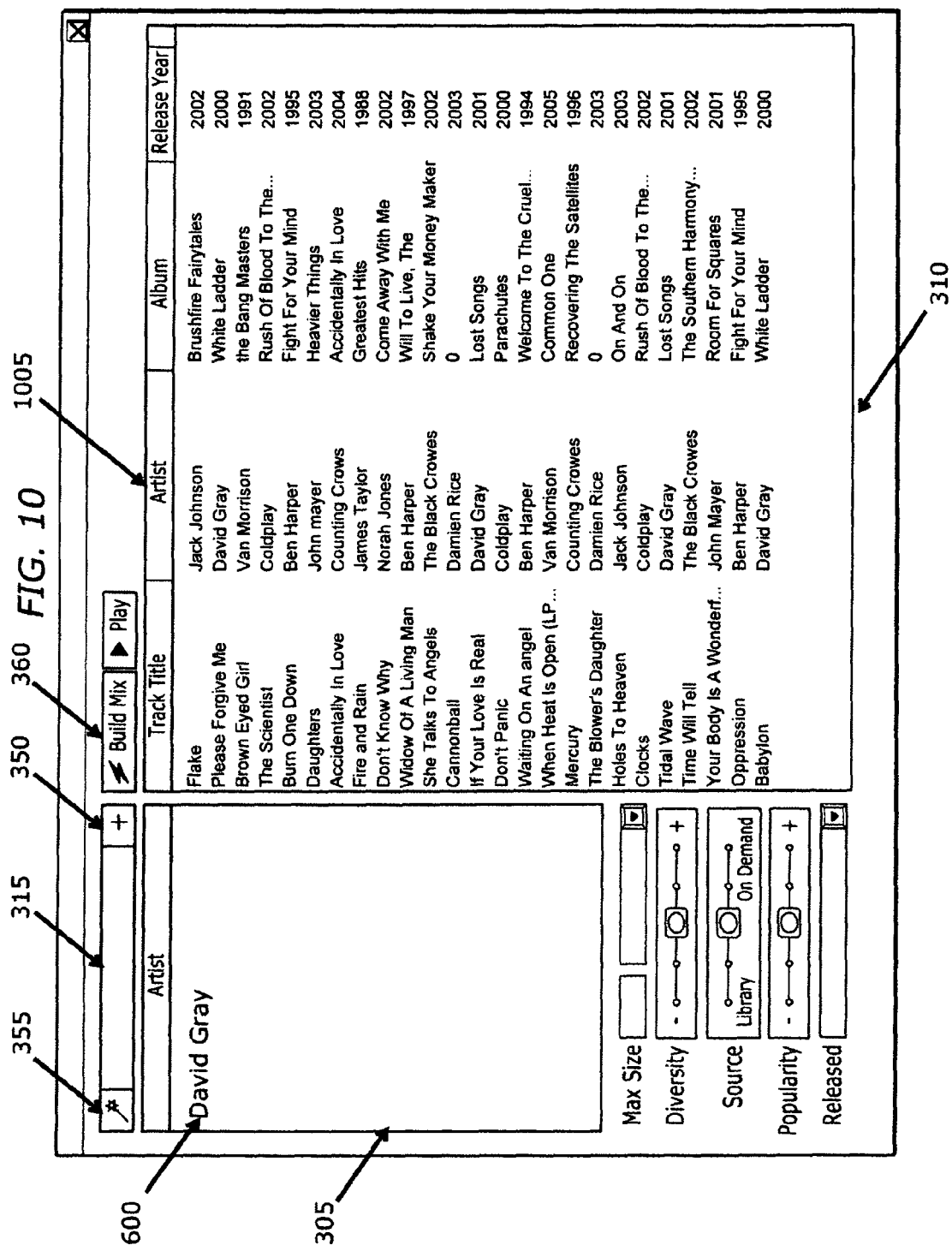
FIG. 10 is an exemplary user interface according to an embodiment of the present disclosure.
Figure 11:
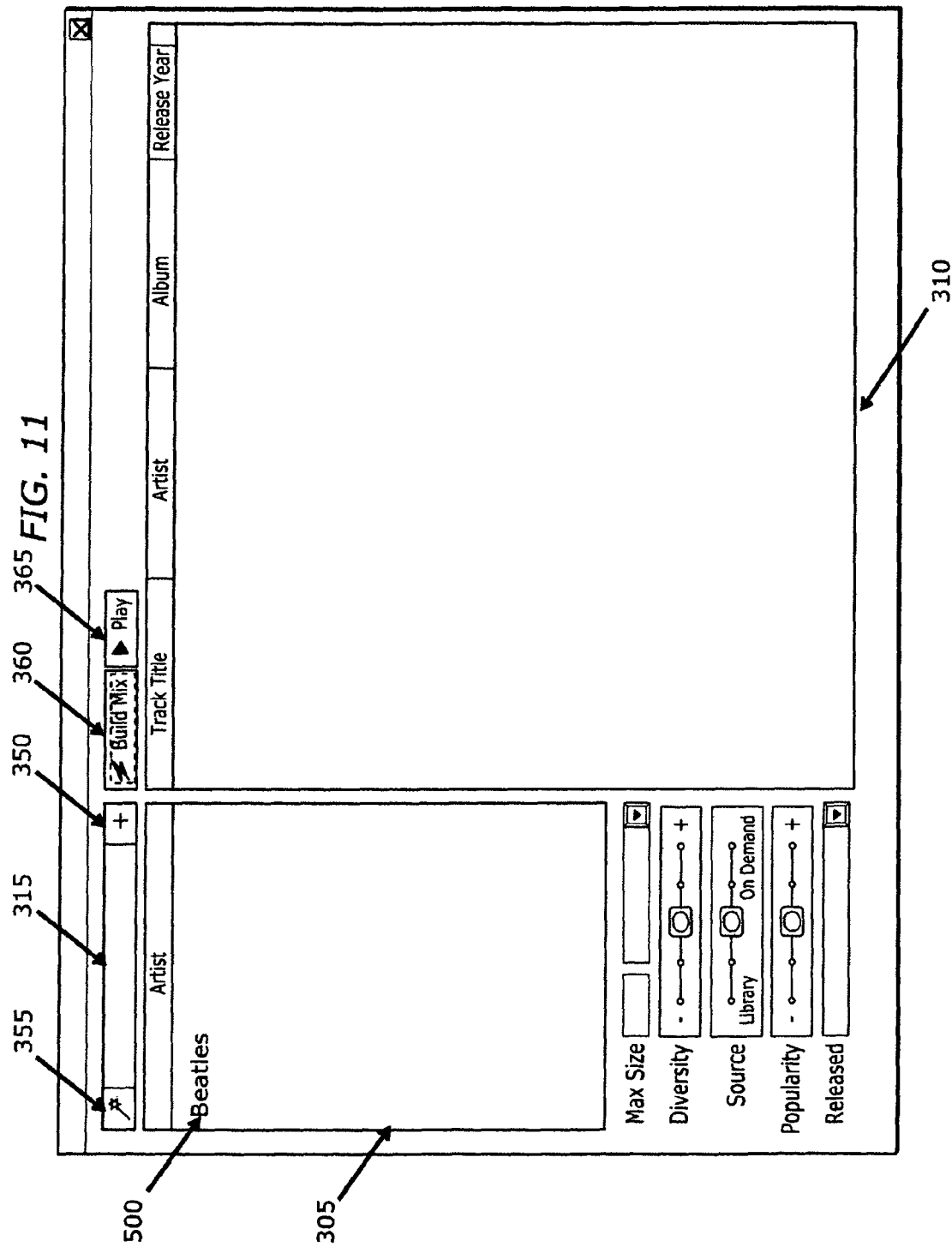
FIG. 11 is an exemplary user interface according to an embodiment of the present disclosure.

An exemplary embodiment of the tool is depicted in FIGS. 6 and 7. As depicted in FIG. 6, the user can click on the tool icon 355. Upon clicking this tool, icon 355, a media file identifier representing a media file is randomly selected from the user's local media library and the text field box 315 is populated with the randomly selected media file identifier 600 as depicted in FIG. 7. Each time the user clicks the tool icon 355, a different media file identifier is displayed in the text field box 315. Thus, the user can click the tool icon 355 as many times as needed in order to find the desired media file identifier. Next, as depicted in FIG. 8, the user can click a button 350 to import the media file identifier 600 into the pane 305 dedicated for collecting media file identifiers. Again, the user can repeat the process of using the tool to suggest a media file identifier and then importing the desired media file identifier into the pane 305 dedicated for collecting media file identifier.

In one embodiment, after the user selects media file identifier(s) (in any of the ways discussed herein or combination thereof), the user can then click a button to initiate the playlist generation. In one embodiment, the playlist is generated in part from all the media file identifiers located in the pane dedicated for collecting media file. In other words, a playlist can be generated by a minimal amount of steps and user input. In one exemplary embodiment of a quickly generated playlist.

Figure 13:
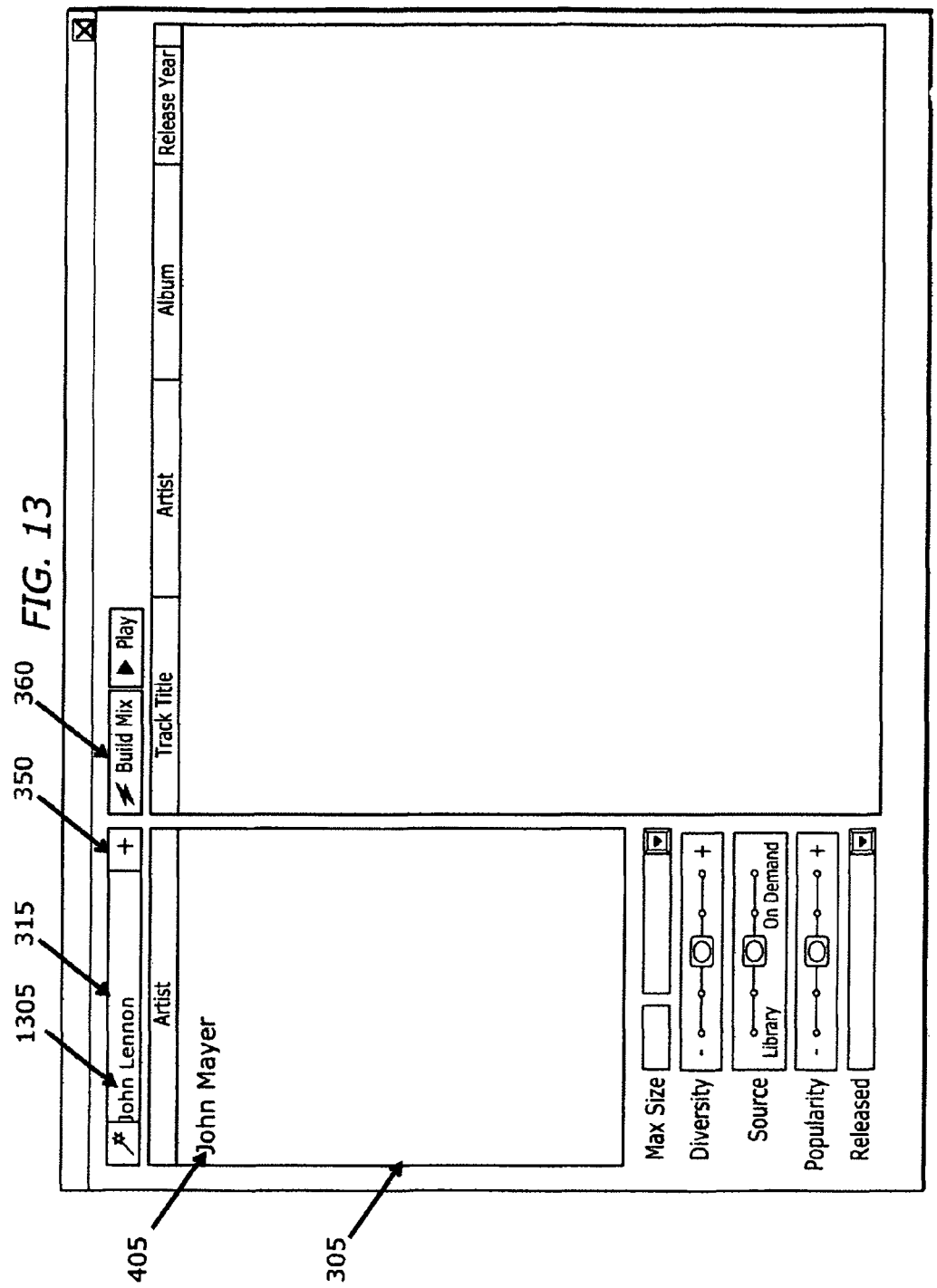
FIG. 13 is an exemplary user interface according to an embodiment of the present disclosure.
Figure 14:
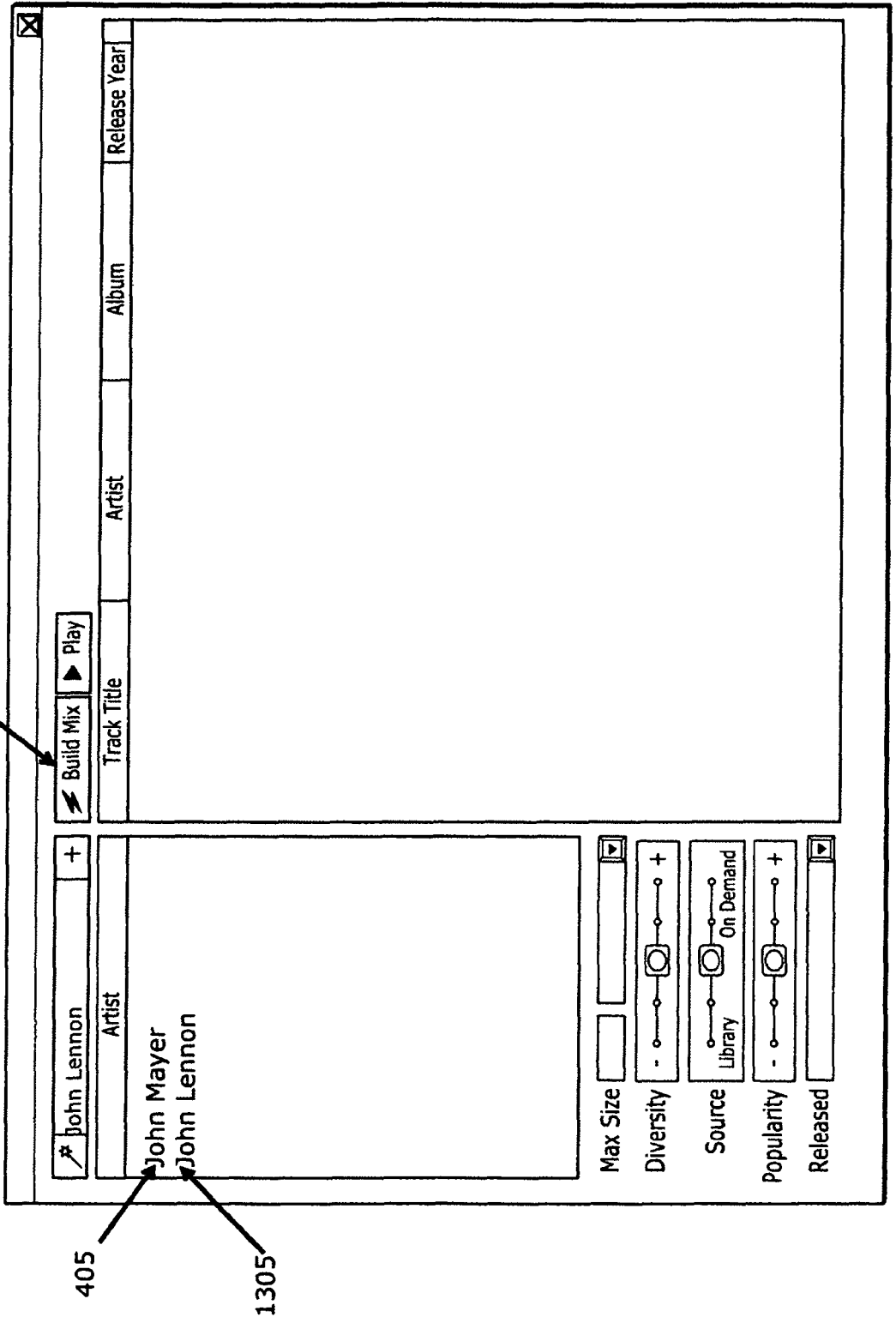
FIG. 14 is an exemplary user interface according to an embodiment of the present disclosure.

FIGS. 4, 13, and 14 depict another exemplary embodiment of combining several ways to select media file identifier(s) to create a playlist. As depicted in FIG. 4, the user selects a media file identifier by dragging and dropping the media file identifier 405 from a window pane 400 into another pane 305.

Figure 15:
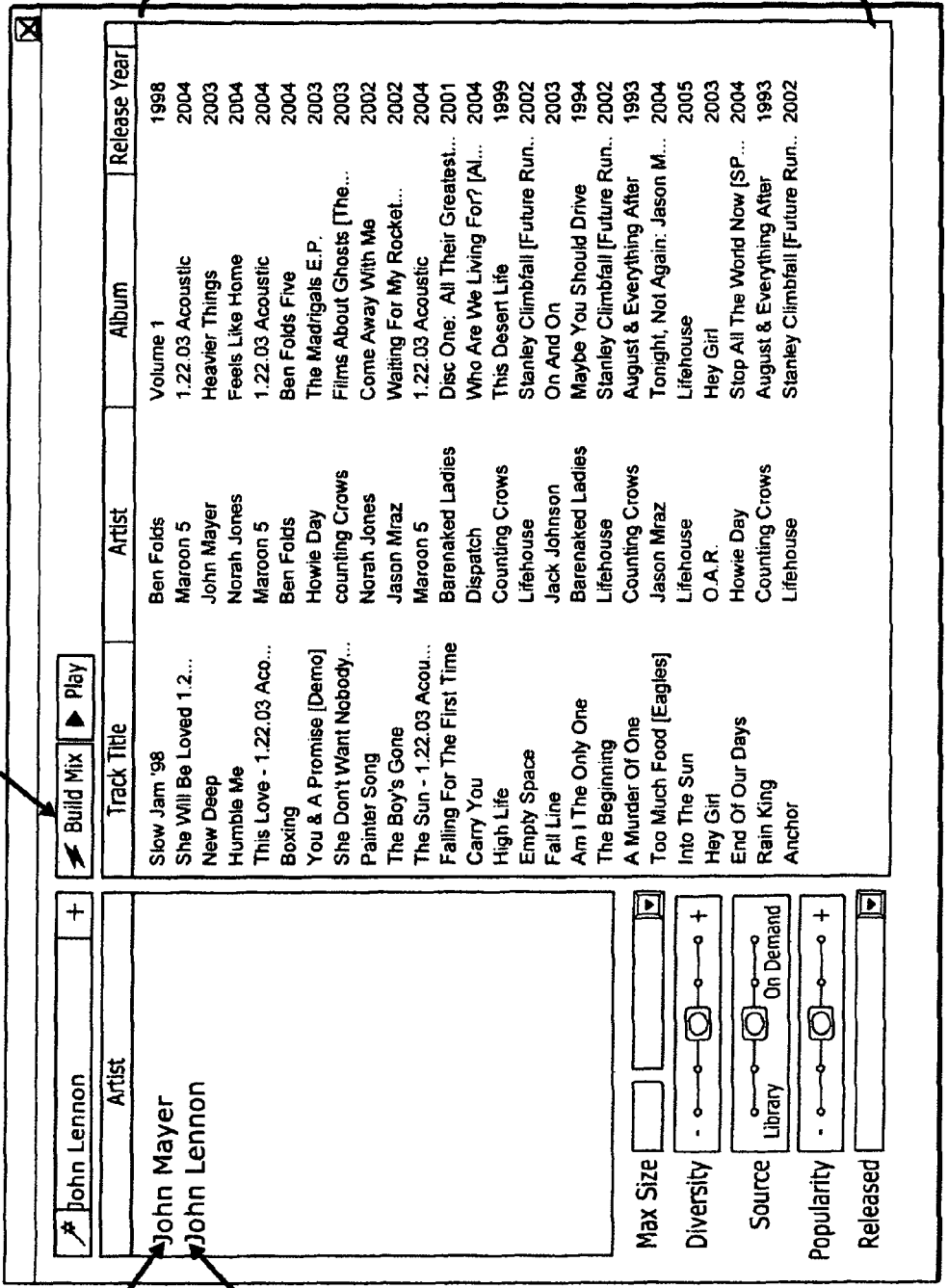
FIG. 15 is an exemplary user interface according to an embodiment of the present disclosure.

As depicted in FIGS. 13 and 14, the user selects a media file identifier 1305 by entering text representing a media file indicator 1305 into the field box 315 and then clicking a button 350 to import the media file identifier 1305 into the pane 305. Next, the user clicks on a button 360 to initiate and generate a playlist 1505 as depicted in FIG. 15.

In yet another embodiment, the user can select a media file identifier using a relatedness tool. The relatedness tool may be located on the user interface of the playlist creation application and may be represented by a button, a slider, a drop-down menu on the tool bar, and/or as part of a right-click menu. The relatedness tool allows the user to highlight or otherwise select media file identifier(s) already located in the dedicated pane and then further populate the pane with media file identifier related to the selected media file identifier. The pane may be populated based on an artist, album, track, or genre, era, or release date, or any combination thereof. In one embodiment, when the user highlights a media file identifier and selects the relatedness tool, the tool queries whether the user wants a media file identifier that is similar or dissimilar to the highlighted media file identifier. In further embodiments, the user can select queries for media file identifiers based on different scales of relatedness. For example, the scale of relatedness can be based on multiple levels of similarity and dissimilarity. Once the user responds, the relatedness tool populates the dedicated pane with the appropriate media file identifier. In some embodiments, the relatedness tool may populate the dedicated pane from various sources such as the user's local media library, on an on-demand streaming media, or any other source of media files that the user has access to. Thus, the relatedness tool allows the user to automatically and quickly expand the media file identifiers used to generate a playlist.

As described herein, a user can quickly create a playlist by selecting a media file identifier and then clicking a button to generate a playlist. However, in further embodiments, after the user selects media file identifier(s), the user has the option to apply at least once playlist parameter and/or filters to influence the playlist generation. If the user does not want to specify any parameters or filters, the user can simply not choose any parameters or filters and the playlist creation application will apply the default parameters. In further embodiments, the user can pre-configure the default parameters. In one embodiment, the parameters may be based on explicit and/or implicit user input. In one embodiment, the parameters allow the user to further personalize and customize a playlist. In one embodiment, the last parameter settings entered by the user are remembered by the playlist creation application and can act as the future parameter setting defaults.

The present disclosure provides, through a user interface, the user with a variety of parameters and filters to apply to a playlist. In one embodiment, the parameters comprise a playlist size parameter, a source parameter, a diversity parameter, a popularity parameter, a date last played parameter, a date last entered parameter, and a release date parameter. Accordingly, the user can set and apply as many parameters and/or filters and combinations thereof as desired. Moreover, the more parameters selected and defined, a more personalized playlist is generated.

Figure 3:
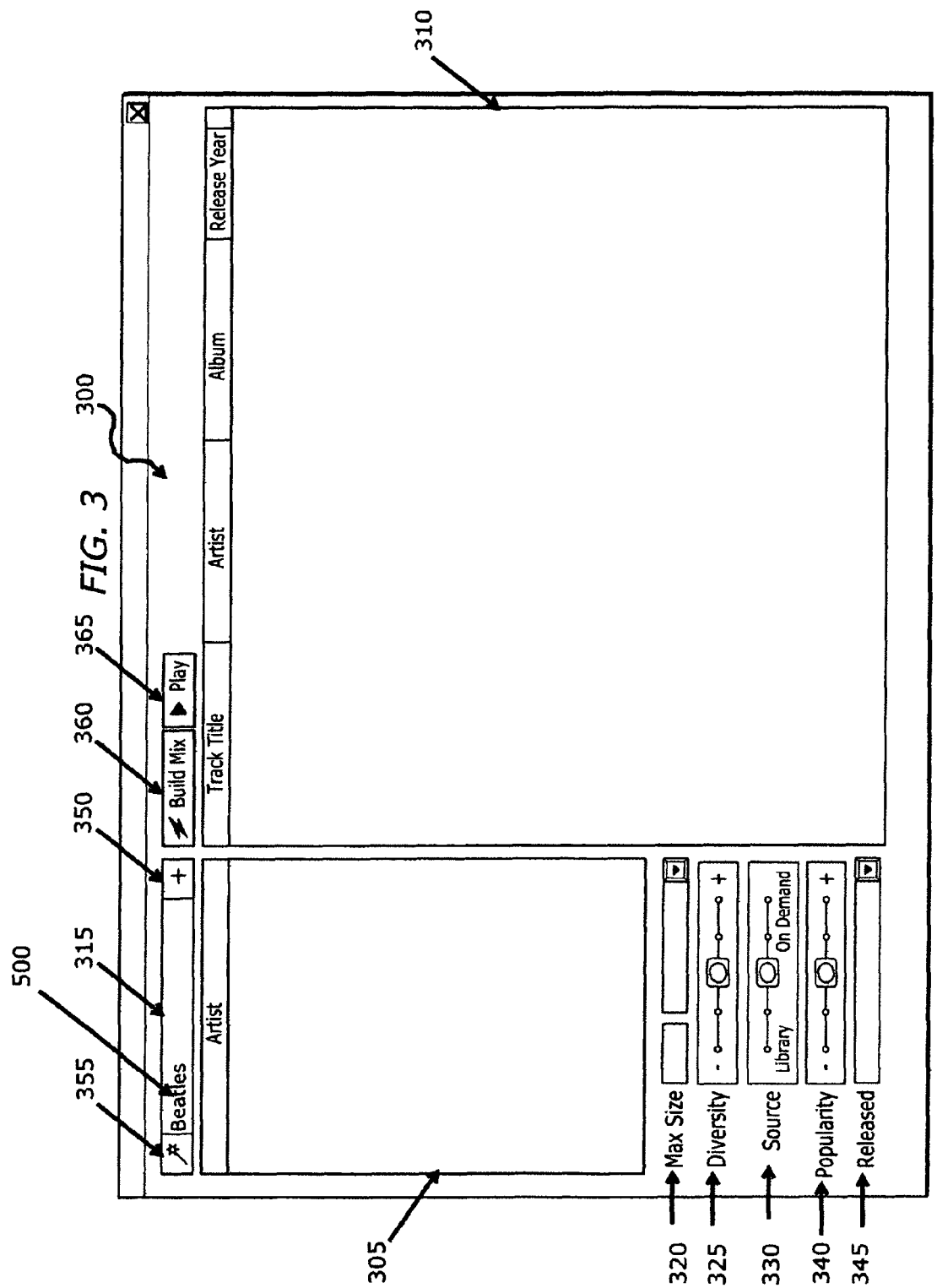
FIG. 3 is an exemplary user interface according to an embodiment of the present disclosure.

FIG. 3 depicts one exemplary embodiment of a user interface with a variety of playlist parameters. As depicted in FIG. 3, the user interface comprises two panes 305 and 310. Pane 305 is dedicated to collecting the selected media file identifier(s). Pane 310 is dedicated to displaying the playlist once generated. The user interface 300 further comprises a text field box 315, several parameters (320, 325, 330, 340 and 345), a user selectable indicia representing tool 355 to randomly select media file identifiers from a local media library a button for adding the media file identifier(s) from the field box 350 into the pane 305, a button that initiates generating the playlist 360, and a button playing 365 the playlist. FIG. 3 depicts several parameters (320, 325, 330, 340, 345): a playlist size parameter 320, a source parameter 330, a diversity parameter 325, a popularity parameter 340, and a released date parameter 345.

In one embodiment, the playlist size parameter allows a user to influence the size of the generated playlist. The user can influence the size of the playlist beginning the playlist by a number of media files, total length in time of the playlist, the file size of the playlist, and any other contemplated means for shaping the size of a playlist.

Figure 16:
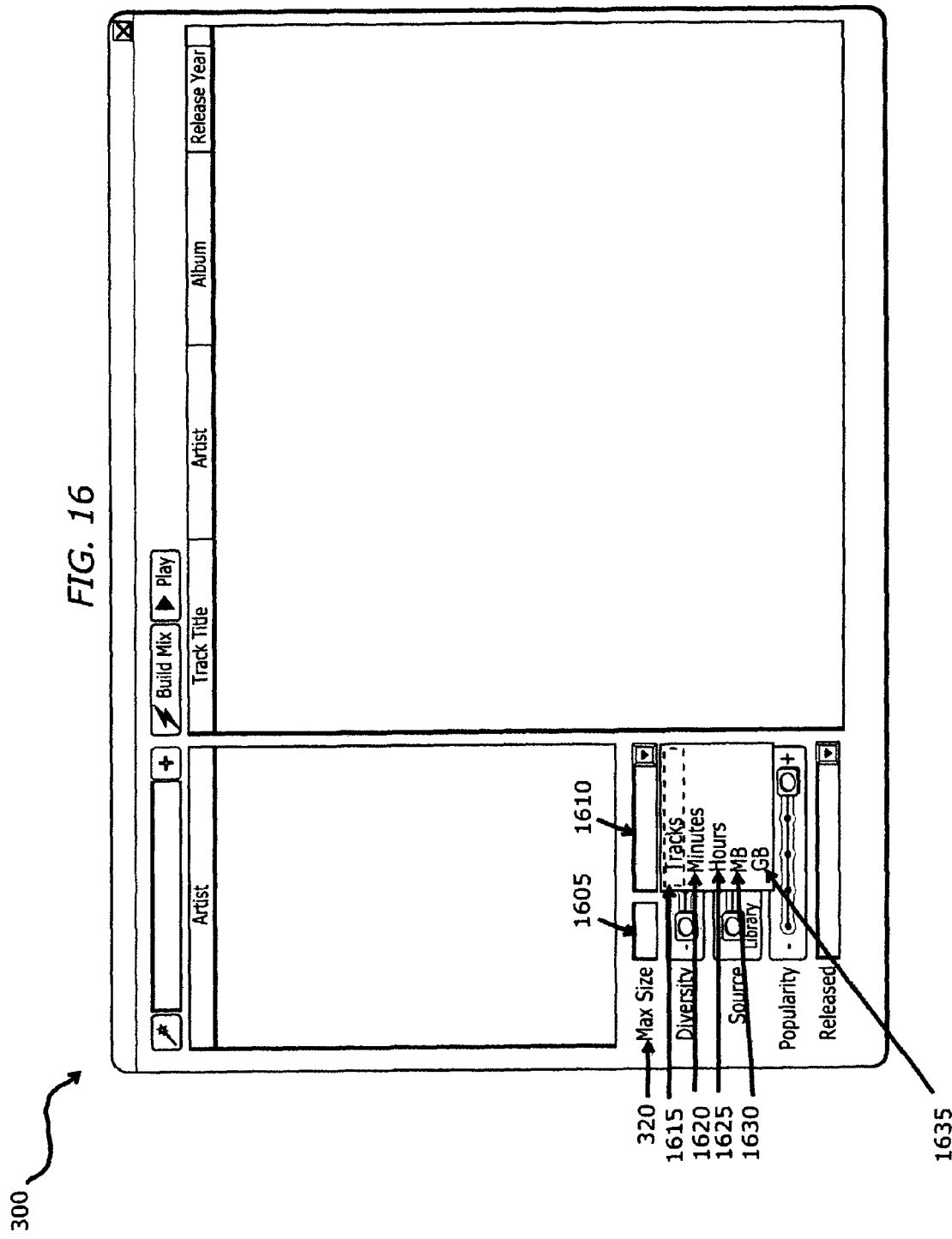
FIG. 16 is an exemplary user interface according to an embodiment of the present disclosure.
Figure 17:
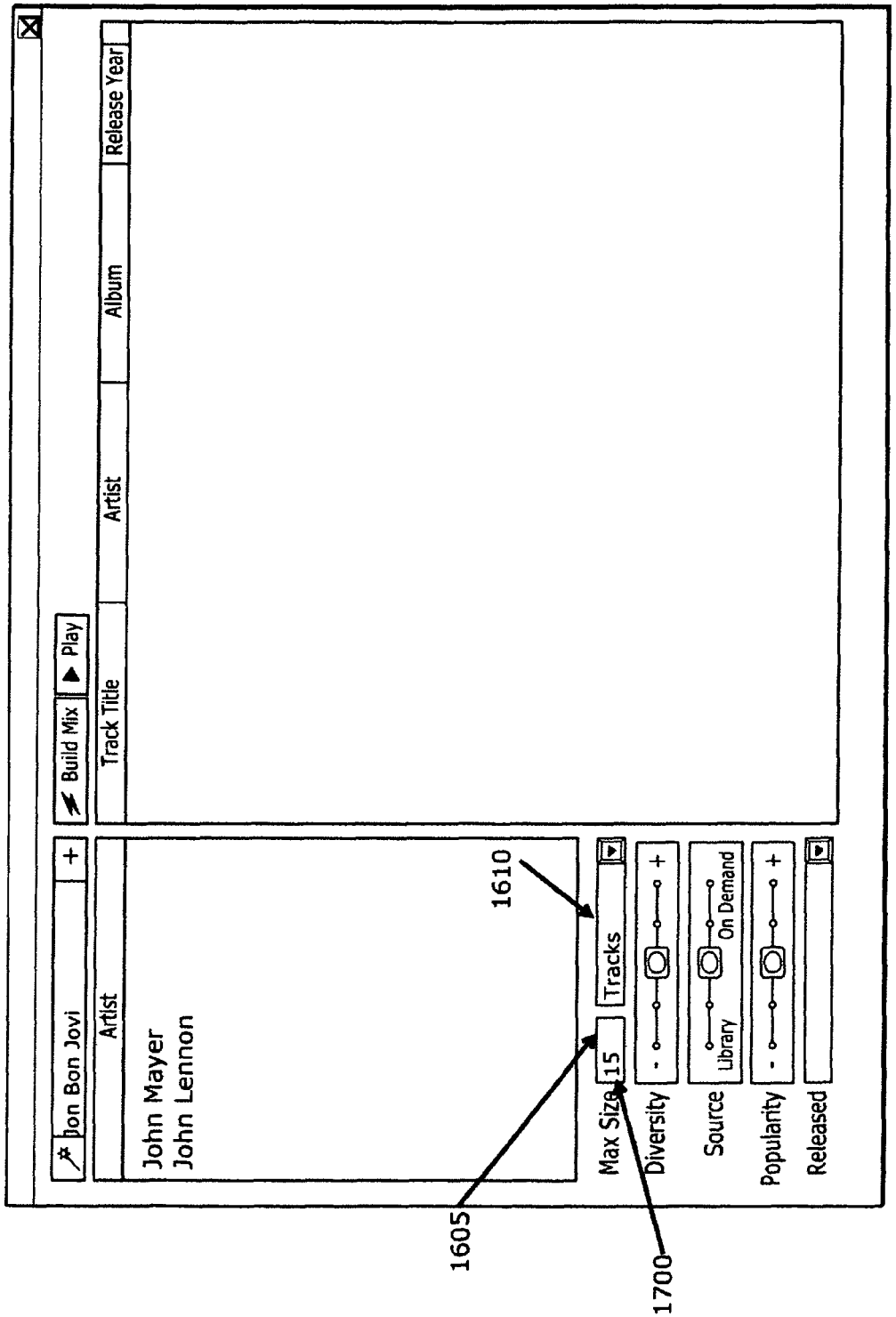
FIG. 17 is an exemplary user interface according to an embodiment of the present disclosure.

In one embodiment, the playlist size parameter comprises a text field box and a drop down menu where the user selects criteria from the drop down menu and then enters a limit in the text box. One exemplary embodiment of a playlist size parameter is depicted in FIG. 16. As depicted, the playlist size parameter 320 comprises a text field box 1605 and a drop down menu 1610. The drop down menu 1610 comprises several parameter criteria such as tracks 1615, minutes 1620, hours 1625, MB (megabytes) 1630, and GB (Gigabytes) 1635. In one embodiment, the drop down menu 1610 and the text field box 1605 are associated with each other. Meaning, that the user selects criteria from the drop down menu 1610 and then populates the text field box 1605 depending on the criteria the user selected from the drop down menu 1610. For example, in FIG. 16, the user selects tracks 1615 from the drop down menu 1610. Next, as depicted in FIG. 17, the user can enter a number 1700 corresponding to the maximum number of media file(s) desired by entering this number 1700 in the text field box 1605. Thus, the user has defined a parameter for the playlist creation. Specifically, the user has defined a parameter limiting the maximum number of tracks (15) of the playlist. Of course, the user can select and apply further parameters and any combinations thereof Regardless, in this exemplary embodiment, the generated playlist will not contain more than 15 tracks.

Figure 18:
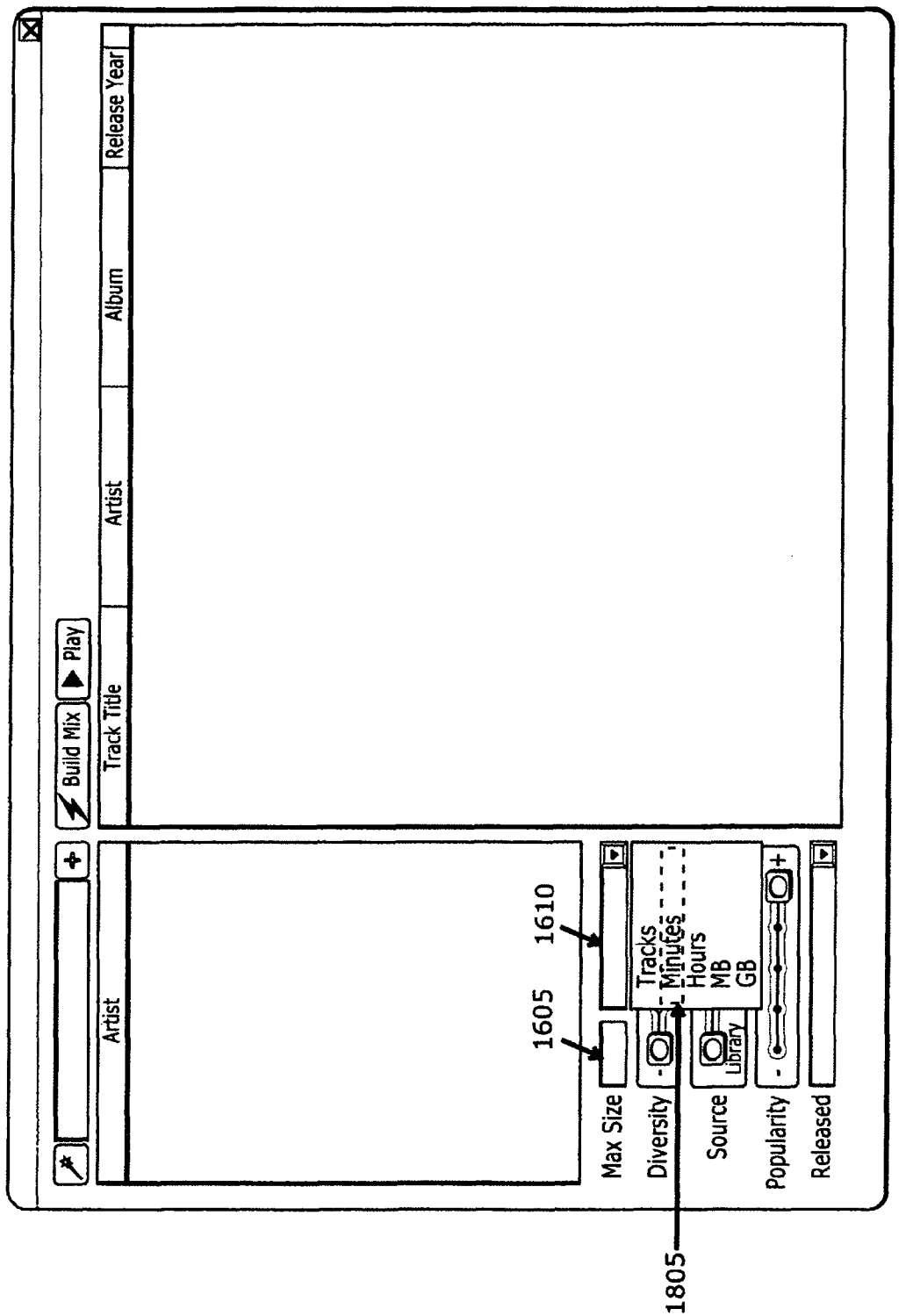
FIG. 18 is an exemplary user interface according to an embodiment of the present disclosure.
Figure 19:
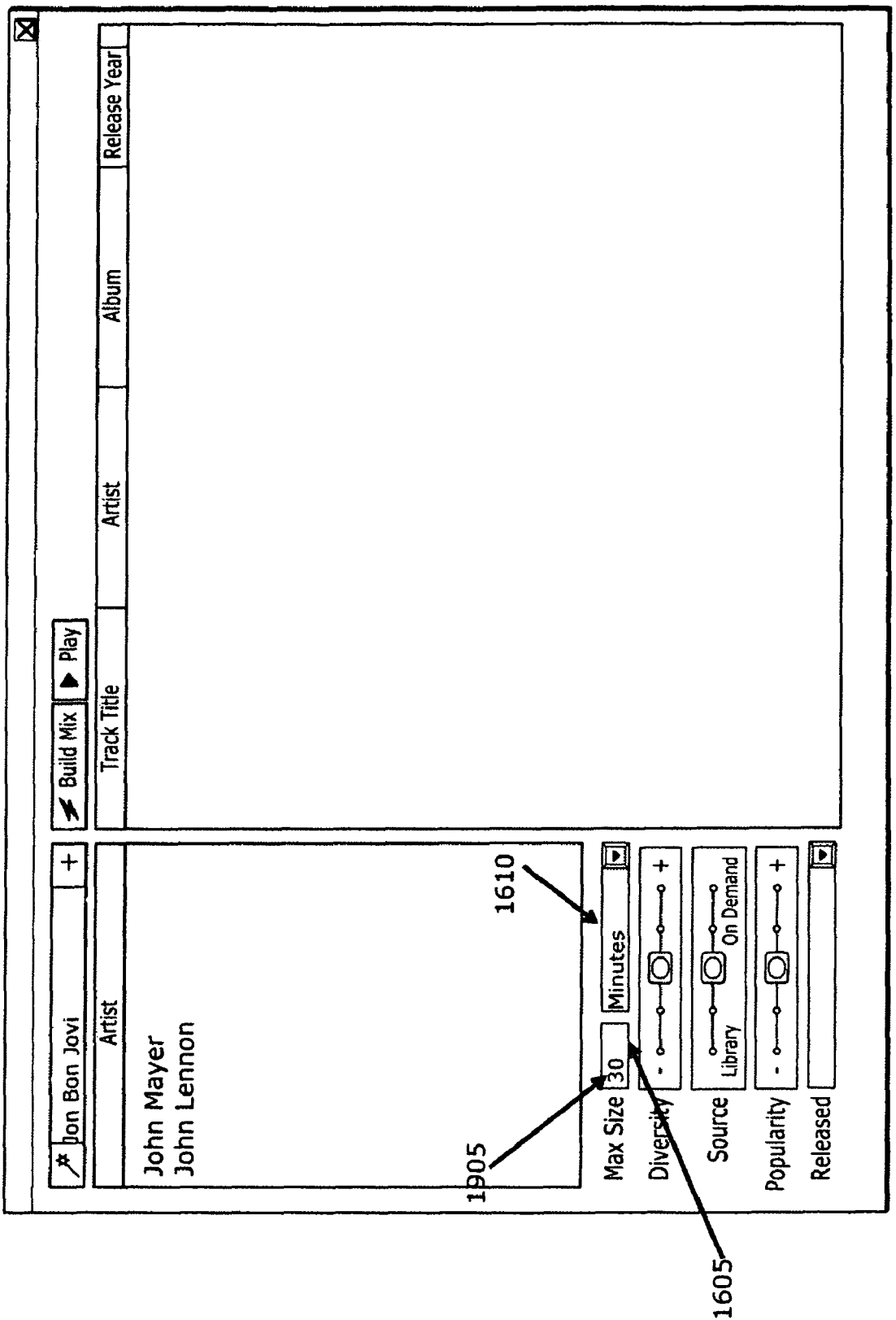
FIG. 19 is an exemplary user interface according to an embodiment of the present disclosure.

FIGS. 18 and 19 depict another exemplary embodiment of applying a playlist size parameter. FIG. 18 depicts a user selecting minutes 1805 criteria from the drop down menu 1610. Turning to FIG. 19, the user can enter a number 1905 into the text field box 1605 which corresponds to the maximum number of minutes of the playlist. Thus, the user has defined a parameter for the playlist creation. Specifically, the user has defined a parameter limiting the maximum number of minutes (30) for a playlist. A parameter defining the maximum number of minutes for a playlist is helpful to a user who only wants a playlist for a specific amount of time. For example, if the user desires to work out for only 30 minutes, the user can create a playlist which is only 30 minutes long and that will not only coincide with the user's workout schedule, but can also serve as an indicator of when the 30 minutes have passed.

Figure 20:
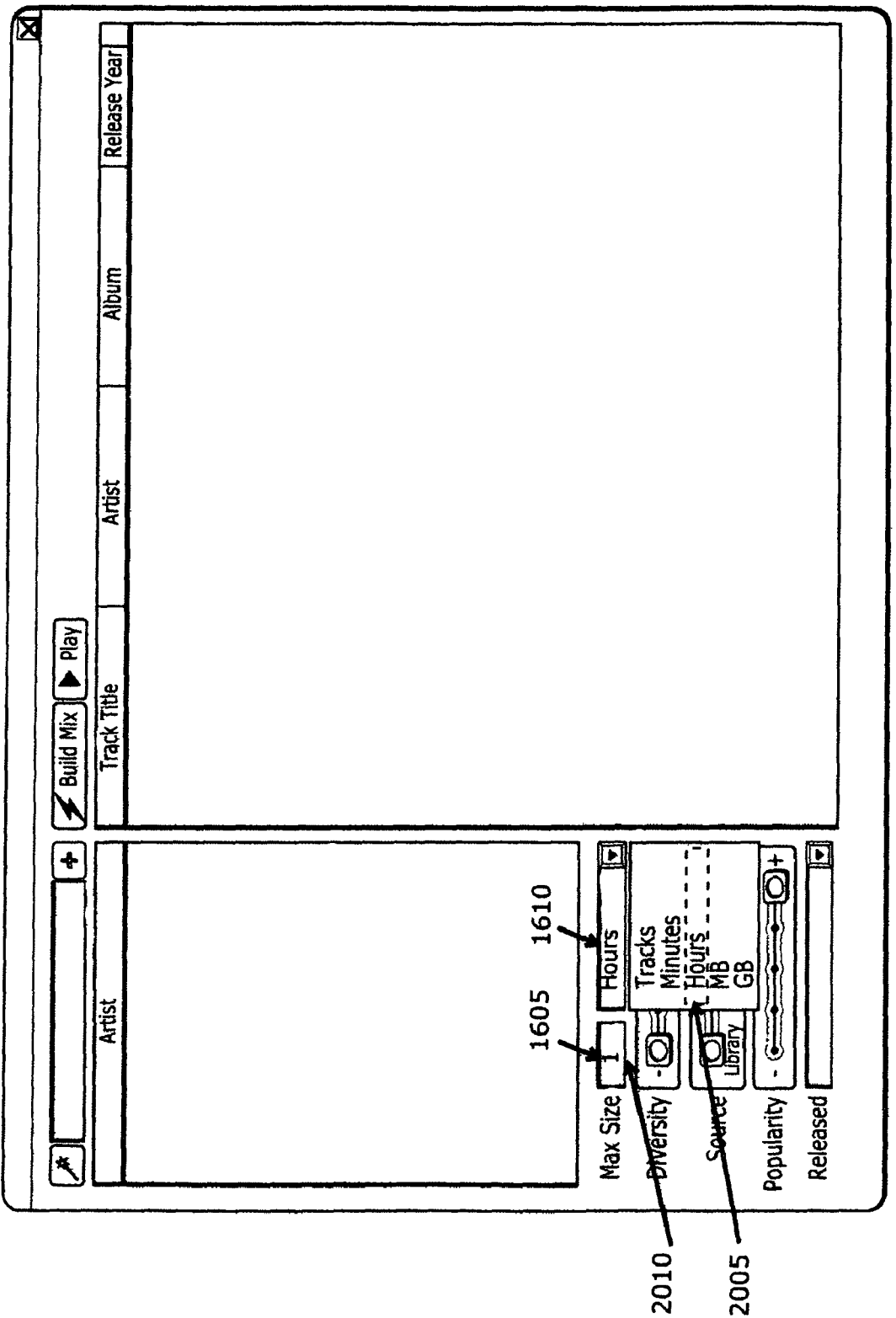
FIG. 20 is an exemplary user interface according to an embodiment of the present disclosure.

FIG. 20 depicts another exemplary embodiment of applying a playlist size parameter. Specifically, FIG. 20 depicts a user selecting an hours 2005 criteria from the drop down menu 1610. Next, as depicted in FIG. 20, the user can enter a number 2010 into the text field box 1605 which corresponds to the maximum number of hours of the playlist. Thus, the user has defined a parameter for the playlist creation. Specifically, the user has defined a parameter limiting the maximum number of hours (1) for a playlist.

Figure 21:
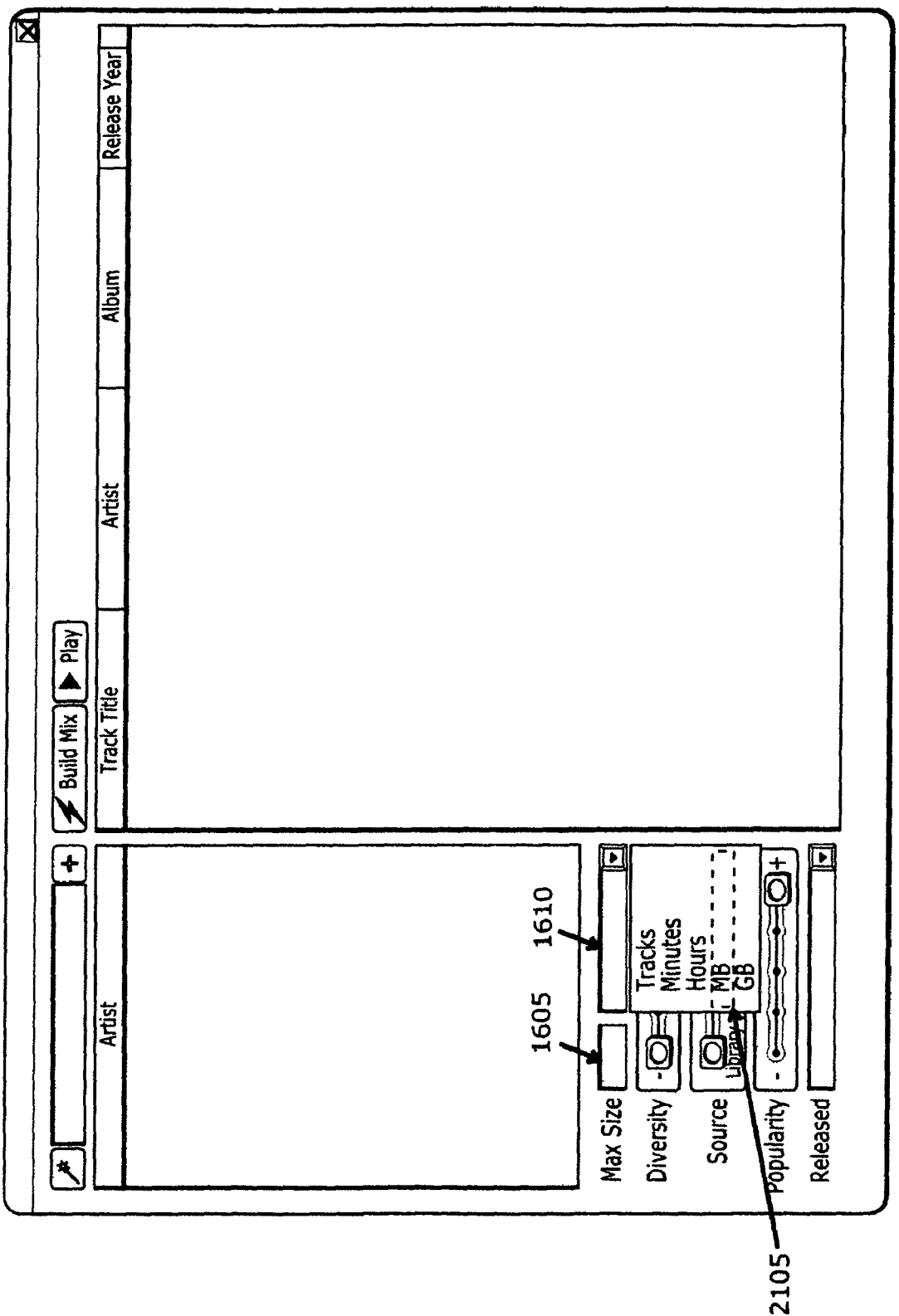
FIG. 21 is an exemplary user interface according to an embodiment of the present disclosure.

FIGS. 20 and 21 depict another exemplary embodiment of applying a playlist size parameter. Specifically, FIG. 21 depicts a user screening the MB (megabytes) 2105 criteria from the drop down menu 1610. Next, turning to FIG. 22, the user can enter a number 2205 into the text field box 1605 corresponding to the maximum number of megabytes for the generated playlist. Thus, the user has defined a parameter for the playlist creation. Specifically, the user has defined a parameter limiting the maximum number of megabytes (256) for a playlist. In one embodiment, a parameter defining the maximum number of megabytes for a playlist is helpful to a user who only wants a playlist in a specific size. For example, if the user desires to transfer the playlist to another media or device, it is often helpful that the user set and defines the size of the playlist so that the entire playlist can fit on the media such as a CD or a portable device.

Figure 22:
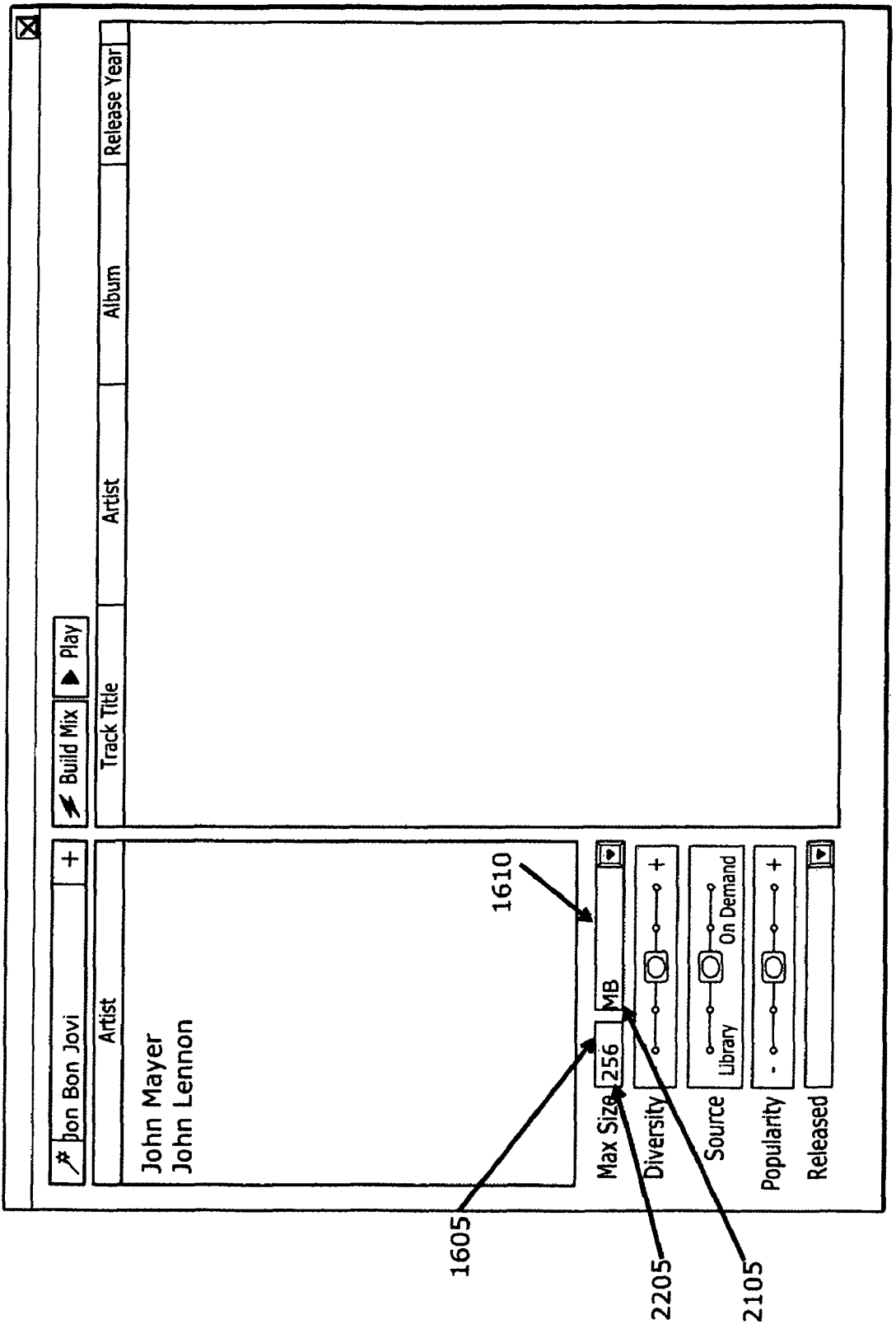
FIG. 22 is an exemplary user interface according to an embodiment of the present disclosure.
Figure 23:
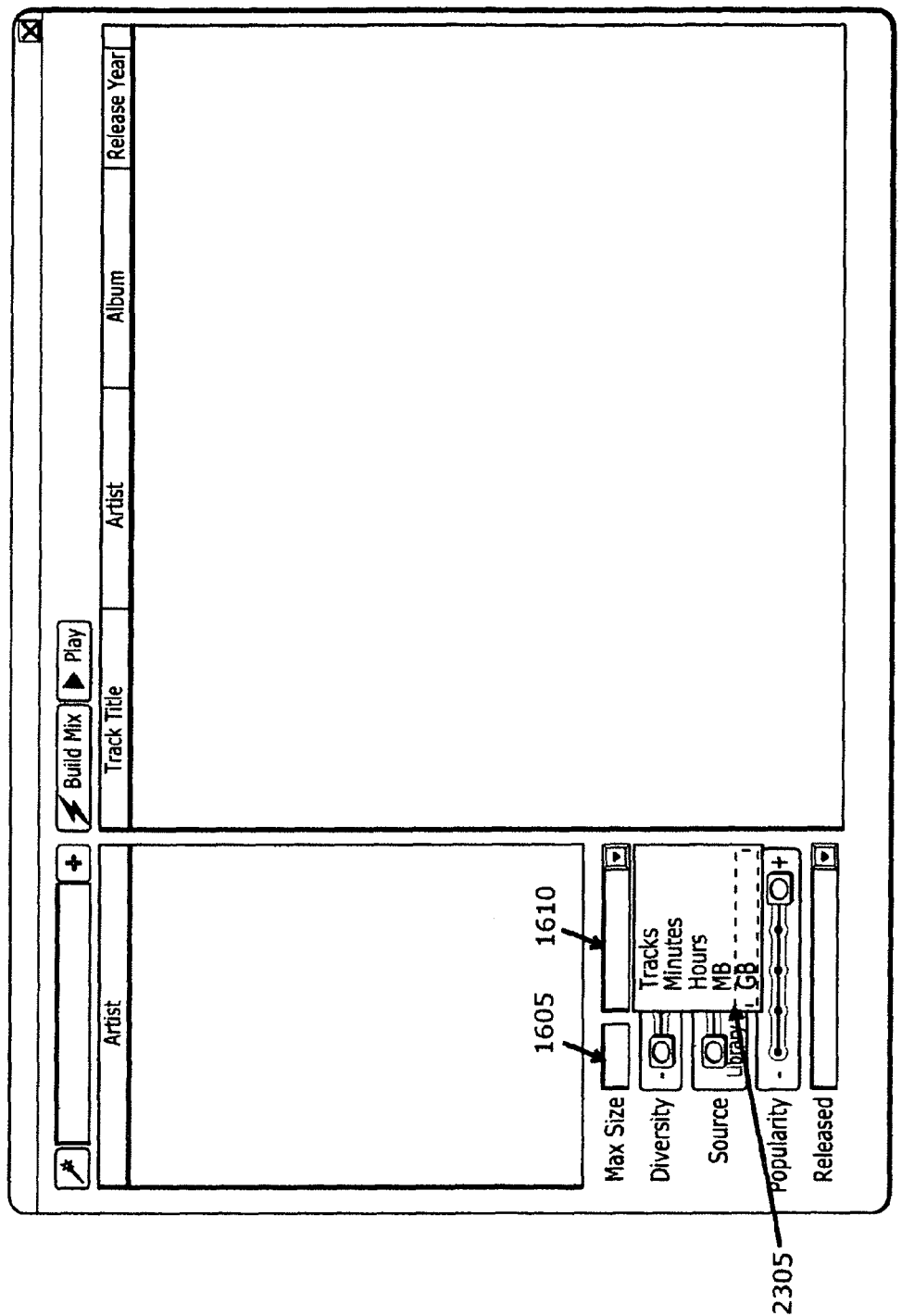
FIG. 23 is an exemplary user interface according to an embodiment of the present disclosure.
Figure 24:
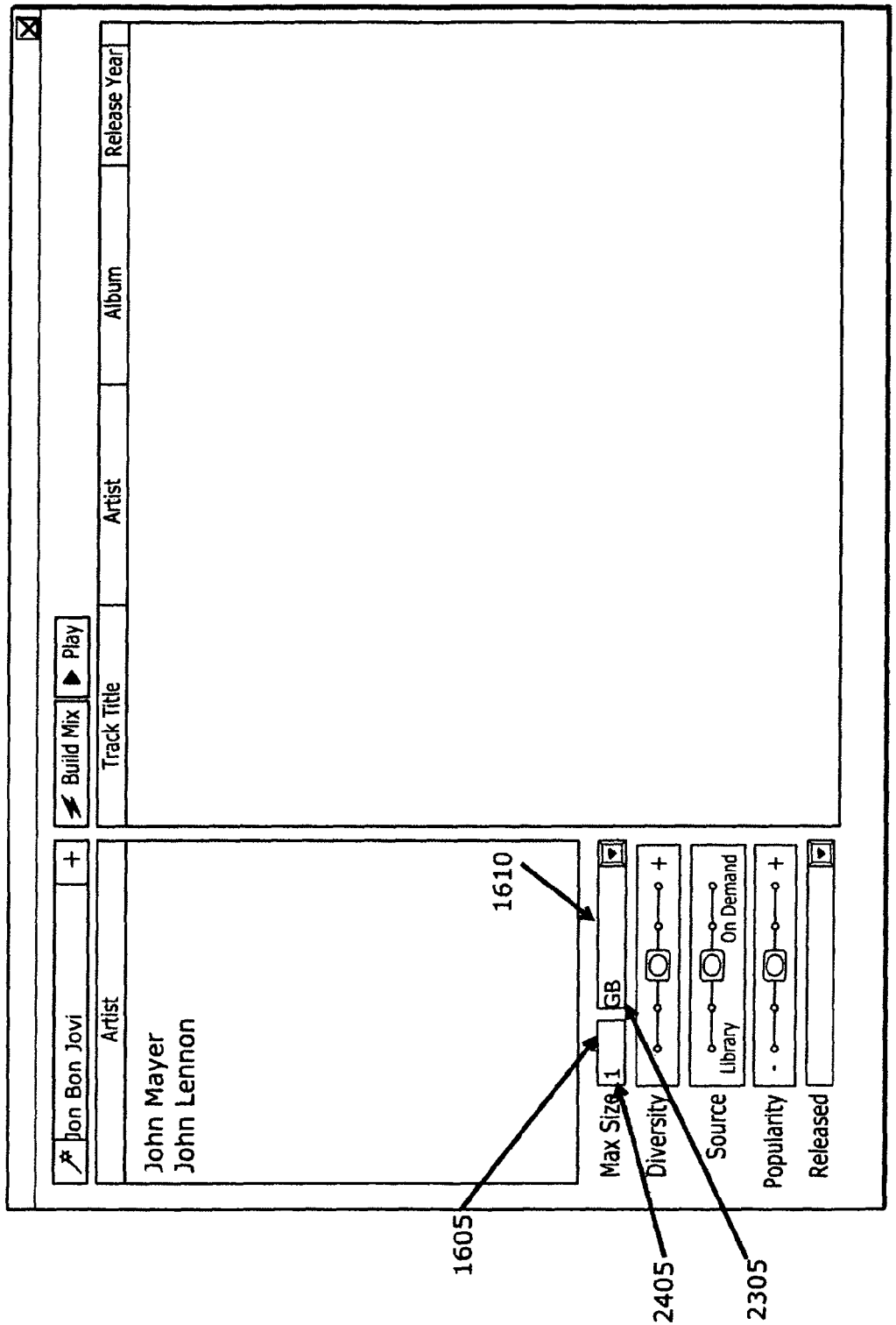
FIG. 24 is an exemplary user interface according to an embodiment of the present disclosure.

FIGS. 22 and 24 depict another exemplary embodiment of applying a playlist size parameter. Similar to FIGS. 21 and 22, FIGS. 23 and 24 depict a user selecting the GB (gigabytes) 2305 criteria from the drop down menu 1610. Next, referring to FIG. 24, the user can enter a number 2405 into the text field box 1605 corresponding to the maximum number of gigabytes for the playlist. Thus, the user has defined a parameter for the playlist creation. Specifically, the user has defined a parameter limiting the maximum number of gigabytes (1) for a playlist. A parameter defining the maximum number of gigabytes for a playlist is helpful to a user who only wants a playlist in a specific file size.

As an alternative to, or in conjunction with defining a playlist in terms of size, the user can specify the source of the media file identifiers used in generating the playlist. In one embodiment, the source parameter allows the user to control and create a playlist from a mixture of media sources. The media sources may comprise a user's own local media library, an on-demand streaming media service, another user's media library, the internet, or any other source of media a user has access to. For example, at times, the user may want to generate a playlist solely from his or her own local media library files. At other times, the user may want to generate a playlist solely from an on-demand streaming media service that can provide the user access to tens of thousands of media files. Furthermore, the user may want to generate a playlists from a mixture of two sources such as local media library and on-demand streaming service.

In one embodiment, the source parameter is represented on a user interface as a slider. The slider further preferably comprises at least one distinctive position located in between at least two media source identifiers. Each position may correspond to a particular media source or may be located in between media sources. Furthermore, the closer a particular position is to a media source identifier, the higher level of contribution of that media source will be in the generated playlist. Typically, the positions that are located in between the media sources denote a degree of combination of those media sources.

Figure 25:
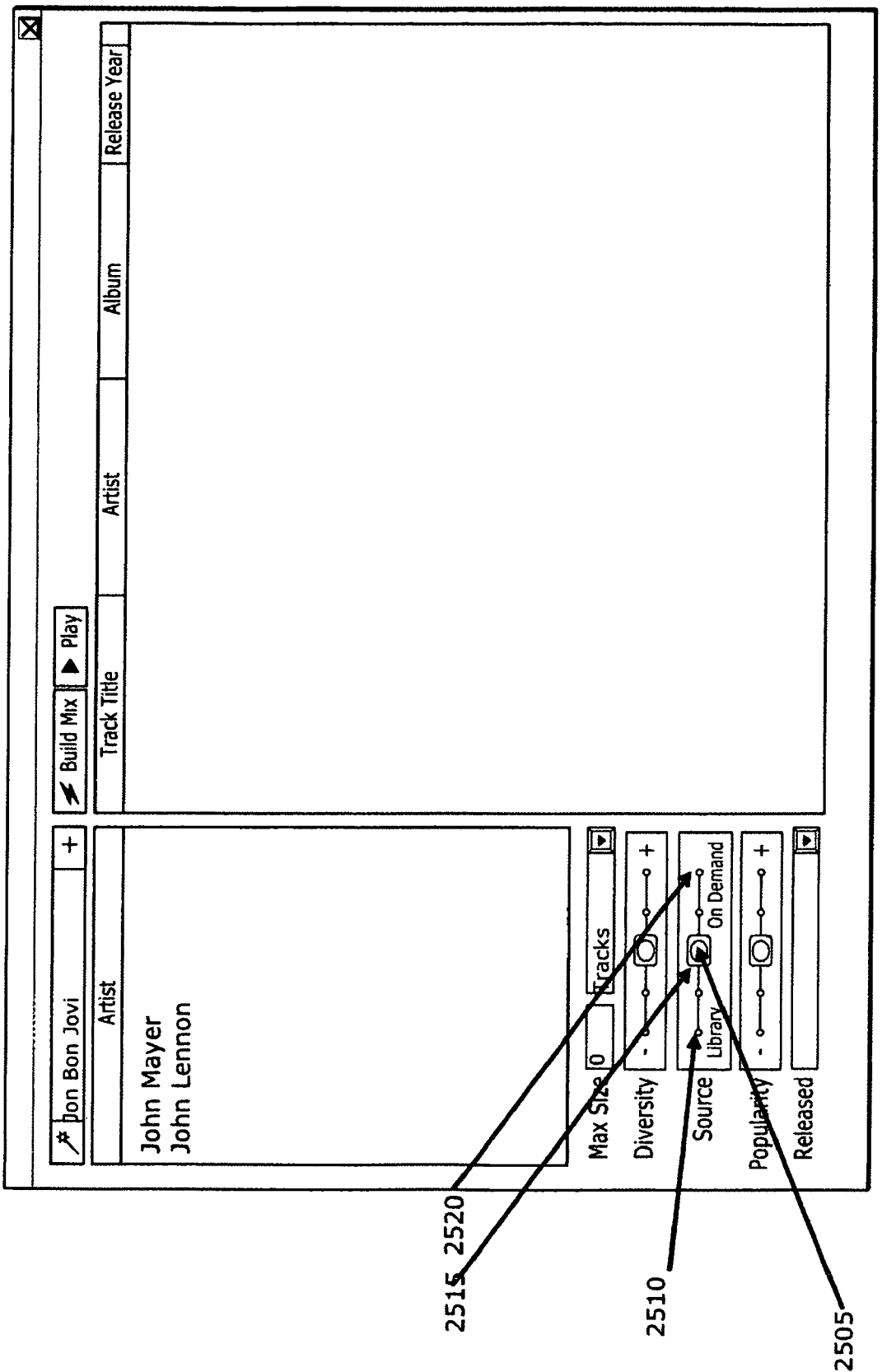
FIG. 25 is an exemplary user interface according to an embodiment of the present disclosure.

One embodiment of a source parameter is depicted in FIG. 25. In particular, the source parameter comprises a slider 2505 with three positions or other visual indicators (2510, 2515, 2520). In one embodiment, position 2510 corresponds to a library source, position 2520 corresponds to an on demand media source, and position 2515 is located in between the two sources 2510 and 2520. In one embodiment, position 2515 represents the fact that the playlist will be chosen approximately equally from both the library source and the on-demand source. Through this slider 2505, the user is able to select the source of media files used to generate the playlist. The slider is preferably continuously variable throughout its depicted range of motion to visually suggest to the user the percentage representation by which items will be drawn from the various sources depicted. As an additional non-limiting example, the positional slider may have multiple sources and may be represented more like a joystick, to position an observable marker within a volume of space having a number of sources at polar positions around the circumference of the depicted volume. In a further, non-limiting example, the positional slider may be represented as a series of radio buttons so that the user can select the percentage by which items will be drawn from the various media sources by selecting a radio button, Thus any of the various sliders and controls depicted and described herein as offering selections between two choices can all be varied to depict multiple choices. Additionally, the choices can be provided as designed into the user interface by a provider of the system or can be selectable by the user. For example, the user could supply the various sources from which playlists should be created, or ask the system to randomly generate sources.

Figure 26:
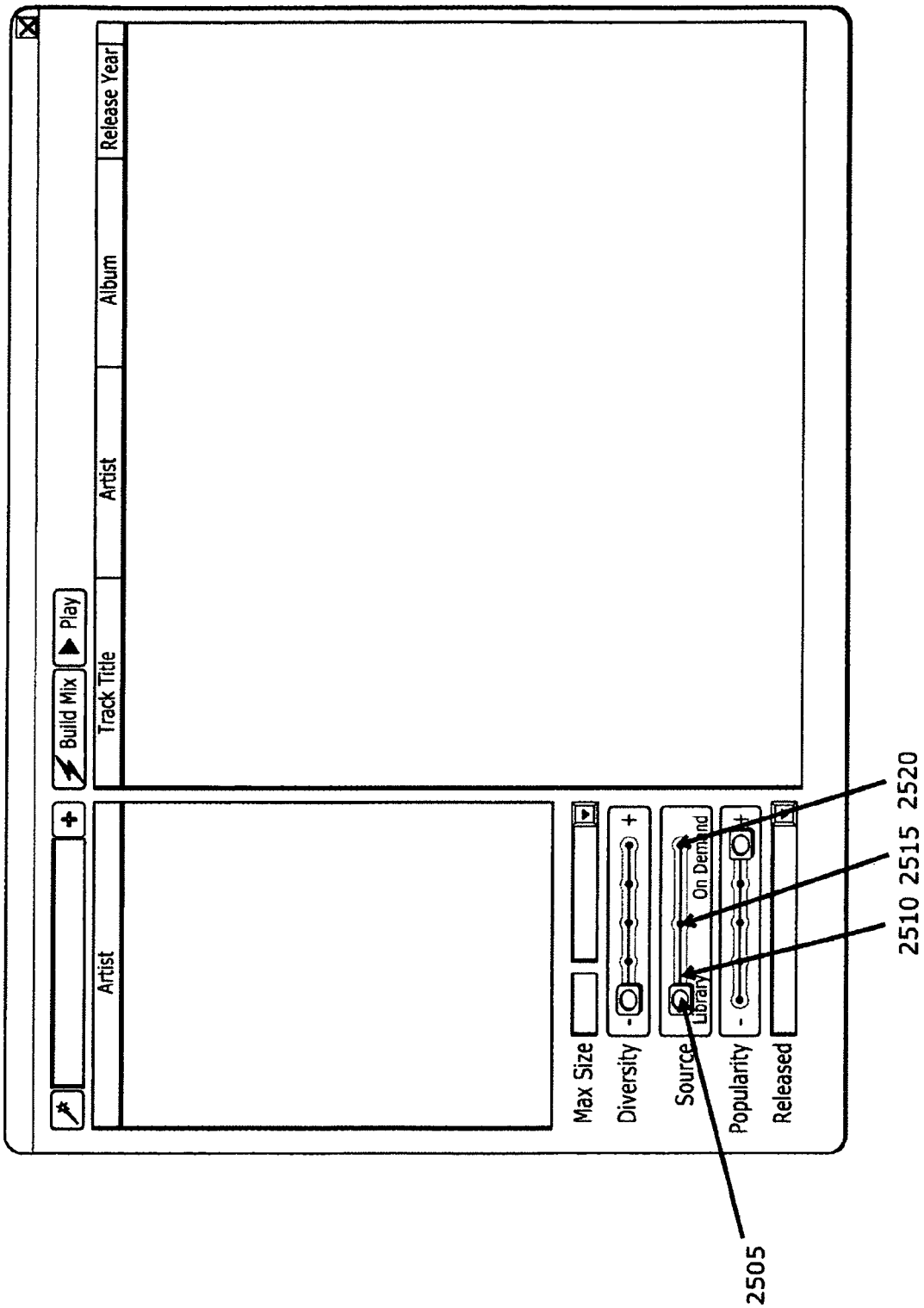
FIG. 26 is an exemplary user interface according to an embodiment of the present disclosure.

One exemplary embodiment of a positioned source slider is depicted in FIG. 26. In this embodiment, the slider 2505 is located at position 2510 which corresponds to a library source. This means that the user wants a playlist generated from only the user's local library media files. Therefore, the generated playlist will contain media file identifiers solely from the user's local media library.

Figure 27:
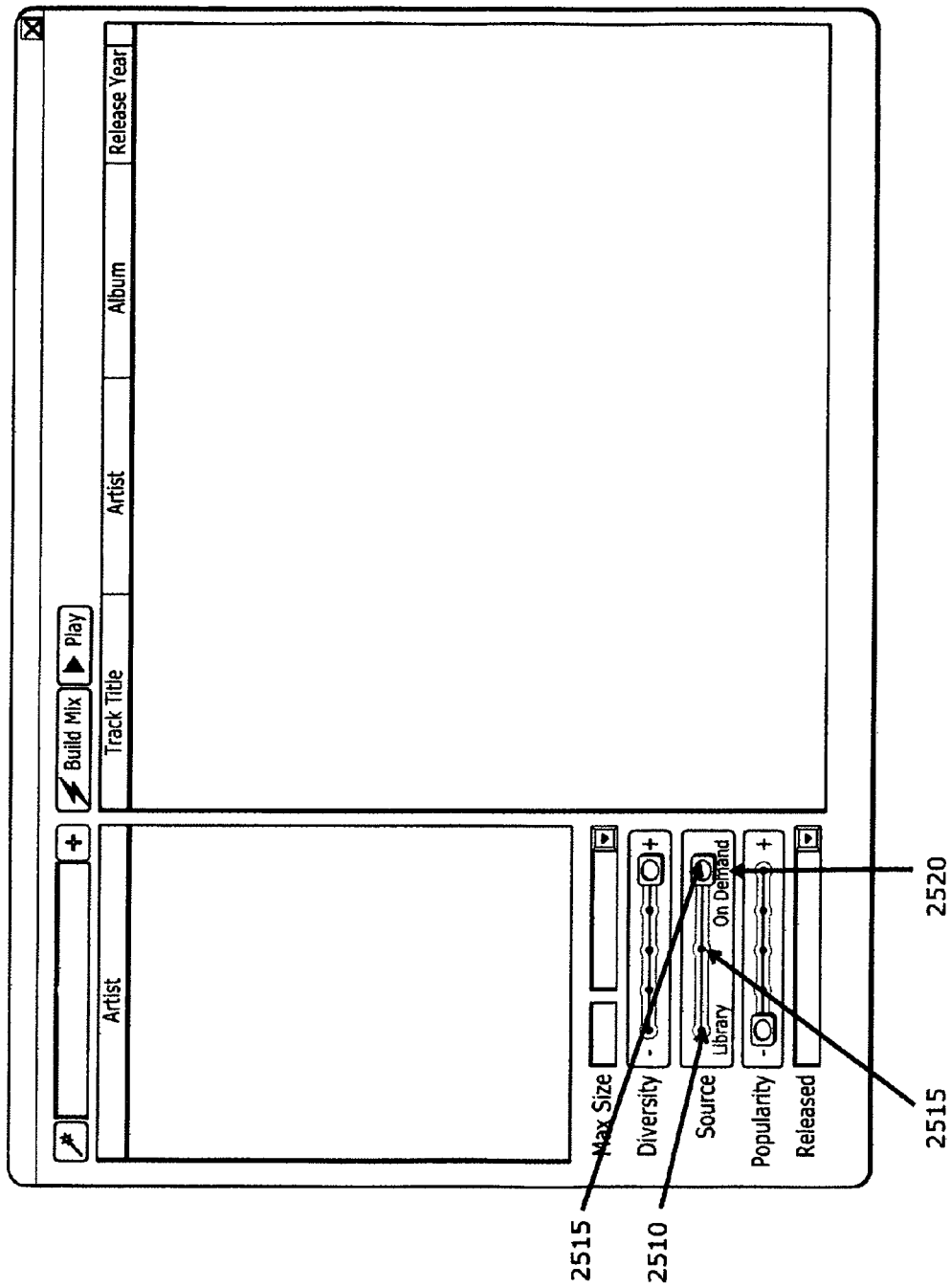
FIG. 27 is an exemplary user interface according to an embodiment of the present disclosure.

Another exemplary embodiment of a position of a source slider is depicted in FIG. 27. In this embodiment, the slider 2505 is located at position 2520 which corresponds to an on demand streaming media service. This means that the user wants a playlist generated only from an on-demand, streaming media service 76. The on-demand, streaming media service allows the user access to millions of media files. In some embodiments, the on-demand streaming media service is a subscription service which requires membership and/or a fee. Thus, the user can only access the media files located via an on-demand, streaming media service if he/she is a subscriber. In further embodiments, the user's level of access will depend on their membership status. For example, a non-subscriber to the on demand streaming media service could only access the first 30 seconds of a media file. Thus, the user is still able to generate a playlist including on-demand, streaming media service media (ODSMS) files, however, these ODSMS files will only be 30 seconds long (or any other pre-determined length or size). This allows the user to explore and access all media within a generated playlist, but also prompts the user to subscribe to the ODSMS in order to listen to the full-length version of the ODSMS media files. Thus, in the present example, if the user is a subscriber to the ODSMS, any playlists created that contain on-demand, streaming media service media files will contain full-length media files. Furthermore, considerations of other digital rights management schemes can also be taken into account, such as for example handling tethered downloads or limitations on transfer of media files between media or devices.

Another exemplary embodiment of a position of a source slider is depicted in FIG. 25. In this embodiment, the slider 2505 is located at position 2515 which corresponds to a mixture of both media sources. This means that the user wants a playlist generated from media files located on both the local media library and the ODSMS. Therefore, the generated playlist will contain a mixture of media file identifiers from both sources.

Additionally, the user can specify the level of diversity of the generated playlist through a diversity parameter located on a user interface. In one embodiment, the diversity parameter is based on the degree of variety or sameness among a classification with respect to the selected media file identifier(s). Thus, the user can select media file identifiers and using the diversity parameter, specify whether the generated playlist contains media file identifiers having a low level of variety to a high level of variety with respect to the selected media file identifier. For example, if the artist associated or the selected media file identifier associated with a media file, a high level of variety could produce a playlist with media file identifiers having artists different from the artist associated with the selected media file identifier, but similar in genre/era/and or release date. In another example, if a low level of variety is selected, the generated playlist can comprise the same or mostly the same artist in the playlist media file identifiers as the artist associated with the selected media file identifier.

In one embodiment, the diversity parameter is represented on the user interface as a slider. As depicted in FIG. 28, the playlist diversity parameter 325 is a slider. The slider further comprises positions located in between at least two polar levels of diversity in which each position corresponds to a particular level of diversity. In other embodiments, other types of visual indicators may be used to select and indicate a particular level of diversity. Specifically, the slider 2805 allows the user to choose from multiple levels of diversity. As can be seen in FIG. 28, the diversity parameter has a minus sign 2840, a plus sign 2835, and five positions (2810, 2815, 2820, 2825 and 2830) in between. The minus sign 2840 denotes that the user wants a low level of diversity within the playlist. The plus sign 2835 denotes that the user would like a high level of diversity within the playlist. Accordingly, the positions (2810, 2815, 2820, 2825 and 2830) in between the two ends allow the user to select intermediate levels of diversity. Thus, the user can select any desired level of diversity in generating the playlist.

For example, in FIG. 28, the diversity slider is set at the position closest to the minus sign 2840. In on embodiment, this means that the user wants a low level of diversity of artists within the playlist with respect to the selected media file identifier 2845. Therefore, as can be seen in FIG. 28, if the user clicks on the button 360, a playlist with artists that are diverse from the media file identifier 2845 in pane 305 is generated. For example, as discussed earlier, pane 310 displays the generated playlist 2850. As depicted in FIG. 28, the playlist 2850 further lists each media file identifier by media file title 1210, artist name 1215, album name 1220, and year of release 1225. As can be seen in FIG. 28, each media file identifier entry in the artist name 1215 column lists the same artist. Moreover, it is the same artist name associated with the selected media file identifier 600. This is because the diversity slider 2805 is set at the position 2810 corresponding to the lowest level of diversity or variety with respect to the selected media file identifier 600. Accordingly, the generated playlist contains media file identifier with the same artist as the selected media file identifier as the diversity is at a low level.

Another exemplary embodiment of a diversity slider used to shape a playlist is depicted in FIG. 29. As can be seen in FIG. 29, the slider 2805 is set at the position 2830 corresponding to the highest level of diversity. Meaning, the user wants a generated playlist with artists which are diverse or a with high level of variety with respect to the selected media file. Therefore, as can be seen in FIG. 29, if the user clicks on button 360, the system will generate a playlist with a variety of different artists with respect to the selected media file identifier 2845. However, in one embodiment, the artists in the playlist would share the some genre/era/release date as the selected artist. For example, a playlist is displayed in pane 310. However, unlike in FIG. 28, the artist name column 1215 lists artists which are different from the selected media file identifier 2845, but within the same genre.

Figure 30:
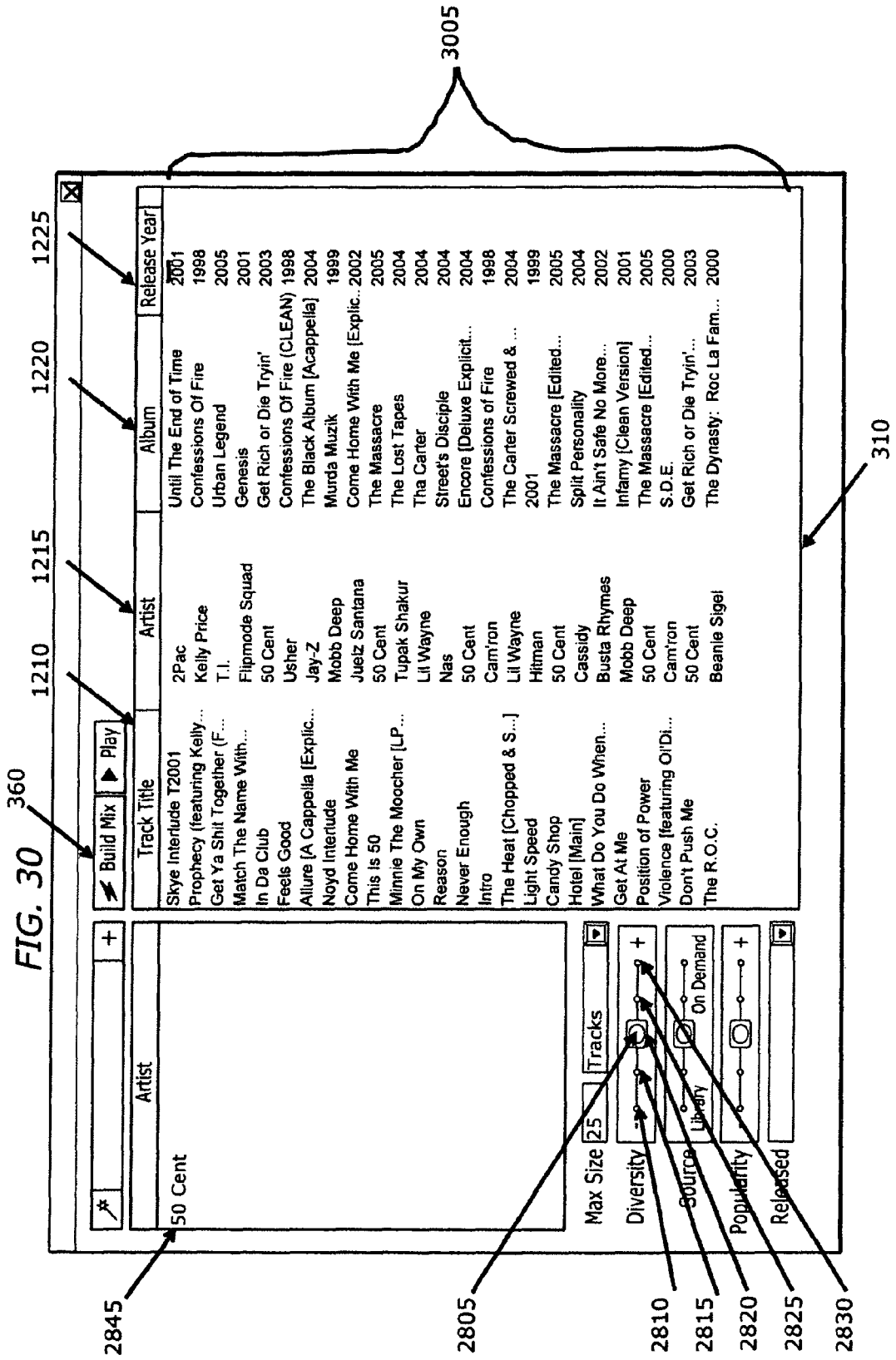
FIG. 30 is an exemplary user interface according to an embodiment of the present disclosure.

Another exemplary embodiment of a diversity slider used to shape a playlist is depicted in FIG. 30. As can be seen in FIG. 30, the slider 2805 is set at position 2820 which is located in the middle of the highest and lowest levels of diversity, meaning the user wants to generate a playlist with media file identifier in which their associated artists have an intermediate level of diversity with respect to the selected media file identifier 2845. Therefore, as can be seen in FIG. 30, if the user clicks on button 360, a playlist with an intermediate level of variety with respect to the artist associated with the selected media file identifier 2845. An intermediate level of variety corresponds to a mixture of media file identifiers which is the same as the selected media file identifiers and media file identifiers which is different from the selected media file identifier but within the same genre/era/and or release date. In some embodiments, the playlist can be evenly divided among the selected media file identifier. In other embodiments, the playlist may not be even due to the sources selected, availability of media files, and/or other parameters.

Figure 31:
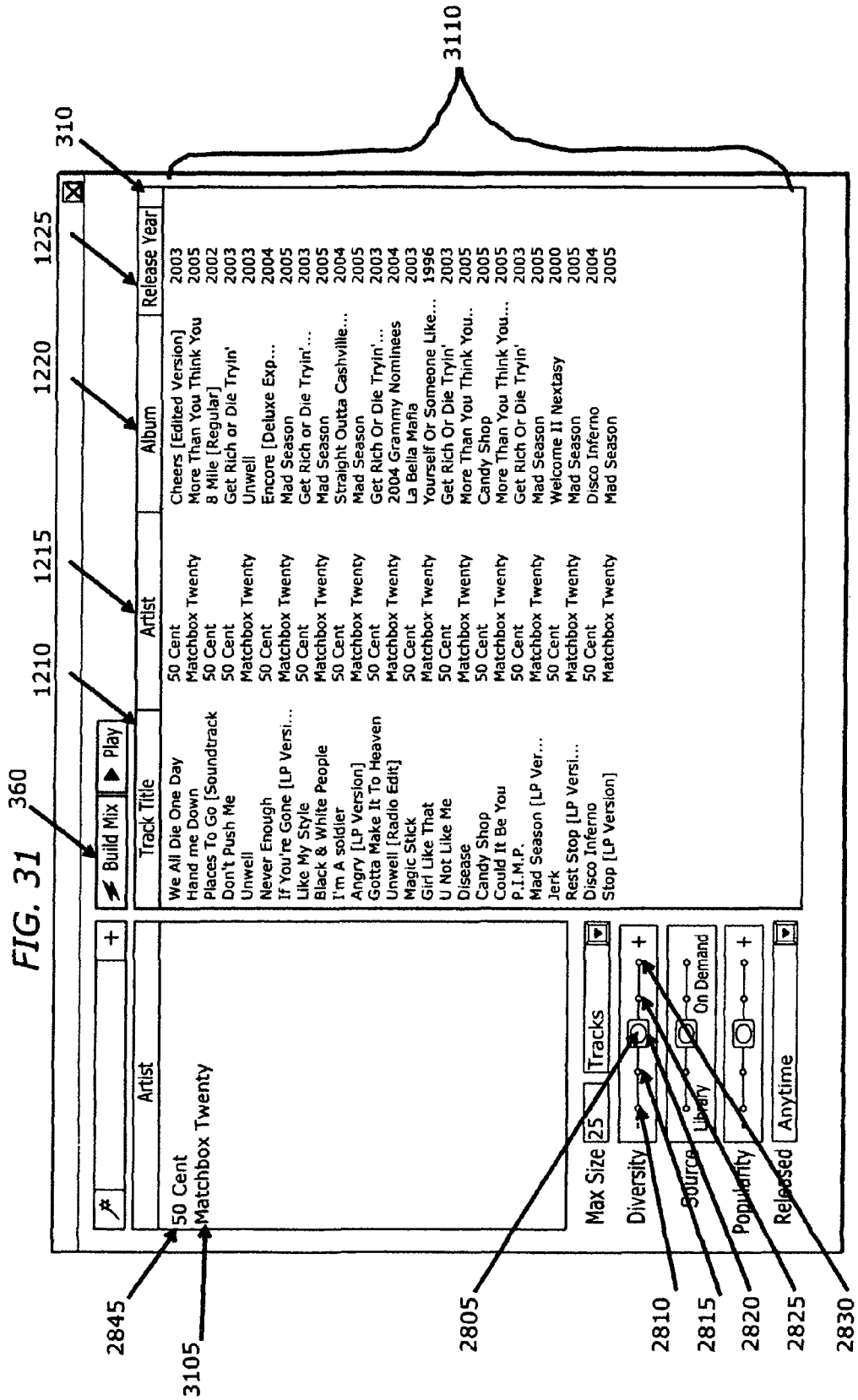
FIG. 31 is an exemplary user interface according to an embodiment of the present disclosure.

An exemplary embodiment of a playlist based on two media file identifier entries 2845 and 3105 is depicted in FIG. 31. As discussed herein, the user can select as many media file identifier entries as the user desires. Therefore, as can be seen in FIG. 31, if the user clicks on button 360, a playlist is generated with a mid level of variety to each the of selected media file identifiers 2845 and 3105. For example, a generated playlist 3110 is displayed in pane 310. The artists name column 1215 lists a mixture of only the two artists associated with the selected media file identifiers 2845 and 3105. Specifically, the selected media file identifier 2845 and 3105 has two associated artists, "50 cent" and "Matchbox Twenty." Accordingly, the generated playlist 3110 lists a playlist alternating "50 cent" and "Matchbox Twenty" as the only artist.

Figure 32:
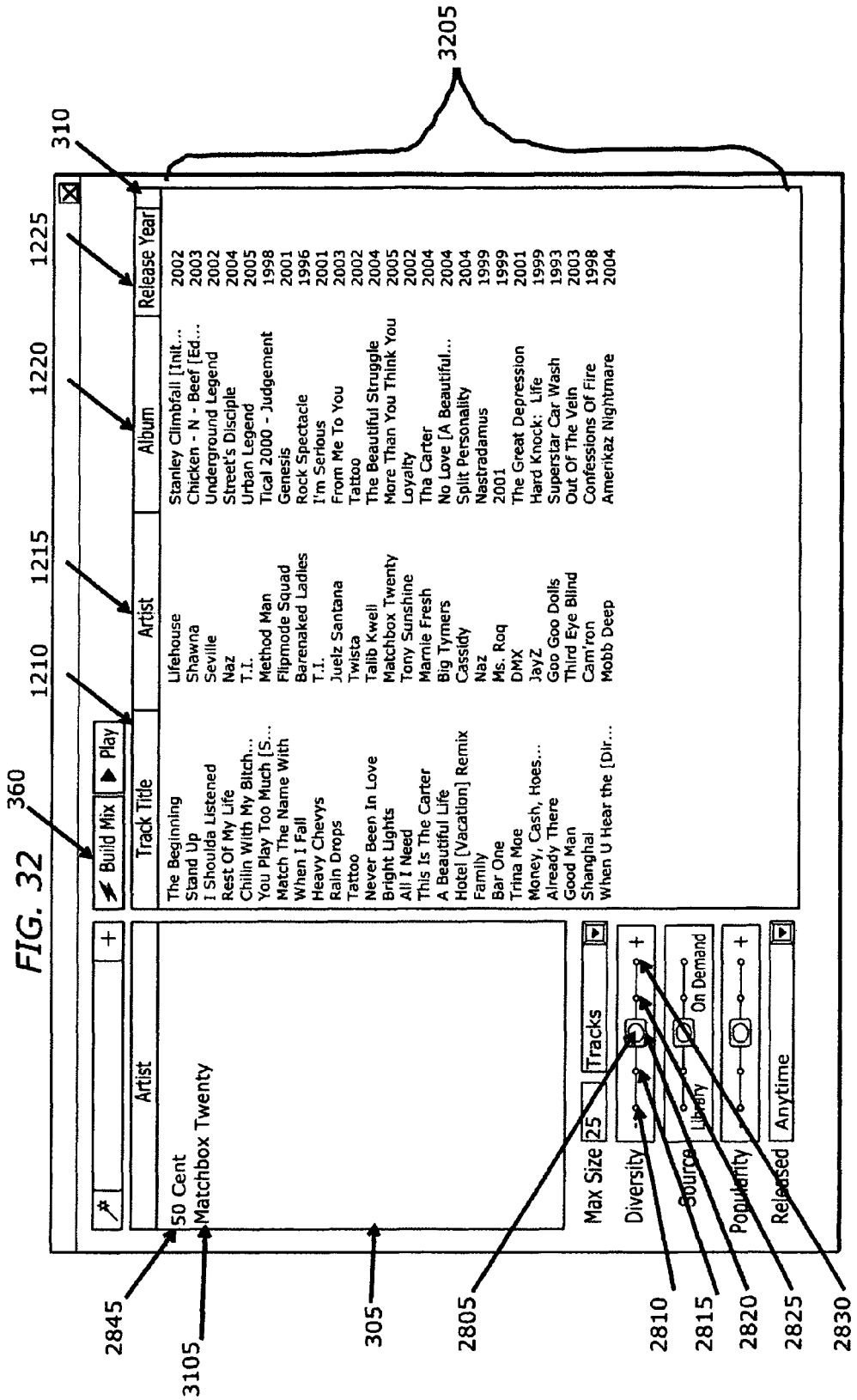
FIG. 32 is an exemplary user interface according to an embodiment of the present disclosure.

An exemplary embodiment of a diversity slider used to shape a playlist based on two media file identifier entries 2845 is depicted in FIG. 32. As can be seen in FIG. 32, the slider 2805 is set at position 2820 which is located at a mid level of diversity. Meaning, the user wants to generate a playlist with artists that have a mid level of diversity with respect to the selected media file identifiers 2845 and 3105. Therefore, as can be seen in FIG. 32, if the user clicks on button 360, a playlist is generated with a mid level of variety (but within a similar genre, era, or release date) with respect to each of the selected media file identifiers 2845 and 3105. For example, a generated playlist 3205 is displayed in pane 310. The artists name column 1215 lists a mixture of various artists associated with the media file identifiers in the playlist 3205 which are different from each of the artists associated with the selected media file identifiers 2845 and 3105, but within the same genre, era, or release date.

The user can also specify the level of popularity with respect to the media file identifiers in the generated playlist through a popularity parameter located on a user interface of the playlist creation application. In one embodiment, the popularity parameter allows the user to select media file identifiers and then generate a playlist which has media file identifiers with a particular level of popularity. For example, a user can select media file identifier(s) and select a high level of popularity. Thus, the generated playlist will only contain media file identifiers or will biased with media file identifiers that are very popular. In another example, if the selected media file identifiers are associated with a particular artist, a low level of popularity could product a playlist biased toward the least popular media file identifies associated with the artists in question (i.e., the most "obscure").

Figure 33:
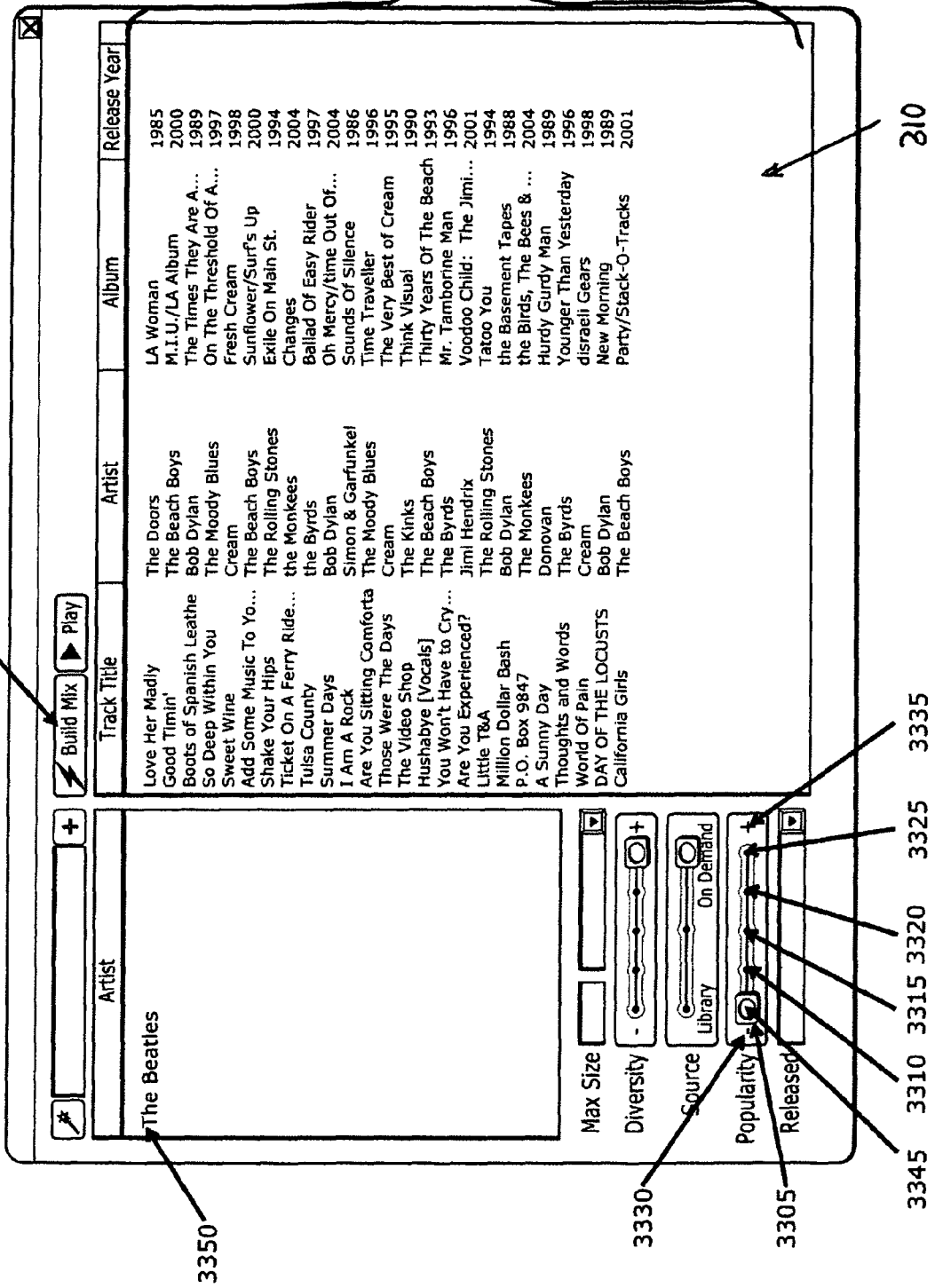
FIG. 33 is an exemplary user interface according to an embodiment of the present disclosure.

In one embodiment, popularity may be based how the user building the playlist has rated the media files, how other users with access to the media files have rated the media files, how personel at a service provider have rated the media file, the frequency that the media files are played by the user or other users, the frequency that the media files are requested by other users, the frequency that the media file identifier appears in the user's local media library, third party rating services, for example BILLBOARD, SOUNSCAN and the like, or any combination of the preceeding. In one embodiment, the popularity parameter is represented on the user interface as a slider. As can be seen in FIG. 33, the playlist popularity parameter is represented by a slider 3305. Specifically, the slider 3305 allows the user to choose from multiple levels of popularity. The slider further includes positions located in between at least two polar levels of popularity in which each position corresponds to a particular level of popularity. In particular, the popularity parameter includes a slider 3305 with five positions 3345, 3310, 3315, 3320, and 3325. Position 3345 corresponds to the lowest level of popularity. Position 3325 corresponds to the highest level of popularity. Positions 3310, 3315, and 3320 are located in between the highest and lowest level of popularity. These positions represent intermediate levels of popularity. Specifically, position 3310 corresponds to the second lowest level of popularity, position 3315 corresponds to a middle level of popularity, and position 3320 corresponds to the second highest level of popularity.

As depicted in FIG. 33, the slider 3305 is located at the position 3345 which corresponds to the lowest level of popularity. This means that the user wants a playlist generated comprising the least popular media files with selected media file identifiers. For example, a generated playlist 3340 is displayed in pane 310. The selected media file identifier 3350 is the "Beatles" and the popularity slider is set at the lowest level of popularity. Accordingly, the generated playlist 3340 contains the least popular tracks/media file identifiers from the Beatles.

Figure 34:
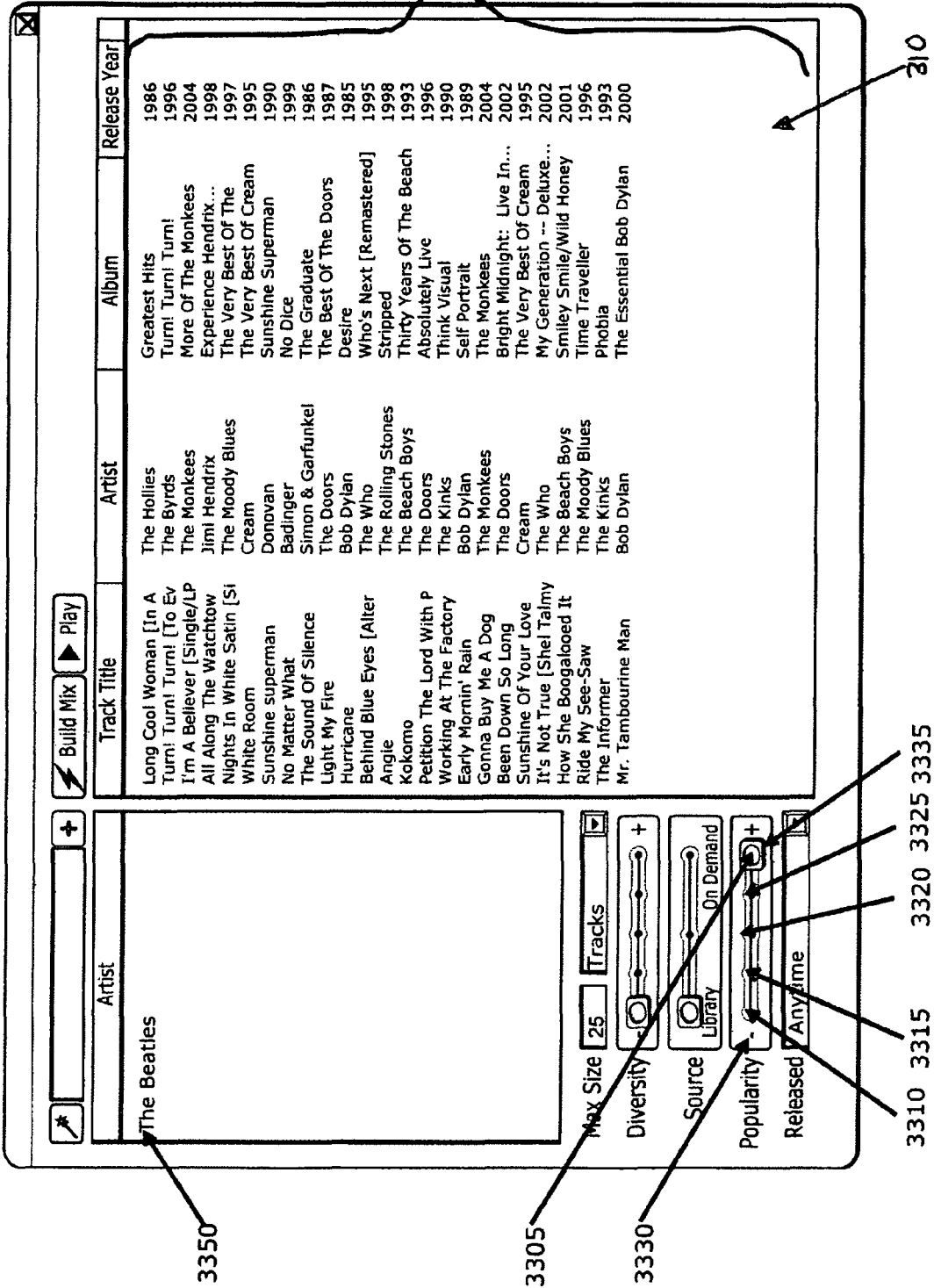
FIG. 34 is an exemplary user interface according to an embodiment of the present disclosure.

Another exemplary embodiment of a popularity slider is depicted in FIG. 34. In this embodiment, the slider 3505 is located at position 3335 which corresponds to the highest level of popularity. This means that the user wants a playlist generated only most popular media file identifiers. For example, a generated playlist 3405 is displayed in pane 310. The selected media file identifier 3350 is the Beatles and the popularity slider is set at the highest level of popularity. Accordingly, the generated playlist 3405 contains the most popular media file identifiers from the Beatles.

In a further embodiment, the parameters can also include a "date last played parameter", a "date last entered" parameter, and a ratings parameter. The user can apply these parameters in any combination with the parameters discussed above.

In one embodiment, the "date last played" parameter could influence the playlist by the date a media file was last played by the user. Thus, the user can specify the media files used in the generated playlist by the date they were last played by the user. In one embodiment, the date last played parameter could be represented by a pair of text boxes which would allow the user to enter a specific period of time. In another embodiment, the date last played parameter could be represented by a drop down box with a corresponding text field box where the user can enter a specific date into the text field and then select a "before" or "after" modifier from the drop down menu box. Meaning that, if the user wanted the generated playlist to not have media files played in the last month, the user could select the "before" from the drop down menu and then enter the date of the month. Thus, the generated playlist would only contain media file identifies associated with media files last played before that specified month. Accordingly, the date last played parameter could take any form within a user interface.

In one embodiment, the "date last entered" parameter could filter influence the playlist by the date a media file identifier was last entered into a media library. In one embodiment, the date last entered could correspond to the most recent date a media file was downloaded into the user's media library, added into the library from an external media device, other user, or CD. Furthermore, the date last entered could correspond to the most recent date of a media file identifier was streamed to a user. Thus, the user can specify the media file identifiers used in the generated playlist by the date they were last entered into the media library. In one embodiment, the date last entered parameter could be represented by a pair of text boxes which would allow the user to enter a specific period of time. In another embodiment, the date last entered parameter could be represented by a drop down box with a corresponding text field box where the use can enter a specific date into the text field and then select a "before" or "after" modifier from the drop down menu box. Meaning that, if the user wanted the generated playlist to have only media file identifiers entered into the media library within the last 6 months, the user could select the "after" from the drop down menu and then enter the date of the month. Thus, the generated playlist would only contain media file identifiers associated with media files last entered within the last 6 months. Accordingly, the date last entered parameter could take any form within a user interface.

In another embodiment, the parameters can also include a ratings parameter. In one embodiment, the ratings parameter allows a user to generate a playlist from only media file identifiers associated with media files having a specific associated rating. In one embodiment, the ratings could be applied by the user himself, by other users, or by any other third party rater. The ratings could be based on any type of scale. For example, the scale could be from 1-100 or based on a four star scale, with 1 start being the lowest. In one embodiment, the ratings parameter could be represented by a slider. In another embodiment, the ratings parameter could be represented by a drop down menu displaying different levels of ratings.

Figure 44:
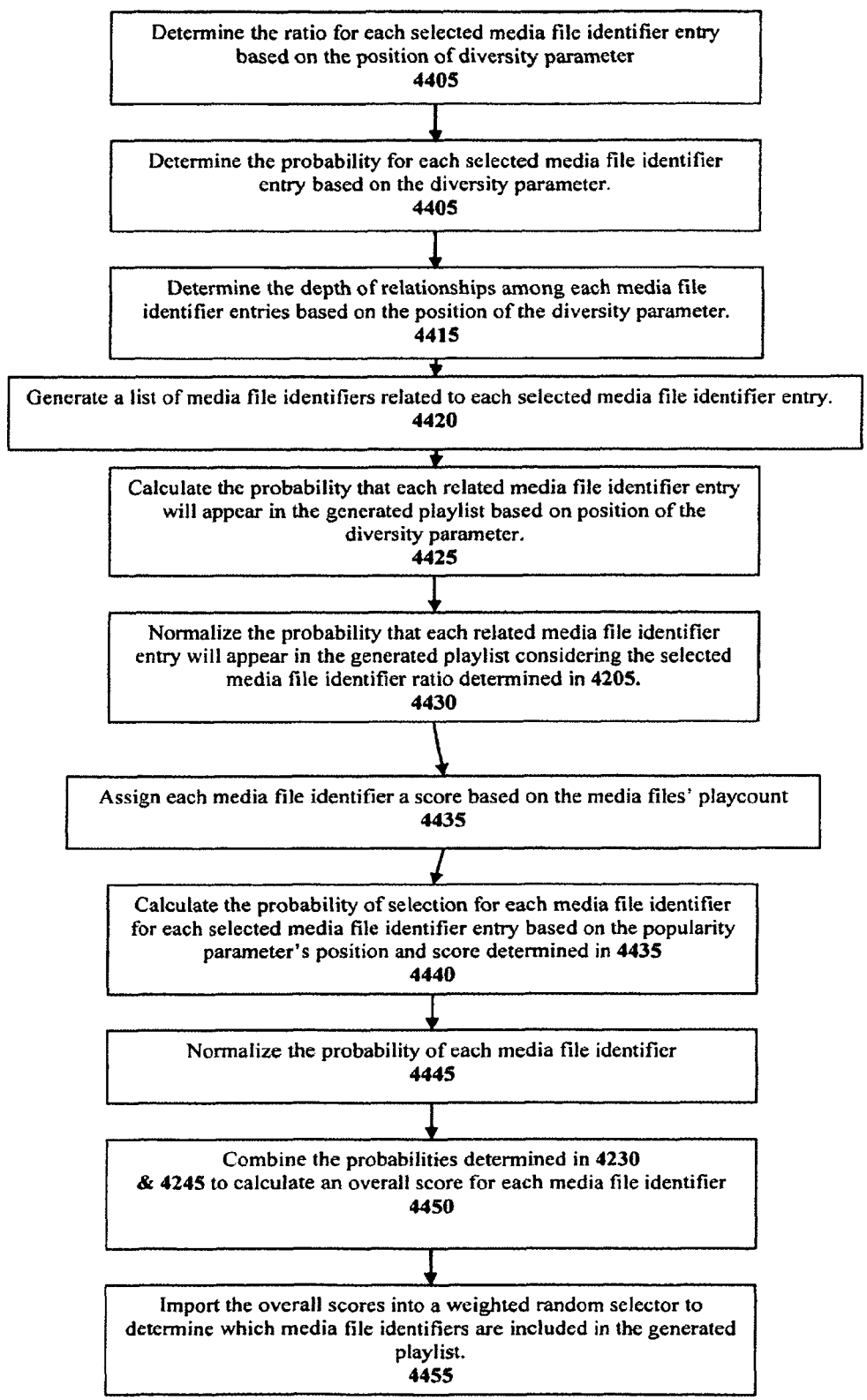
FIG. 44 is a high-level flowchart depicting algorithms used to generate a playlist according to an embodiment of the present disclosure.

In one embodiment, each of the media file identifiers or each media file identifier entry in the generated playlist is selected using algorithms which are calculated based on the selected media files, the diversity parameter setting, and the popularity parameter setting. FIG. 44, is a flowchart depicting one exemplary embodiment of a high-level process for generating a playlist based in part upon diversity setting.

As depicted in FIG. 44, the ratio of each selected media file identifiers based upon the position of the diversity slider is determined 4405. An example of a ratio relative to the diversity parameter's position is listed in the table located in the paragraph below, which table is referred to as the "Diversity Parameter Ratio" table. For ease of reference, the position with respect to the diversity slider will also be denoted with respect to FIG. 28.

| Diversity Slider Position | Ratio of each selected media file identifier = r |
|---|---|
| The slider is located at the lowest level of diversity. For example, in FIG. 28, at position 2810. | 1.0 |
| The slider is located at the second lowest level of diversity. For example, in FIG. 28, at position 2815. | 0.4 |
| The slider is located at the middle level of diversity. For example, in FIG. 28, at position 2820. | 0.3 |
| The slider is located at the second highest level of diversity. For example, in FIG. 28, at position 2825. | 0.2 |
| The slider is located at the highest level of diversity. For example, in FIG. 28, at position 2830. | 0.1 |

Once the ratio of each selected media file identifier is determined 4405, then the probability as a percentage for each selected media file identifier entry is determined 4410. In one embodiment, the selected media file identifier entry corresponds to the media file identifier that the user selects, whether the media file identifier entry is associated via a particular artist, album, track, or genre. The relative probability a selected media file identifier entry should appear in the generated playlist is determined by calculating a ratio in terms of a percentage based on the position of the diversity slider. This percentage may or may not be fixed. In one embodiment, the probability for each selected media file identifier entry can be calculated by the following formula:

$$P(s_x) = r/n.$$

Where n is the number of selected media file identifier entries and r is the ratio of the selected media file identifier determined from the Diversity Parameter Ratio table above. For example, if there are three selected media file identifier entries and the diversity slider is located at the second to lowest position, applying the formula above, the probability would be 10%, that is r=30% /3=10%.

Next, after the probability for each selected media file identifier is determined 4410, the depth of relationships among media file identifier entries is calculated based on the location of the slider in the diversity parameter 4415. Again, an example of this relationship depth relative to the diversity parameter is listed in the table located in the below paragraph, which table is referred to as the "Relationship Depth" table. For ease of reference, the diversity slider's position will also be denoted with respect to FIG. 28.

| Diversity Slider Position | Relationship Depth of each selected media file identifier = d |
|---|---|
| The slider is located at the lowest level of diversity. For example, in FIG. 28, at position 2810. | 0 |
| The slider is located at the second lowest level of diversity. For example, in FIG. 28, at position 2815. | 10 |
| The slider is located at the middle level of diversity. For example, in FIG. 28, at position 2820. | 20 |
| The slider is located at the second highest level of diversity. For example, in FIG. 28, at position 2825. | 30 |
| The slider is located at the highest level of diversity. For example, in FIG. 28, at position 2830. | 50 |

For each selected media file identifier entry, a list of related media file identifier entries is generated 4420.

Once the relationship depth is calculated 4415, the probability for each related media file identifier entry to appear in the generated playlist with respect to each selected media file identifier entry is determined 4425. Thus, the probability of a related media file identifier entry being selected for the generated playlist is determined. For related media file identifier, $c_0$-$c_{d-1}$, the relative probability of selection of that media file identifier within the generated playlist is $$P(c_x)' = \frac{1.0}{d + 10.0}$$

where "c" denotes the related media file identifier entry, and where "d" is the depth calculated from the table above.

Next, this probability is normalized on a 0-1.0 scale and the selected media file identifier ratio is taken into account 4430. Thus, the following formula is used:

$$P(c_x) = (1-r)\frac{P(c_x)'}{\sum_{i=0}^{i<d} P(c_i)'}.$$

Now that the eligible related media file identifier entries have been determined, the next step is to determine 4400 the probability of selection of a media file associated with the eligible media file identifier entry is determined. For example, if the selected media file identifier entry is associated via a particular artist, once a list of media file identifiers related by artist is generated, the next step is to determine the probability that a particular media file identifier associated with one of the related artists will be selected. The probability of selection for each media file identifier is based on the particular position of the popularity slider and the popularity of each media file associated with the media file identifier. Thus, each media file is assigned a "score" based on the media file's playcount 4435. The playcount represents the number of times a media file is played with respect to its related media file identifier entry. In one embodiment, the following formula is used to calculate the normalized (on a 0-100 scale) "score" of each media file based on it's playcount:

$$pc_{min} = \min(playcount(c, m_0) - playcount(c, m_{n-1}))$$
$$pc_{max} = \max(playcount(c, m_0) - playcount(c, m_{n-1}))$$
$$p = pop(c, m_x) = 100.0 * \frac{playcount(c, m_x) - pc_{min}}{pc_{max} - pc_{min}}$$

Next, the relative probability that a media file identifier should be included in the generated playlist based on the position of the popularity slider is determined 4440 using the table below. Again, an example of the position of the probability relative to the popularity slider is listed in the table located in the below paragraph, which table is referred to as the "Popularity Function" table. For ease of reference, the popularity slider's position will also be denoted with respect to FIG. 33.

Next, the probability of each media file is normalized to 4445 0-1.10 through the following formula 4445:

$$P(m_x) = \frac{P(m_x)'}{\sum_{i=0}^{i<n} P(m_i)'}$$

Once the probability of each media file and of each relative media file identifier entry are determined, the probabilities are combined 4450 through the following formula: $P(c,m_x) = P(c) \cdot P(m_x)$. Thus, each media file is assigned an overall "score" ($P(c,m_x)$).

Once every media file identifier has an overall score 4450, it is imported 4455 into a weighted random selector and the media file identifiers included in the generated playlist is determined. In further embodiments, a separate weighted random selector is used for each media source. For example, a separate weighted random generator is used for local media library files and a separate weighted random generator is used for media files from an on-demand, streaming media service. If the user selects media file identifiers from more than one media source, a coin toss (or random) algorithm is applied to determine which source a media file identifier is selected from. Thus, in one embodiment, each media file identifier entry in the generated playlist is selected based on the selected media file identifier entry, the diversity parameter setting, and the popularity parameter.

In further embodiments, the playlist can be further influenced according to the size or length of the playlist as described herein or according to the release date of the media files.

Figure 35:
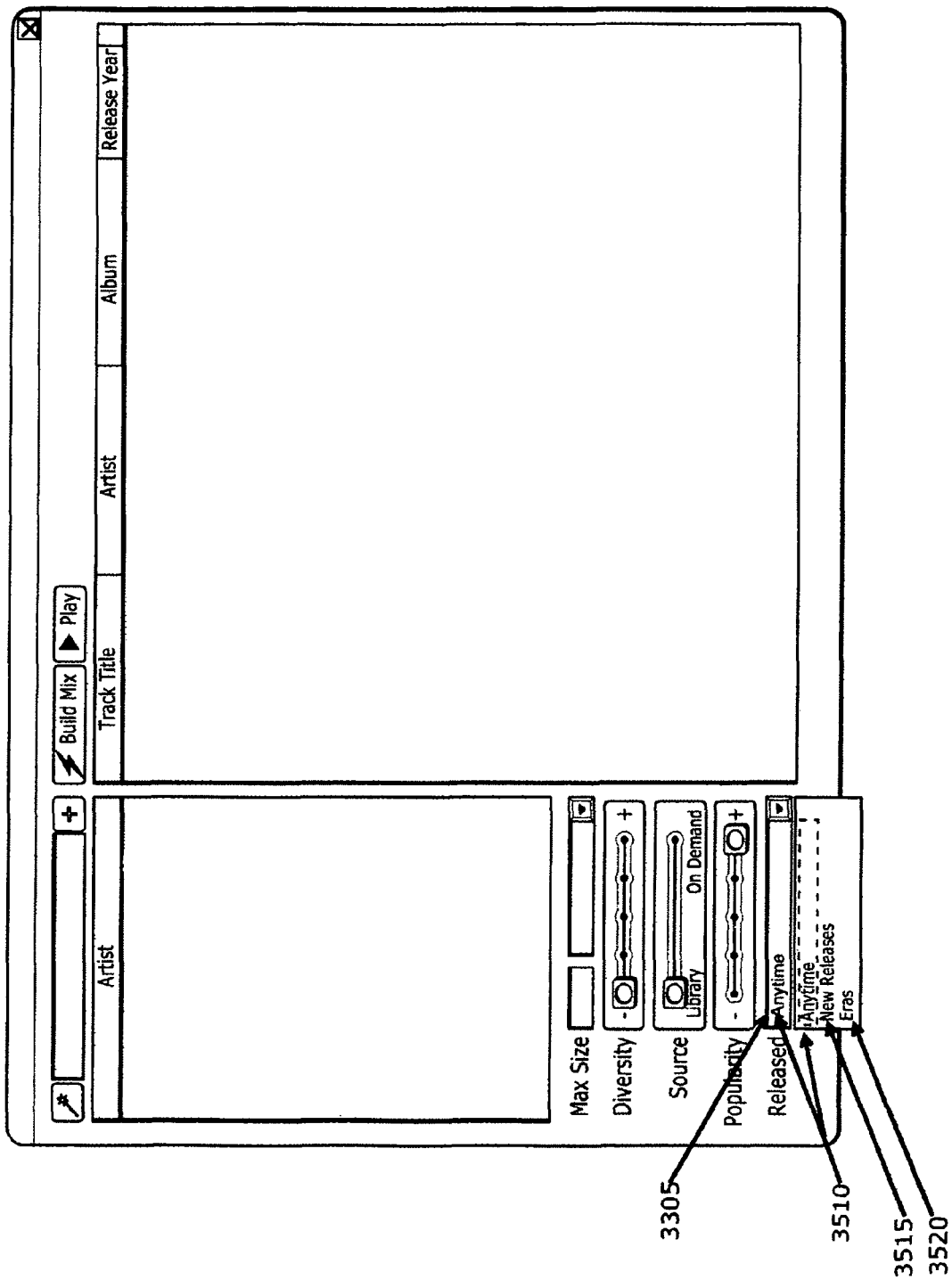
FIG. 35 is an exemplary user interface according to an embodiment of the present disclosure.

The time released parameter allows the user to limit the playlist according to when the media file was released. In one embodiment, the time released parameter includes a drop down menu where the user selects criteria from the drop down menu. One exemplary embodiment of a time released parameter is depicted in FIG. 35. In particular, the time released parameter comprises a drop down menu 3505. As depicted in FIG. 35, the drop down menu comprises several parameter options such as "Anytime" 3510, "New releases" 3515, and "Eras" 3520. The user can select a time released parameter by clicking on one of the options (3510, 3515, and 3520) from the drop down menu 3505. Of course, the user can select and apply further parameters and any combinations thereof. Regardless, the generated playlist will only contain media file identifiers within the selected time released option.

| Position of the Popularity slider | Function Applied |
|---|---|
| The slider is located at the lowest level of popularity. For example, in FIG. 33, at position 3345. | $1/(p \log(p + 1.0) + 1.0)$ + maxfilter. Where the maxfilter operation multiplies the resulting score by .000001 if p >50 |
| The slider is located at the second lowest level of popularity. For example, in FIG. 33, at position 3310. | $1/(p + 1)$ |
| The slider is located at the middle level of popularity. For example, in FIG. 33, at position 3315. | p |
| The slider is located at the second highest level of popularity. For example, in FIG. 33, at position 3320. | $p^2$ |
| The slider is located at the highest level of popularity. For example, in FIG. 33, at position 3325. | $p^2$ + minfilter. Where the minfilter operation multiplies the resulting score by .000001 if p <50 |

Figure 36:
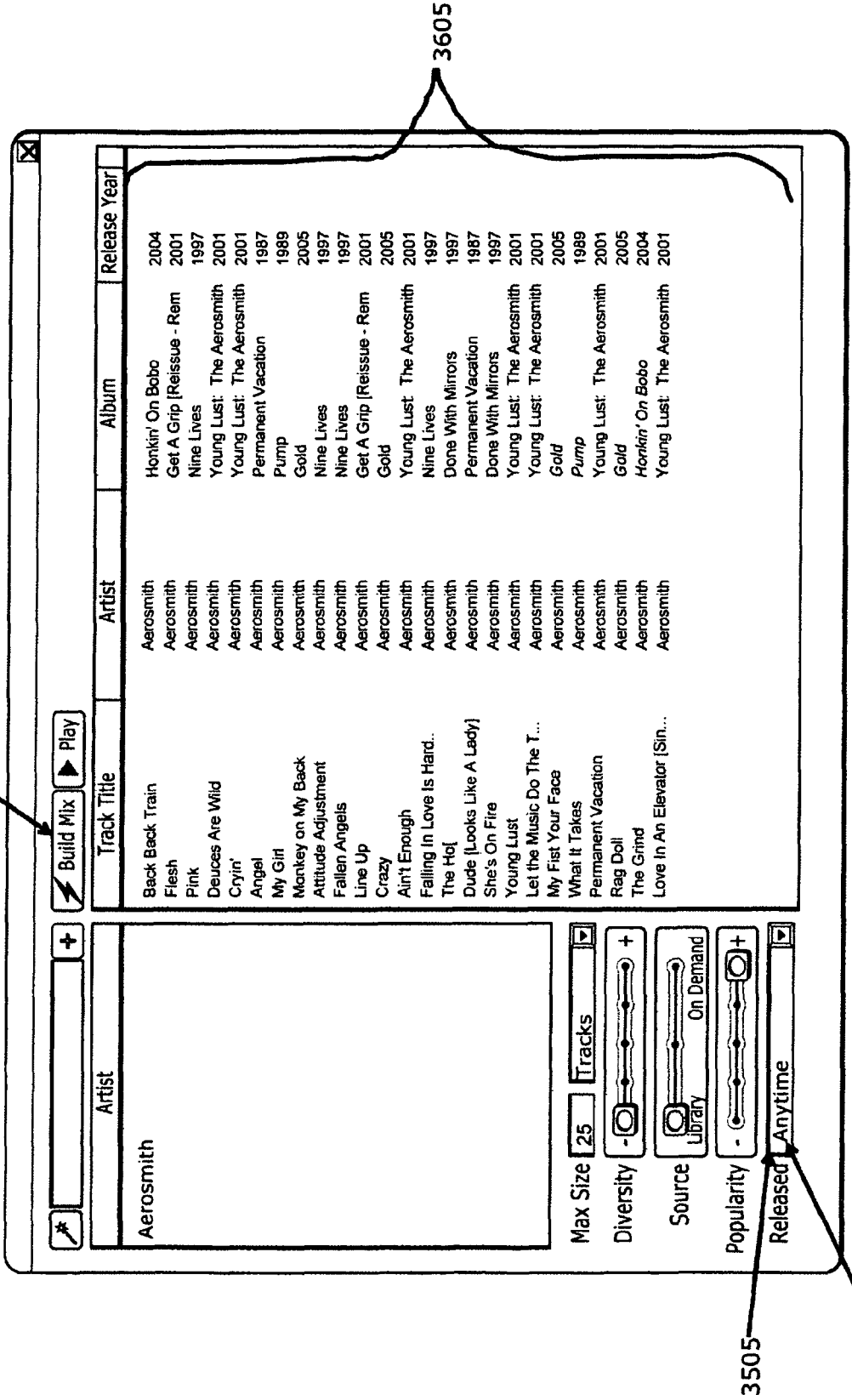
FIG. 36 is an exemplary user interface according to an embodiment of the present disclosure.

FIG. 35 depicts an exemplary embodiment of applying a time released parameter. Specifically, FIG. 35 depicts that the "Anytime" 3510 option is selected from the drop down menu 3505. Meaning, that the generated playlist will be based on the selected media file identifier in a pane 305 and is from anytime of release. In other words, the playlist will not be restricted as to the time of release. Once the user has selected the desired media file identifier and chosen the time release parameter, the user can click on a button 360 to generate a playlist. The generated playlist 3605 is depicted in FIG. 36. As can be seen in FIG. 36, the release year column 1225 lists items of media file identifier from all various years.

Figure 37:
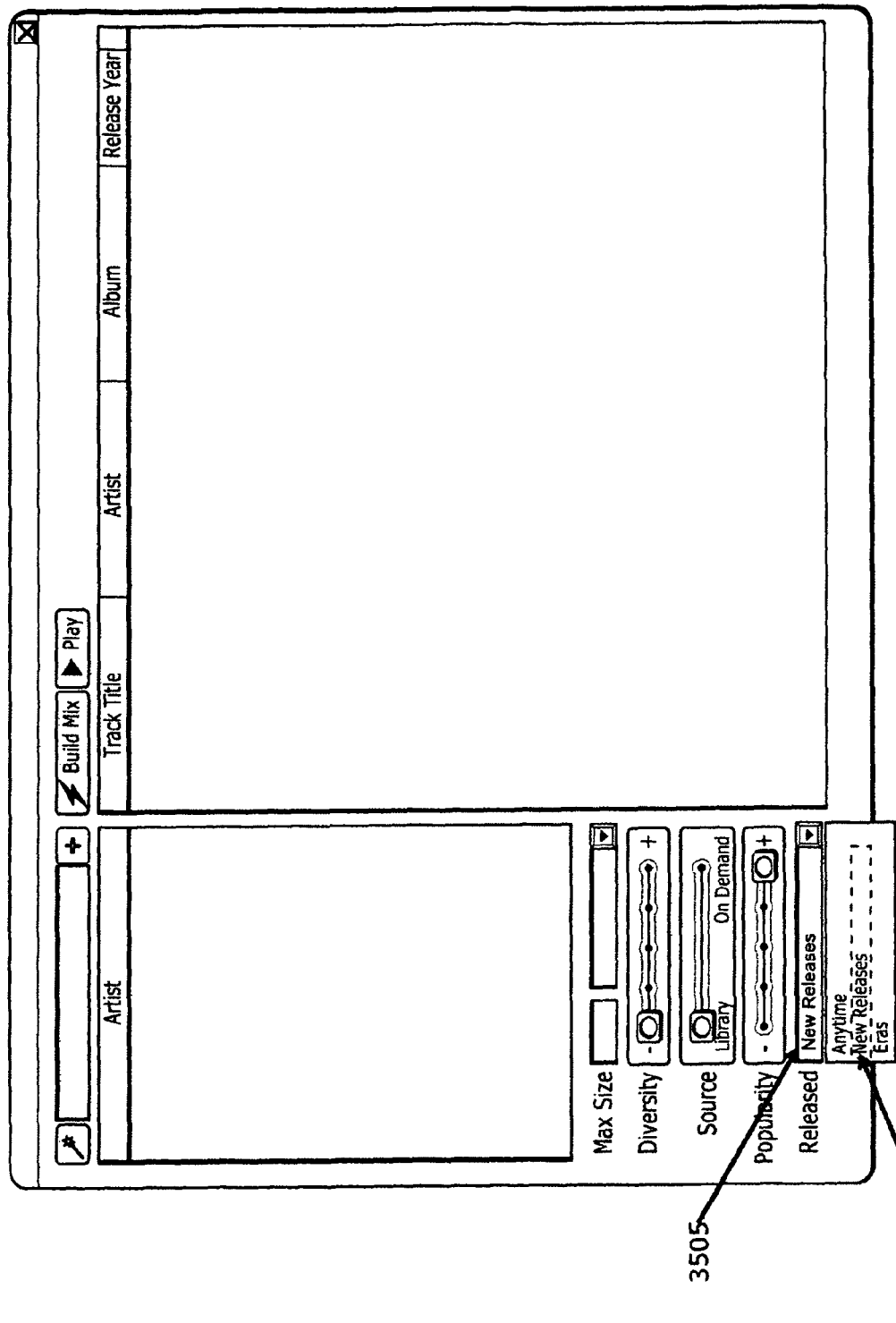
FIG. 37 is an exemplary user interface according to an embodiment of the present disclosure.
Figure 38:
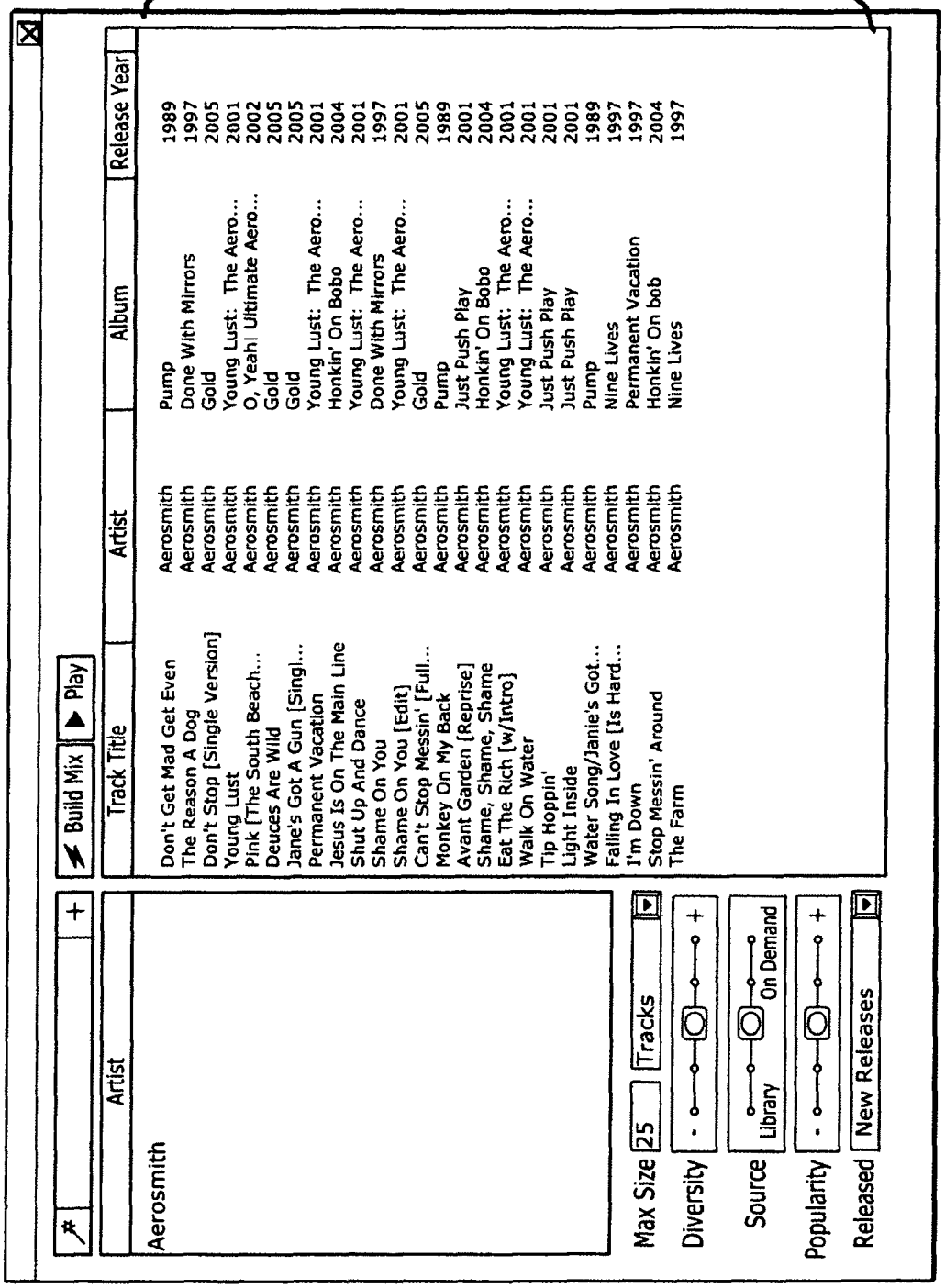
FIG. 38 is an exemplary user interface according to an embodiment of the present disclosure.

FIG. 37 depicts another exemplary embodiment of applying a time released parameter. Specifically, FIG. 37 depicts that the "New Releases" 3515 option is selected from the drop down menu 3505. Meaning, that the generated playlist will be based on the media files associated with the media file identifiers that are only new releases. A new release can be defined in various ways. For example, a new release can be defined by any period of time of which a media file was released such as within the last week, last 6 months, within the last 5 years, or within the last 10 years. In another example, a new release can be defined as media files that were released within any range of dates including the last year to the most recent month. Furthermore, the user can pre-set the time period for a new release. Once the user has selected the desired media file identifier and chosen the time release parameter, the user can click on a button 360 to generate a playlist. The generated playlist 3805 is depicted in FIG. 38. As can be seen in FIG. 38, the release year column 1225 lists the more recently released media file identifiers, depending on the sources available and parameters selected.

Figure 39:
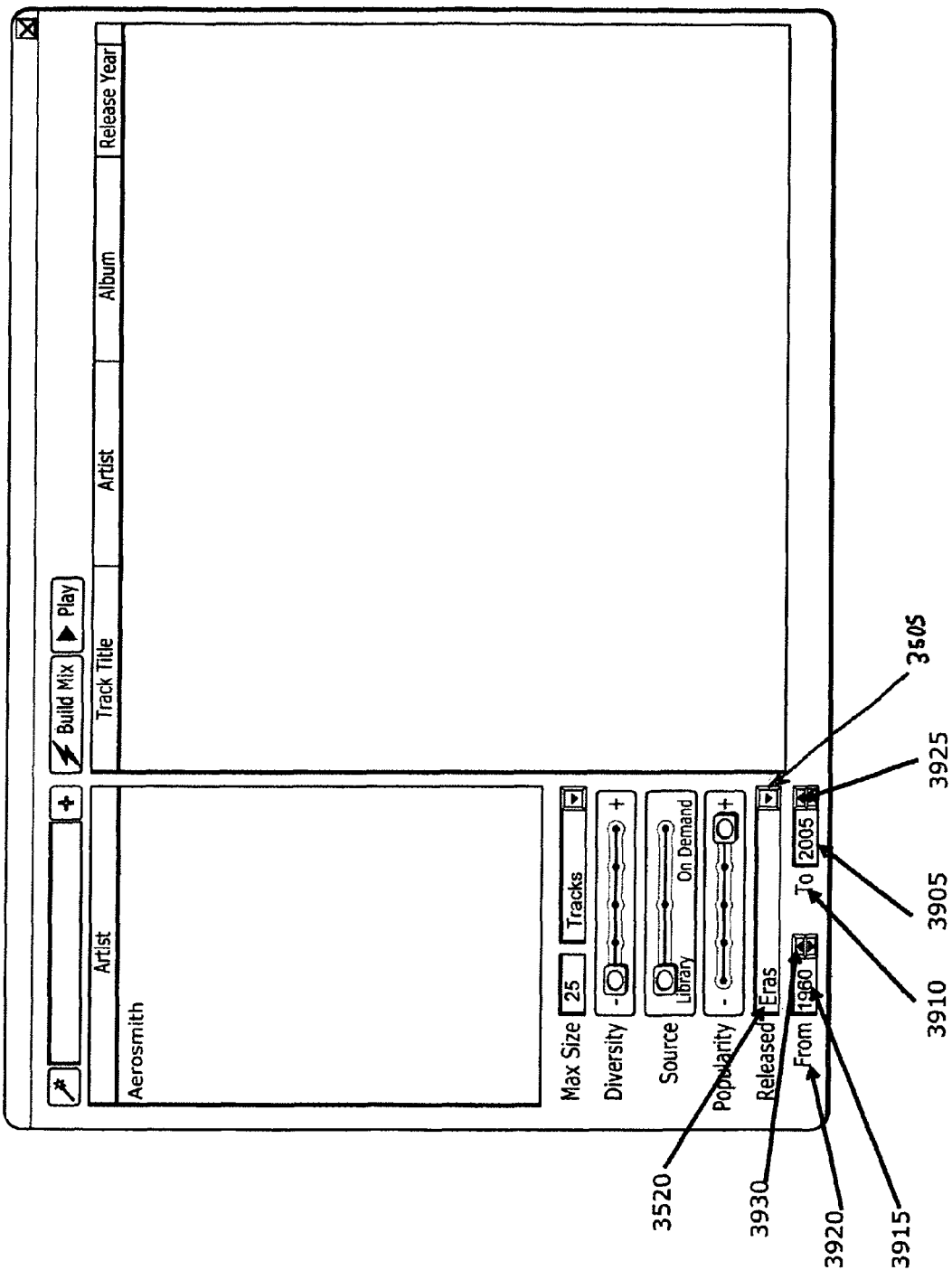
FIG. 39 is an exemplary user interface according to an embodiment of the present disclosure.

FIG. 39 depicts an exemplary embodiment of applying a time released parameter. Specifically, FIG. 39 depicts that the "Eras" 3520 option is selected from the drop down menu 3505. Meaning that the generated playlist will be based on the media files from a particular era. In this embodiment, as can be seen in FIG. 39, when the "Eras" 3520 option is selected, two text field boxes 3915 and 3905 and two respective scrollers 3930 and 3925 appear directly below the drop down menu 3205. These two text field boxes 3915 and 3905 allow the user to set a particular date range or era. The first text field box 3915 corresponds to a "From" and the second text field box 3905 corresponds to a "To". Meaning, the "From" text field boxes denotes the beginning date, and the "To" text field boxes denotes the ending date. Thus, the era is defined as the period between the two dates entered into the field boxes 3915, 3905.

In one embodiment, the user can populate both text field boxes by manually typing in the dates into the text field box. In another embodiment, the user can click the up/down arrows in the scrollers 3930 and 3925 to populate the text field boxes 3915, 2905 with the desired dates. For example, the each time the user clicks on the up arrow in the scroller, the date increases by a year. Thus, if the text field box read "1985", and the user clicked the up arrow once, the text field box would then read "1986." Similarly, each time the user clicks on the down arrow in the scroller, the date decreases by a year. Thus, if the text field box read "1985", and the user clicked the down arrow once, the text field box would then read "1984."

Figure 40:
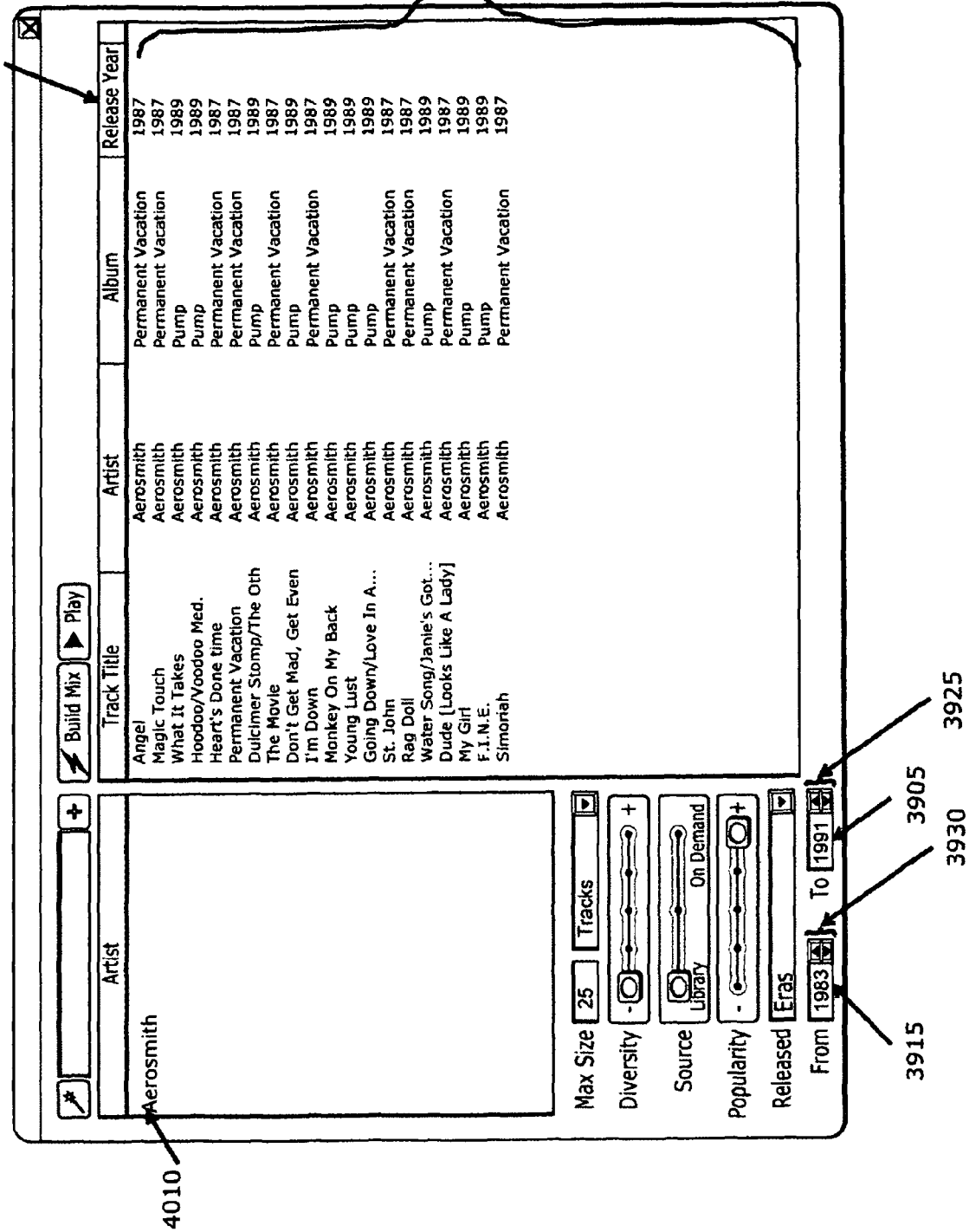
FIG. 40 is an exemplary user interface according to an embodiment of the present disclosure.

In a further embodiment, as depicted in FIG. 40, a playlist is generated using the era criteria. Specifically, the era selected is from 1983 to 1991 as can be seen in their respective text field boxes 3915, and 3905. Then, the user clicks a button 360 to generate a playlist 4005 as depicted in FIG. 40. As can be seen in FIG. 40, the generated playlist 4005 only contains media file identifier associated with media files released within the 1983 to 1991 time period. Thus, the user has created a playlist defined by an era criteria or time released parameter.

The user is not limited to influencing or customizing playlist using only one type of parameter. The user can combine any number of parameters discussed herein to customize and generate a playlist. Since in one embodiment, the user interface includes numerous parameters each having several criteria, the user has a large number of possible combinations. Furthermore, because the user can choose media from an on-demand, streaming media source, the combinations can yield the most up-to date playlist, making the playlist generation feature more dynamic. Additionally, the more parameters a user chooses, the more personalized and customized the generated playlist will be. The number and combination of parameters selected and applied is completely within the user's discretion. Accordingly, the user can choose not to apply any parameters and allow the default parameters to apply.

One exemplary embodiment of combining and applying parameters is depicted in FIG. 28. As depicted in FIG. 28, the selected media file identifier (2845) is located in pane 305. The playlist size parameter is configured so that the playlist play size is limited to 25 tracks. The media source parameter is configured so that the media sources are only from the streaming, on-demand media service. The diversity slider is configured at the lowest level of diversity. The popularity slider is configured at the highest level of popularity, and the released date parameter is not set. Thus, these configurations should yield a playlist 2850 which contains the most popular and least diverse media files from the selected media file identifiers 2845 located on the user's local media library.

The present disclosure also contemplates a user interface allowing the user to apply filters before generating a playlist. In one embodiment, the filters only apply or are available to the user if a specific type of media file identifier is selected. For example, the filter will only apply when a media file associates with a media file identifier containing explicit lyrics is selected to be included within the generated playlist. In one embodiment, the user interface may query the user when a media file with explicit lyrics is detected in the generated playlist. Then, the user can respond whether to include or delete the particular media file from the playlist. In another embodiment, the user can pre-set, via the user interface, the system to automatically filter out any media file identifiers containing explicit lyrics.

In another embodiment, the filter can only apply when the media file associated with a particular artist, track, album, genre, era, and/or release date is included in the generated playlist. The filter can remove any media files belonging to the particular artist, track, album, genre, era, and/or release date. Thus, the filter essentially does not allow specific "blacklisted" media file to be included in the generated playlist. For example, if the user does not like country music, the user, through the user interface, can specify that the system filters out (removes) any country media files in a generated playlist. Therefore, the generated playlist should not contain any media file related to country music One exemplary embodiment of the user interface is depicted in FIG. 3. As can be seen in FIG. 3, the user interface 310 is divided into two panes 305 and 310. Pane 305 is dedicated to collecting the selected media file identifiers entered by the user. Meaning, pane 305 displays all the media file identifiers associated with media file entries, regardless of number, that the user wants to create a playlist from. Pane 305 allows the use to view the media file identifiers the user is selecting a/or entering to create the playlist.

Figure 12:
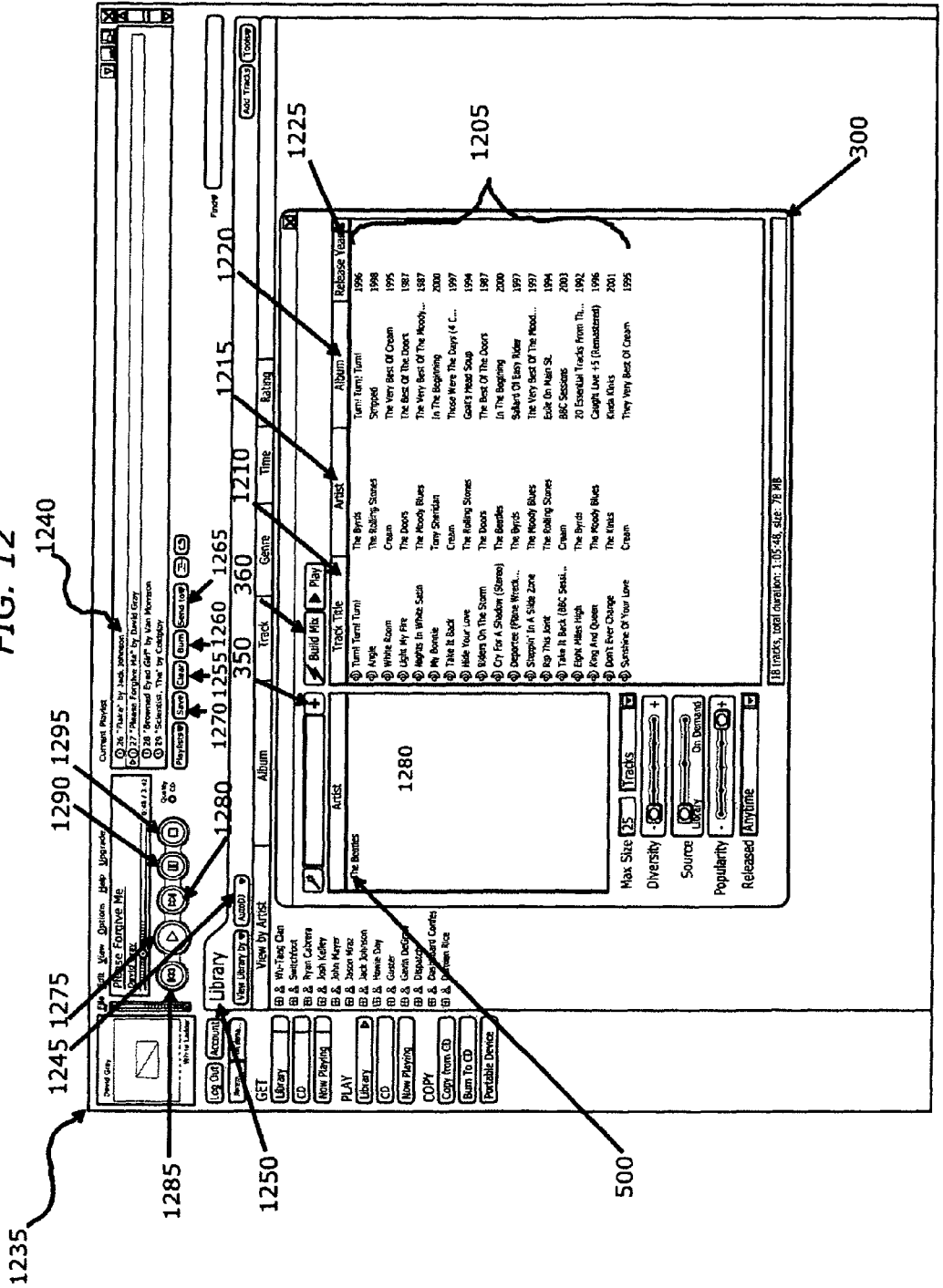
FIG. 12 is an exemplary user interface according to an embodiment of the present disclosure.

Pane 310 is dedicated to displaying the playlist once generated. As depicted in FIG. 12, when a playlist is generated, each media file identifier entry has several columns. In particular, for each media file identifier entry, there is a "Track Title" column 1210, an "Artist" column 1215, an "Album" 1220 column, and a "Released Year" 1225 column. Accordingly, the "Track Title" column lists the name or title of the media file identifier 1210. The "Artist" column 1215 lists the name of the artist associated with the media file. The "Album" 1220 column lists the name of the album the media file identifier belongs to, and the "Released Year" 1225 column lists the year the media file was released.

Referring back to FIG. 3, the user interface 300 further comprises a field box 315, several parameters (320, 325, 330, 340, 345), a tool 355 to randomly select media file identifiers from the user's media library, a button 350 for adding the content from the field box into the pane 305, a button 365 that initiates generating the playlist and a button which loads and plays the generated playlist into a media player.

As discussed above, once the playlist is generated, the user can further manage the playlist through the user interface and a media management program. Typically, a media management program includes a media player which facilitates many of the management functions for the user once the playlist is generated. In one embodiment, the playlist creation application may or may not include a media management program.

In one embodiment, the user interface for generating a playlist is incorporated into a media management program and accessed by a dedicated button. The playlist generation user interface can be incorporated into a media management program in a variety of other ways. For example, it can be accessed through a button on a toolbar, within a drop-down menu, within a right-click menu, or as interface that automatically loads when the media management program loads. It can be incorporated into media software and devices of varying types now know or to become known that are capable of carrying out the features and functions described herein, for example portable media players, cell phones, set top boxes, personal digital assistants, to name a few examples.

In another embodiment, the user interface for generating a playlist is a plug-in tool which can interface with various media management programs and is not necessarily automatically incorporated as a part of the media management program. Thus, in one embodiment, the playlist generation user interface is compatible with several media management programs so that it can seamlessly generate a playlist and the media management program can perform the management functions with regard to the playlist.

FIG. 12 depicts one exemplary embodiment of a user interface for generating a playlist which is incorporated into a media management program. As can be seen in FIG. 12, the user interface pane 300 for generating a playlist 1205 is displayed as a window 300 which overlays the media management program's user interface 1235.

In one embodiment, the media management program's user interface 1235 allows the user to play the generated playlist. Furthermore, in one embodiment, once the playlist is generated the media management program's user interface allows the user to stop, rewind, fast-forward, pause, and or/stop the playing of the playlist. For example, in FIG. 12, the media management user interface comprises buttons for playing the playlist 1275, fast-forwarding the playlist 1280, rewinding the playlist 1285, pausing the playlist 1290, and stopping the playlist playing 1295.

Furthermore, in one embodiment, the playlist generation user interface 300, is accessed by a button 1245 located in a window 1250 of the media management program's user interface 1235. Thus, in order for the user to access the playlist generation user interface 300, the user must open the media management program and click the appropriate links and button 1245.

In one embodiment, the user can manage the playlist by loading and playing the playlist in a media player. For example, in FIG. 12, the user can click a button 365 located on the playlist generation user interface which loads the generated playlist into a media player window 1240 and begins playing the playlist. From the media player window 1240, the user can start, stop, pause, rewind, and/or fast forward a media files/track within the playlist.

In another embodiment, the user can manage the playlist by rearranging and/or deleting the tracks within the playlist. The user can rearrange and/or delete tracks in the playlist generation user interface window 310 and/or the media player window 1240.

In another embodiment, the user can manage the playlist by saving the criteria to generate the playlist. In one embodiment, the user is able to save criteria such as which media file identifies were selected and each of the settings of the parameters the user selected. This allows the user to generate a playlist based on saved criteria at a later time. Thus, the user can save the criteria and generate a new playlist by accessing the criteria at any later time. Depending on when the user decides to later access and apply the criteria, the user can generate a completely new playlist each time the criteria is applied.

In another embodiment, the user can manage the playlist by clearing the loaded playlist from the media player. This allows the user to remove the entire generated playlist from the media player. For example, in FIG. 12, the button 1255 to clear the playlist 1255 is located on the media management program user interface.

In another embodiment, the user can save the generated playlist. For example, in FIG. 12, the button to save the playlist 1270 is located on the media management program user interface.

In another embodiment, the user can manage the playlist by sending the playlist to another person. In FIG. 12, the button 1265 to send the playlist to another person 1265 is located on the media management program user interface. In one embodiment, the user generates a playlist, clicks on the button 1265 dedicated for sending a playlist to another user, and then the user is prompted with a user interface which facilitates sending the playlist. In a further embodiment, the user interface for sending the playlist can prompt the user to enter as many email addresses of the intended playlist recipients as desired. In yet a further embodiment, through this user interface for sending a playlist, the user can annotate or editorialize each media file in a playlist before sending the playlist to another user. Furthermore, the user can add a personal message along with the playlist. Thus, the user can customize a generated playlist with comments and/or suggestions before sending to another user. Moreover, the receiving user will be able to view the comments along with play the playlist in a local media player.

In one embodiment, the ability to send and share playlists with another person will be dependent on certain Digital Rights Management (DRM). Thus, it is preferable that the playlists created and sent to another user will contain sufficient DRM information to ensure that the user to which the playlist is sent has sufficient rights to permit that other user to experience the media contained in the playlist.

In one embodiment, the ability to send and view media files among users depends on user's status as a subscriber or a non-subscriber to an on-demand, streaming media file service. For example, if the user who is sending the playlist (sending user) is a subscriber and the user receiving the playlist (receiving user) is also a subscriber, then the receiving user can have full access to each ODSMS media file on the playlist.

In another exemplary embodiment of sending a playlist, if the sending user is a subscriber to an ODSMS and the receiving user is a non-subscriber, then the receiving user may have limited access to the OSDSMS media files. For example, the receiving user may be limited to a pre-determined length clip of each ODSMS media file, such as a 30-second clip.

In another example of subscribing-sending-user and a non-subscribing-receiving-user, the receiving user may be given a pre-determined number of times the user can play each ODSMS media file. After this pre-determined number of times has been reached, the user is then limited to a default, pre-determined length of time for each media file (such as a 30-second clip). For example, the non-subscribing, receiving user may be limited to playing an ODSMS media at its full-length to three times. Thus, once the user had played the media file three times, the user can now only listen to 30 second clips of the media file. This allows a non-subscribing receiving user to listen to ODSMS music otherwise not available to the user, while enticing the user to subscribe to the service. Accordingly, in one embodiment, once the user's pre-determined number of full-length plays is used, the user is prompted and has the option to subscribe to the ODSMS.

Of course, these embodiments are not limited to ODSMS media files, but can apply to any media files which require a specified level of sharing and playing access. For example, it could be negotiated that certain media files generally not available for full-length sharing could be shared and played between any status (subscribing or non-subscribing) of users for a pre-determined number of times. For example, if there is a particular artist who wants to promote and/or entice users to listen to their media files, the artist or their representatives can allow a particular media file to be able to be emailed and shared among any type of users. However, the users are limited to playing the media file to a certain number of times.

In another embodiment, the user can manage the playlist by burning the playlist to a CD or transfer the media files to a portable device. For example, in FIG. 12, the user can burn the playlist in the media player window to a CD and/or transfer the media files to a portable device by clicking a button 1260 and selecting the option from a drop-down menu. In some embodiments, the ability to transfer media files to a portable device or burn media files to a CD may depend on whether the user has specified access to those media files. Particularly, the user may be required to pay for files not located on the user's local media library. For example, the user may be required to pay for files located on an on-demand, streaming media service. Thus, the user may be required to pay a price for each media file before downloading or burning the media files. In another example, the user may be required to be subscriber to a service that allows the user to download and burn media files.

In a further embodiment, the user can perform any of the above managing functions in any combination as the user desires. For example, once the playlist is generated, the user can delete tracks from the playlist, play the playlist, and then send the playlist to another user.

Those skilled in the art will recognize that the method and system of the present invention within the application, may be implemented in many manners and as such is not to be limited by the foregoing exemplary embodiments and examples. In other words, functional elements being performed by a single or multiple components, in various combinations of hardware and software, and individual functions can be distributed among software applications at either the client or server level. In this regard, any number of the features of the different embodiments described herein may be combined into one single embodiment and alternate embodiments having fewer than or more than all of the features herein described are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present invention covers conventionally known and features of those variations and modifications through the system component described herein as would be understood by those skilled in the art.

We claim:

1. A method of creating a playlist comprising:

receiving a first data set associated with a first media file, said first data set comprising an attribute associated with said first media file, and at least one playlist parameter specified by the user to influence playlist creation, said at least one user-specified playlist parameter to be used in addition to the associated attribute to influence playlist creation, the at least one user-specified playlist parameter comprising source information identifying sources from which media files are identified for inclusion in said playlist, wherein said inclusion of each media file is based at least in part on determining and applying a weight to each media file's source according to a source type and location of each source;

creating a list of candidate media file identifiers based on said first data set, said at least one user-specified playlist parameter and relationship data wherein each of said candidate media file identifiers is associated with a candidate media file;

selecting, via a processor, said candidate media file identifiers to be included in said playlist based at least in part on whether an attribute associated with said candidate media files is similar to said attribute associated with said first media file and also based at least in part on said at least one user-specified playlist parameter; and creating said playlist based upon said selected candidate media file identifiers.

2. The method of claim 1 wherein said relationship data is stored on a server.

3. The method of claim 1 wherein said attribute of either one or both of said candidate media file and said first media file comprises an artist name.

4. The method of claim 1 wherein said attribute of either one or both of said candidate media file and said first media file comprises an album name.

5. The method of claim 1 wherein said attribute of either one or both of said candidate media file and said first media file comprises a media file name.

6. The method of claim 1 wherein said attribute of either one or both of said candidate media file and said first media file comprises an id associated with said first media file.

7. The method of claim 1 wherein said attribute of either one or both of said candidate media file and said first media file is derived from metadata associated with either one or both of said candidate media file and said first media file.

8. The method of claim 1 wherein said first media file comprises an audio file.

9. The method of claim 1 wherein said first media file comprises a video file.

10. The method of claim 1 wherein said relationship data is stored as a graph with a media file of said playlist associated to vertexes of said graph and edges of said graph represent relationships between said media file.

11. The method of claim 10 wherein said edges contain weights corresponding to the strength of said relationships.

12. The method of claim 1 wherein said relationship data is based on explicit user behavior.

13. The method of claim 1 wherein said relationship data is based on implicit user behavior.

14. The method of claim 1 wherein said playlist comprises at least one media file identifier associated with a media file.

15. The method of claim 14 wherein said media file identifier comprises a pointer.

16. The method of claim 14 wherein said media file identifier comprises a uniform resource locator.

17. The method of claim 14 wherein said media file identifier is associated with a media file that can be acquired by streaming said media file.

18. The method of claim 14 wherein said media file identifier is associated with a media file that can be downloaded.

19. The method of claim 14 wherein said media file identifier is associated with a media file that can be located on a user's computing device.

20. The method of claim 1 wherein said at least one playlist parameter further comprises a size parameter for influencing a total size of said playlist.

21. The method of claim 20 wherein said total size is based on a number of media files.

22. The method of claim 20 wherein said total size is based on a temporal length.

23. The method of claim 20 wherein said total size is based on a file size.

24. The method of claim 1 wherein said source information comprises a source parameter for influencing a media file source of media files of said playlist.

25. The method of claim 24 wherein said media file source is an on demand streaming media service.

26. The method of claim 24 wherein said media file source is a local media library.

27. The method of claim 24 wherein said media file source comprises an on demand streaming media service and a local media library.

28. The method of claim 1 wherein said at least one playlist parameter further comprises a popularity parameter for influencing a degree of popularity associated with media files of said playlist.

29. The method of claim 1 wherein said at least one playlist parameter further comprises a date released parameter for restricting media files of said playlist to a time period.

30. The method of claim 29 wherein said time period comprises an era defined by two years.

31. The method of claim 28 wherein said at least one playlist parameter further comprises a diversity parameter for influencing a level of diversity for media files identified for said playlist, each of said candidate media file identifiers from which said media files are identified having a score that is determined based on said diversity parameter and said popularity parameter, said selecting said candidate media identifiers to be included in said playlist being further based on scores determined for said candidate media file identifiers based on said diversity and popularity parameters.

32. A method of creating a playlist comprising:
receiving a first user input representing selecting a media file identifier associated with a media file and at least one playlist parameter specified by a user to influence playlist creation, said at least one user-specified playlist parameter to be used in addition to one or more media file attributes to influence playlist creation, the at least one user-specified playlist parameter comprises source information from which media files are identified for inclusion in said playlist, wherein said inclusion of each media file is based at least in part on determining and applying a weight to each media file's source according to a source type and location of each source;
receiving a second user input representing a desire to create said playlist;
sending via a processor, upon said second user input, a data set associated with said media file and said user-specified playlist parameter to a remote location for creating said playlist based in part on said data set, said at least one user-specified playlist parameter and relationship data;
receiving said created playlist from said remote location; and
facilitating the display of said playlist.

33. The method of claim 32 wherein said media file identifier is selected by receiving a search input criteria.

34. The method of claim 33 wherein said input criteria is an artist name.

35. The method of claim 33 wherein said input criteria is a media file name.

36. The method of claim 32 wherein said at least one playlist parameter further comprises a size parameter for influencing a total size of said playlist.

37. The method of claim 36 wherein said total size is based on a number of media files.

38. The method of claim 36 wherein said total size is based on a temporal length.

39. The method of claim 36 wherein said total size is based on a file size.

40. The method of claim 32 wherein said source information comprises a source parameter for influencing a media file source of media files of said playlist.

41. The method of claim 40 wherein said media file source is an on demand streaming media service.

42. The method of claim 40 wherein said media file source is a local media library.

43. The method of claim 40 wherein said media file source is a mixture of an on demand streaming media service and a local media library.

44. The method of claim 32 wherein said at least one playlist parameter further comprises a popularity parameter for influencing a degree of popularity associated with media files of said playlist.

45. The method of claim 32 wherein said at least one playlist parameter further comprises a date released parameter for restricting media files of said playlist to a time period.

46. The method of claim 45 wherein said time period comprises an era defined by two years.

47. The method of claim 44 wherein said at least one playlist parameter further comprises a diversity parameter for influencing a level of diversity for media files identified for said playlist, each of a plurality of candidate media files from which said media files are identified having a score that is determined based on said diversity parameter and said popularity parameter, said playlist creation being further based on said scores determined for said candidate media files based on said diversity and popularity parameters.

48. The method of claim 32 wherein said data set comprises an attribute associated with said first media file.

49. The method of claim 48 wherein said attribute is derived from metadata associated with said first media file.

50. The method of claim 48 wherein said attribute comprises an artist name.

51. The method of claim 48 wherein said attribute comprises an album name.

52. The method of claim 48 wherein said attribute comprises a media file name.

53. The method of claim 48 wherein said attribute comprises an id associated with said first media file.

54. The method of claim 32 wherein said first media file comprises an audio file.

55. The method of claim 32 wherein said first media file comprises a video file.

56. The method of claim 32 wherein said relationship data is stored as a graph with a media file of said playlist associated to vertexes of said graph and edges of said graph represent relationships between said media file.

57. The method of claim 56 wherein said edges contain weights corresponding to the strength of said relationships.

58. The method of claim 32 wherein said relationship data is based on explicit user behavior.

59. The method of claim 32 wherein said relationship data is based on implicit user behavior.

60. The method of claim 32 wherein said playlist comprises at least one media file identifier associated with a media file.

61. The method of claim 60 wherein said media file identifier comprises a pointer.

62. The method of claim 60 wherein said media file identifier comprises a uniform resource locator.

63. The method of claim 60 wherein said media file identifier is associated with a media file that can be acquired by streaming said media file.

64. The method of claim 60 wherein said media file identifier is associated with a media file that can be downloaded.

65. The method of claim 60 wherein said media file identifier is associated with a media file that can be located on a user's computing device.

66. The method of claim 32 wherein said remote location comprises a server.

67. The method of claim 32 wherein said remote location comprises a database located on a server.

68. The method of claim 32 wherein said remote location comprises a database located on the internet.

69. The method of claim 32 wherein said remote location comprises a remote computing device.

70. A method of creating a playlist comprising:
receiving a first user input representing selecting a media file identifier associated with a media file and at least one playlist parameter specified by a user to influence playlist creation, said at least one user-specified playlist parameter to be used in addition to one or more media file attributes to influence playlist creation, the at least one user-specified playlist parameter comprises source information from which media files are identified for inclusion in said playlist, wherein said inclusion of each media file is based at least in part on determining and applying a weight to each media file's source according to a source type and location of each source;
receiving a second user input representing a desire to create said playlist;
creating via a processor, upon said second user input, said playlist based upon relationship data previously accessed from a remote location, said at least one user-specified playlist parameter and a data set associated with said media file; and
facilitating the display of said playlist.

71. The method of claim 70 wherein said media file identifier is selected by receiving a search input criteria.

72. The method of claim 71 wherein said input criteria is an artist name.

73. The method of claim 71 wherein said input criteria is a media file name.

74. The method of claim 70 wherein said at least one playlist parameter further comprises a size parameter for influencing a total size of said playlist.

75. The method of claim 74 wherein said total size is based on a number of media files.

76. The method of claim 74 wherein said total size is based on a temporal length.

77. The method of claim 74 wherein said total size is based on a file size.

78. The method of claim 70 wherein said source information comprises a source parameter for influencing a media file source of media files of said playlist.

79. The method of claim 78 wherein said media file source is an on demand streaming media service.

80. The method of claim 78 wherein said media file source is a local media library.

81. The method of claim 78 wherein said media file source is a mixture of an on demand streaming media service and a local media library.

82. The method of claim 70 wherein said at least one playlist parameter further comprises a popularity parameter for influencing a degree of popularity associated with media files of said playlist.

83. The method of claim 70 wherein said at least one playlist parameter further comprises a date released parameter for restricting media files of said playlist to a time period.

84. The method of claim 83 wherein said time period comprises an era defined by two years.

85. The method of claim 82 wherein said at least one playlist parameter further comprises a diversity parameter for influencing a level of diversity for media files identified for said playlist, each of a plurality of candidate media files from which said media files are identified having a score that is determined based on said diversity parameter and said popularity parameter, said playlist creation being further based on said scores determined for said candidate media files based on said diversity and popularity parameters.

86. The method of claim 70 wherein said data set comprises an attribute associated with said first media file.

87. The method of claim 86 wherein said attribute is derived from metadata associated with said first media file.

88. The method of claim 86 wherein said attribute comprises an artist name.

89. The method of claim 86 wherein said attribute comprises an album name.

90. The method of claim 86 wherein said attribute comprises a media file name.

91. The method of claim 86 wherein said attribute comprises an id associated with said first media file.

92. The method of claim 70 wherein said first media file comprises an audio file.

93. The method of claim 70 wherein said first media file comprises a video file.

94. The method of claim 70 wherein said relationship data is stored as a graph with a media file of said playlist associated to vertexes of said graph and edges of said graph represent relationships between said media file.

95. The method of claim 94 wherein said edges contain weights corresponding to the strength of said relationships.

96. The method of claim 70 wherein said relationship data is based on explicit user behavior.

97. The method of claim 70 wherein said relationship data is based on implicit user behavior.

98. The method of claim 70 wherein said playlist comprises at least one media file identifier associated with a media file.

99. The method of claim 98 wherein said media file identifier comprises a pointer.

100. The method of claim 98 wherein said media file identifier comprises a uniform resource locator.

101. The method of claim 98 wherein said media file identifier is associated with a media file that can be acquired by streaming said media file.

102. The method of claim 98 wherein said media file identifier is associated with a media file that can be downloaded.

103. The method of claim 98 wherein said media file identifier is associated with a media file that can be located on a user's computing device.

104. The method of claim 70 wherein said remote location comprises a server.

105. The method of claim 70 wherein said remote location comprises a database located on a server.

106. The method of claim 70 wherein said remote location comprises a database located on the internet.

107. The method of claim 70 wherein said remote location comprises a remote computing device.

* * * * *